THOMAS J. SCUITTO
INVENTOR
BY Samuel Lindenberg
Arthur Frielich
ATTORNEYS

THOMAS J. SCUITTO
INVENTOR.
BY Samuel Lindenberg
Arthur Freilich
ATTORNEYS

CALCULATOR APPARATUS

Filed Oct. 7, 1963 18 Sheets-Sheet 3

THOMAS J. SCUITTO
INVENTOR

BY Samuel Lindenberg
Arthur Frielich
ATTORNEYS

CALCULATOR APPARATUS

Filed Oct. 7, 1963 18 Sheets-Sheet 4

THOMAS J. SCUITTO
INVENTOR.
BY Samuel Lindenberg
Arthur Freilich
ATTORNEYS

July 11, 1967 T. J. SCUITTO 3,330,946

CALCULATOR APPARATUS

Filed Oct. 7, 1963 18 Sheets-Sheet 5

THOMAS J. SCUITTO
INVENTOR.

BY Samuel Lindenberg
Arthur Frielich

ATTORNEYS

THOMAS J. SCUITTO
INVENTOR.
BY Samuel Lindenberg
Arthur Freilich
ATTORNEYS

INVENTOR.
THOMAS J. SCUITTO
BY Samuel Lindenberg
Arthur Frelich
ATTORNEYS

INVENTOR.
THOMAS J. SCUITTO
BY Samuel Lindenberg
Arthur Freilich
ATTORNEYS

July 11, 1967 T. J. SCUITTO 3,330,946

CALCULATOR APPARATUS

Filed Oct. 7, 1963 18 Sheets-Sheet 9

THOMAS J. SCUITTO
INVENTOR.

BY Samuel Lindenberg
Arthur Freilich
ATTORNEYS

THOMAS J. SCUITTO
INVENTOR.
BY Samuel Lindenberg
Arthur Frelich
ATTORNEYS

INVENTOR.
THOMAS J. SCUITTO
BY Samuel Lindenberg
Arthur Freilich
ATTORNEYS

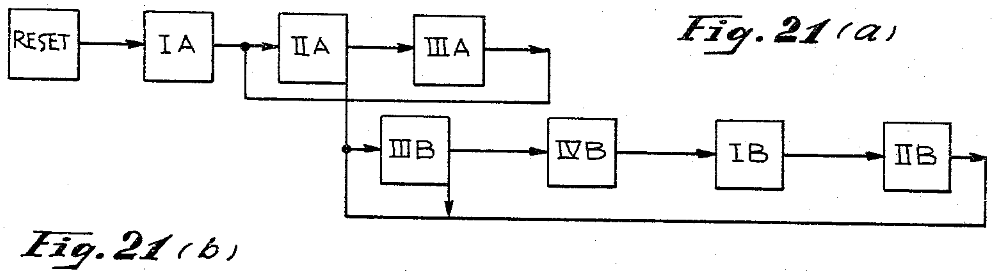
Fig. 21(a)
Fig. 21(b)
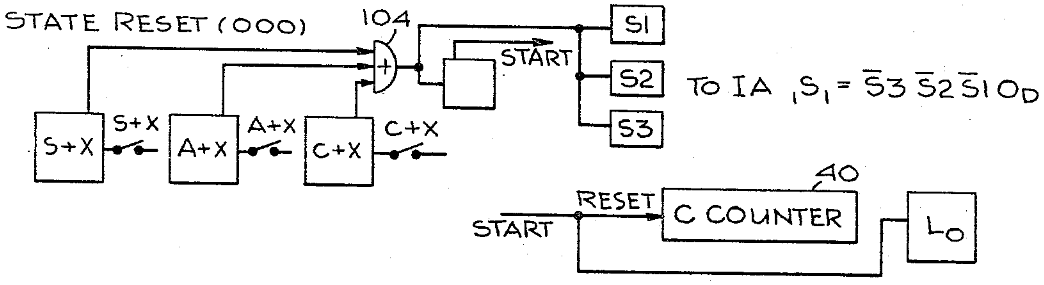
Fig. 21(c)
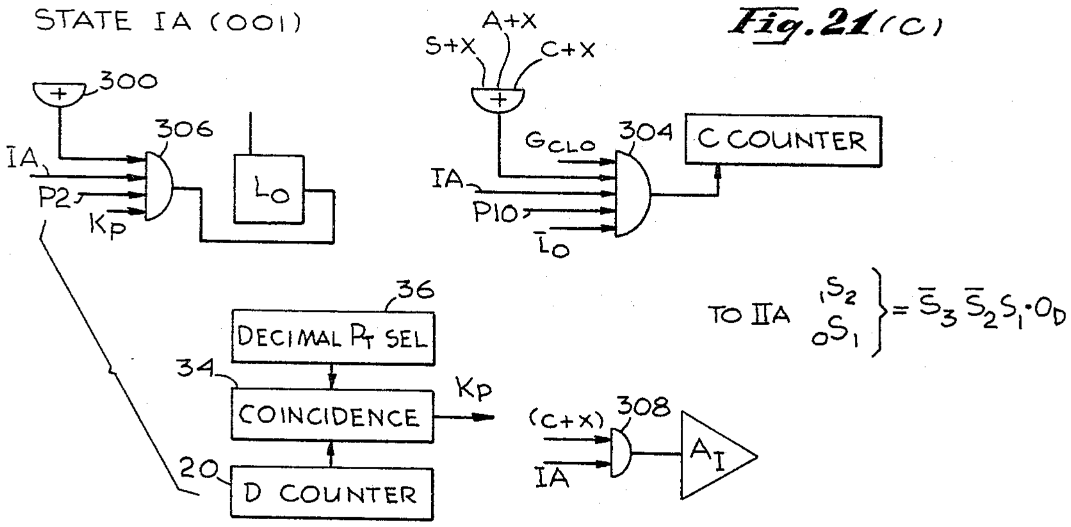
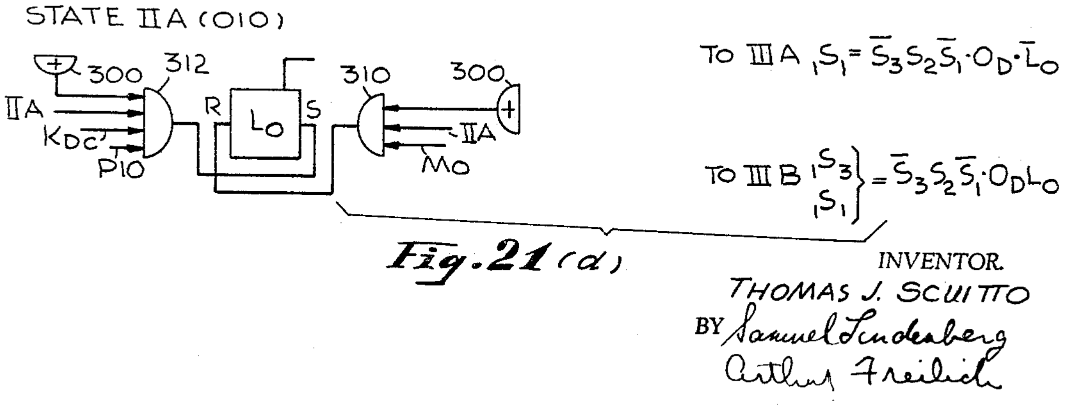
Fig. 21(d)
INVENTOR.
THOMAS J. SCUITTO
BY Samuel Lindenberg
Arthur Freilich
ATTORNEYS INVENTOR.
THOMAS J. SCUITTO
BY Samuel Lindenberg
Arthur Freilich
ATTORNEYS

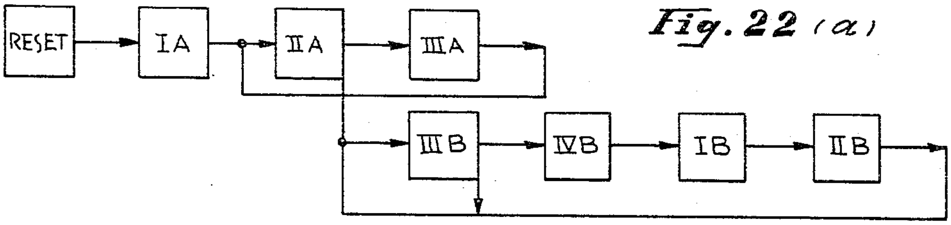
Fig. 22(a)
Fig. 22(b)
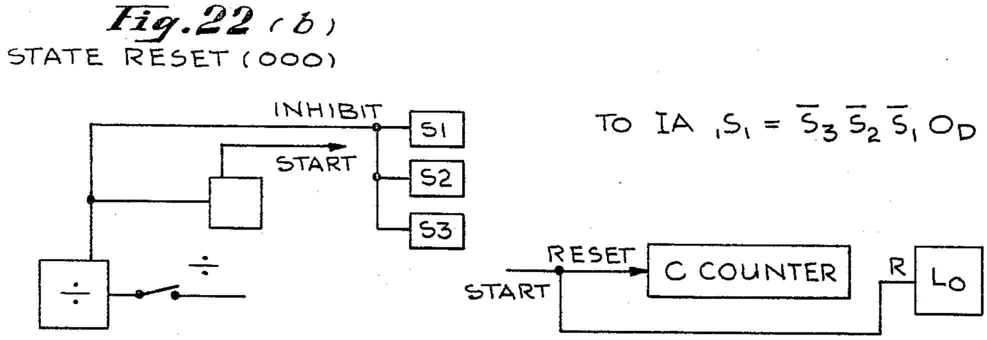
Fig. 22(c)
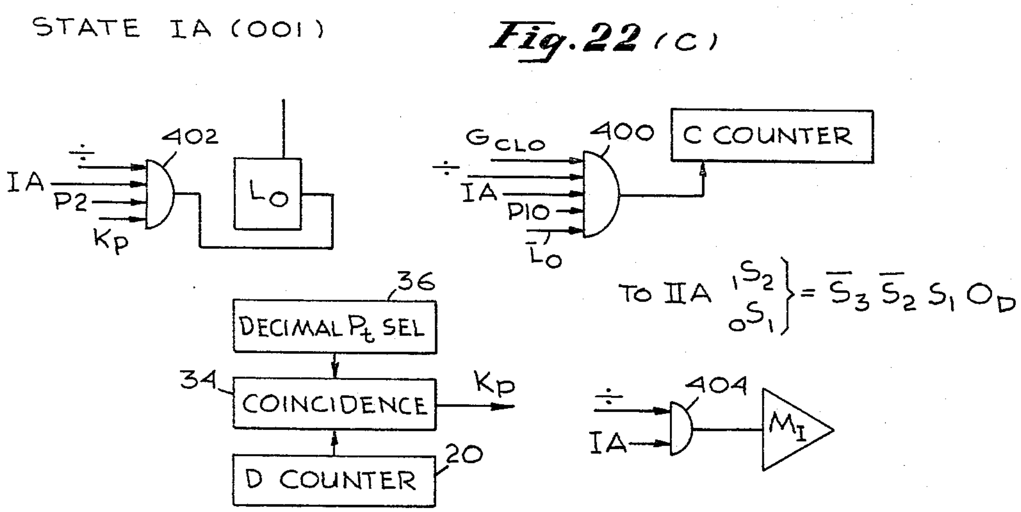
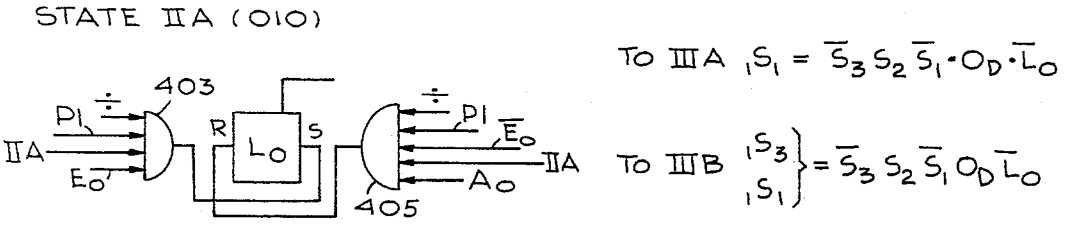
Fig. 22(d)
INVENTOR.
THOMAS J. SCUITTO
BY Samuel Lindenberg
Arthur Frelich
ATTORNEYS INVENTOR.
THOMAS J. SCUITTO
BY Samuel Lindenberg
Arthur Freilich
ATTORNEYS INVENTOR.
THOMAS J. SCUITTO
BY Samuel Lindenberg
Arthur Freilich
ATTORNEYS INVENTOR.
THOMAS J. SCUITTO
BY Samuel Lindenberg
Arthur Freilich
ATTORNEYS July 11, 1967 T. J. SCUITTO 3,330,946

CALCULATOR APPARATUS

Filed Oct. 7, 1963 18 Sheets-Sheet 18

THOMAS J. SCUITTO
INVENTOR.

BY Samuel Lindenberg
Arthur Frelich
ATTORNEYS

United States Patent Office 3,330,946
Patented July 11, 1967

3,330,946
CALCULATOR APPARATUS

Thomas J. Scuitto, Malibu, Calif., assignor to Wyle Laboratories, El Segundo, Calif., a corporation of California Filed Oct. 7, 1963, Ser. No. 314,387
20 Claims. (Cl. 235—160)

This invention relates generally to calculating apparatus and more particularly to an electronic desk type calculator for performing arithmetic operations.

Presently available calculating machines are all of the electromechanical type in which decimal digits are stored in terms of the position of a physically movable element, as for example, a wheel or a rack. Each such element is capable of successively assuming a different one of ten possible positions in response to the successive development of a mechanical stimulus. Hence, each such element is considered a mechanical decade counter. Within the conventional calculator, sets of elements comprising registers, are provided to store multidigit numbers. For example, in order to store a ten digit decimal number, a register comprised of ten decade counters has to be provided with a different register being necessary for each of the multidigit numbers to be simultaneously stored. Of course, since in an arithmetic operation such as division, a divisor, a dividend, and a quotient must be simultaneously stored, at least three reigsters must be provided. In more complex arithmetic operations or in a series of simpler operations, it is often necessary to handle additional numbers simultaneously. Of course, additional registers could be provided for this purpose but because of the expense and expanse of such registers in electromechanical calculators, such additional scratch pad registers are not generally provided and the user must therefore often use pencil and paper to keep track of such additional numbers. The introduction of the human element in this capacity tends to introduce errors in calculations.

Calculators are extremely useful and economically justified where it is necessary to perform many relatively simple and different arithmetic operations. For more complex data handling chores where speed is significant or where the same arithmetic operation has to be performed a very great number of times, digital computers can be advantageously employed. For example, presently available calculators are not useful for solving weather prediction problems because in order to be of any value, the solution must be provided in a matter of hours and through the use of a calculator, might not be available for several weeks. From the nature of what has been said thus far, it should be apparent that the use of a calculator is economically justified for a certain class of problems whereas a digital computer is justified for another certain class of problem. Between these two certain classes of course, is a gray area in which it is often not clear as to which type of apparatus should be used in order to obtain the fastest solution at the lowest cost. The choice is complicated by the fact that even though the calculator is slower than the computer in actual processing time, a user is able to directly operate the calculator to immediately obtain results whereas use of a digital computer generally requires that the problem be given to a programmer for the purpose of translating it into acceptable machine language.

In view of the above, it is an object of the present invention to provide a calculator which operates considerably faster and which in addition is more reliable and more accurate than heretofore known calculators. It is also an object of the present invention to provide such a calculator which is of approximately the same cost as heretofore known calculators.

It is a further object of the present invention to provide a calculator comprised principally of solid state electronic circuits which thereby assures silent operation and lightness in weight as distinguished from the relatively noisy operation and heaviness of heretofore known calculators.

It is a still further object of the present invention to provide a calculator which economically incorporates scratch pad registers and thereby avoids requiring the user to make excessive pencil notations. It is an additional object of the present invention to provide such a calculator which includes means for at all times displaying the contents of the various registers.

Inasmuch as heretofore known calculators make use of a plurality of decade counters in each register, a keyboard is generally provided which includes a different set of nine keys (each counter is normally cleared to zero) for each counter for enabling a selected digit to be entered into each counter. It is an object of this invention to provide a calculator which automatically positions digits in a register and which therefore requires the provision of only a single set of keys.

It is a still further object of this invention to provide a calculator which is capable of performing arithmetic operations such as multiplication, division, and square root without shifting decimal points so that the decimal point of an obtained product, quotient, or root is aligned with the decimal point of the generating factors. It is an additional object to provide means for allowing the decimal point to be shifted to permit operations on whole or fractional numbers or any combination of partially whole and partially fractional numbers.

In accordance with the invention, the calculator provided herein includes a small memory, preferably of the magnetic type such as a magnetic disc, and a display device, e.g., of the cathode ray tube type, together with a keyboard and logical electronic circuits. The disc is provided with a clock track and a plurality of register tracks, each register track including a plurality of digit sectors and being capable of storing a multidigit number. The position of a digit in a number is dependent upon the particular digit sector in which it is stored and its value is represented by the number of magnetic pulses recorded in that sector. Digits are handled in a serial manner thus requiring the provision of only one decade counter instead of a number of such counters, equal to the number of digits per multidight number used, as is required in heretofore known calculators.

Arithmetic operations are performed by the utilization of counting techniques such that, e.g., two digits are added by counting the number of pulses recorded in their corresponding digit sectors. Recording is accomplished by enabling a gate to which a source of clock signals (derived from the disc clock track) is applied for a period corresponding to the value of the digit to be recorded. Writing on and reading from a specific digit sector on the disc is controlled by a signal representing coincidence between the count of a control counter and a counter indicating the disc position. The control counter is capable of being manually set and is normally automatically incremented or decremented in the course of performing arithmetic operations.

The disc memory is continually coupled to the display device such that the contents of all of the registers are always visibly available to the operator thereby permitting him to easily check the accuracy of numbers entered, transferred, etc.

In addition to operating the calculator in a manual mode, means are provided for preparing a record, such as on punch paper tape, which the calculator, when operating in a playback mode, responds to just as if the sequence of key actuations recorded on the tape was being performed by a user. This facility makes it convenient for a user to initiate complex calculations requiring a great number of steps, as for example, in a series expansion.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 24:
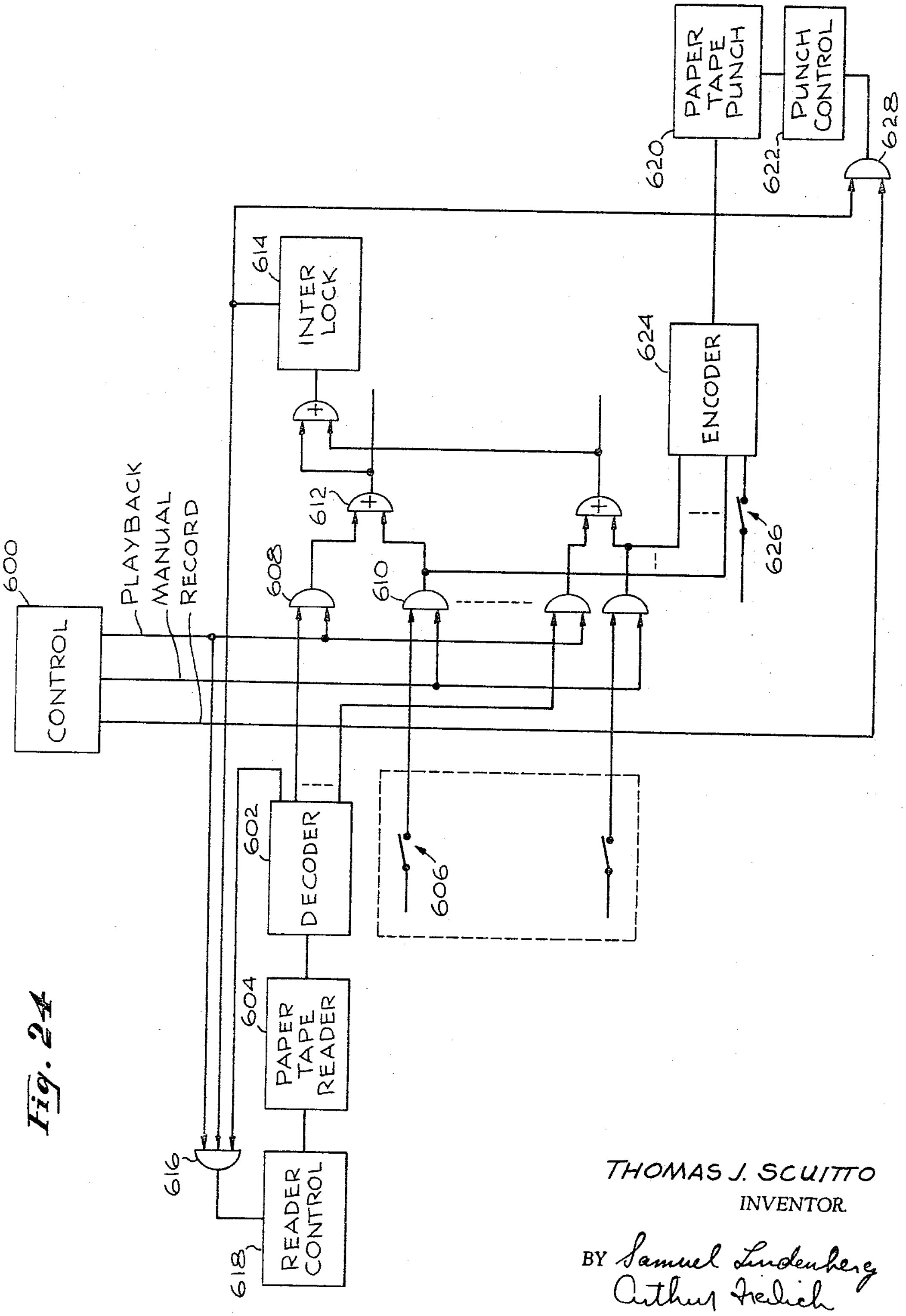

FIGURE 23(*a*) is a flow diagram illustrating the sequence of cycle (S) counter states utilized in the performance of square root and FIGURES 23(*b*)–(*h*) illustrate the portions of the calculator apparatus active in each of these states; and FIGURE 24 is a block diagram of means adapted to be incorporated with the heretofore mentioned apparatus for operating the calculator in a record mode in which mode a record is made of manual key actuations and a playback mode in which mode the calculator operates in response to such a record.

Figure 1:
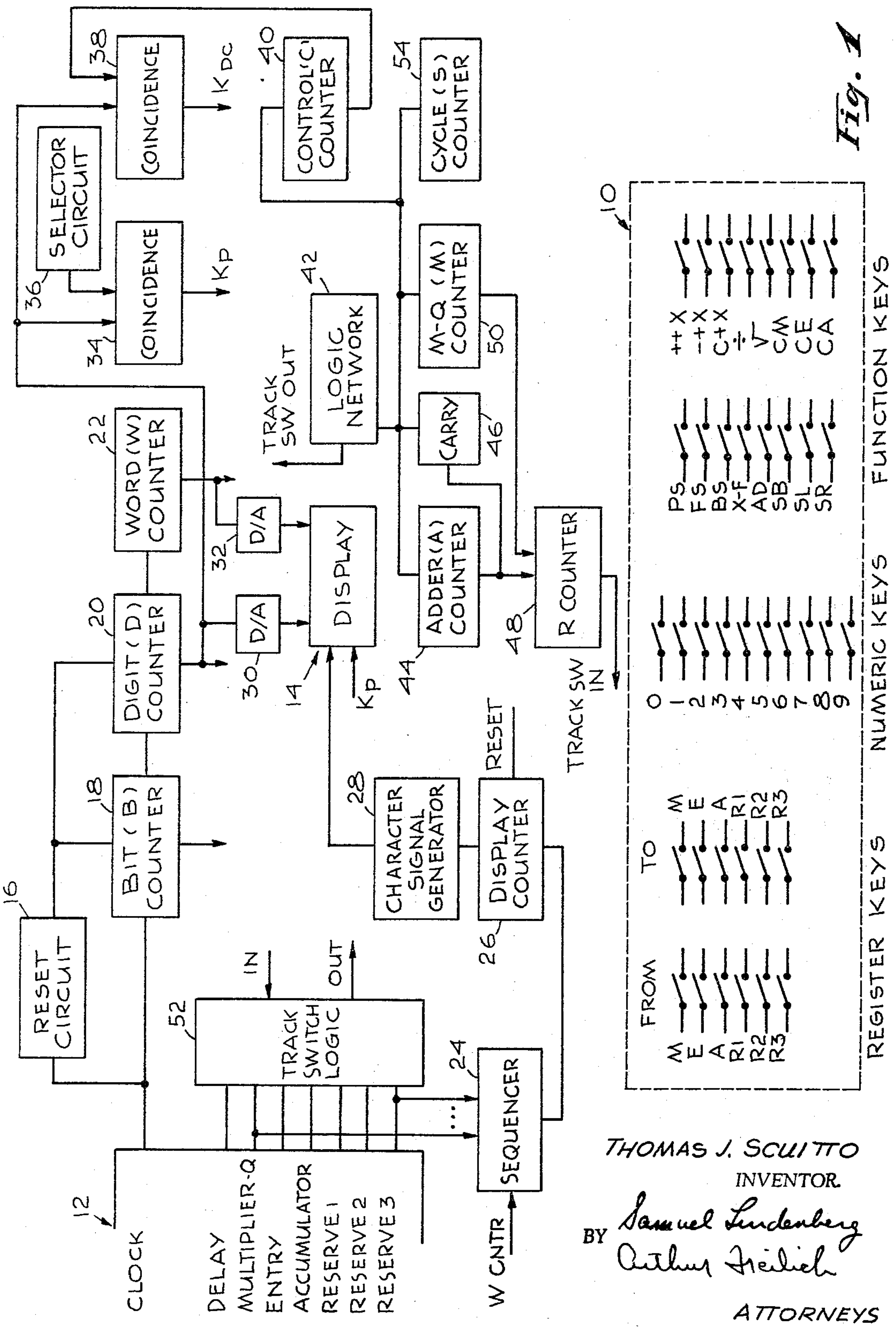
FIGURE 1 is a block schematic diagram illustrating the keyboard and principal components of the calculator.

Attention is now called to FIGURE 1 of the drawings which comprises a block schematic diagram of an embodiment of the calculator apparatus in accordance with the present invention. The calculator apparatus includes a keyboard 10, a memory 12, a display device 14, and various other electronic circuits comprising logic, counter, and coincidence detection circuits.

Figure 2:
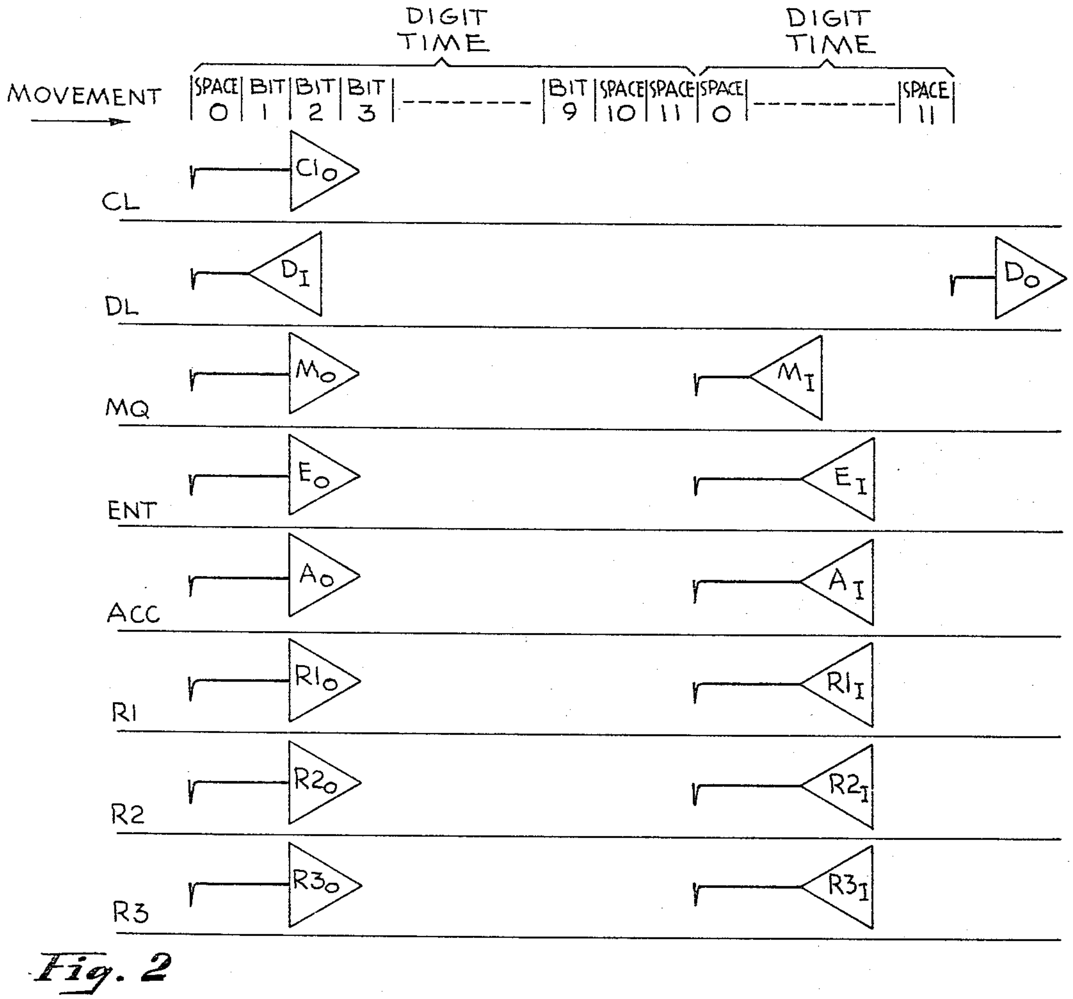
FIGURE 2 is a schematic diagram of the memory of FIGURE 1 specifically illustrating the write in and read out means associated with each memory track.
Figure 5:
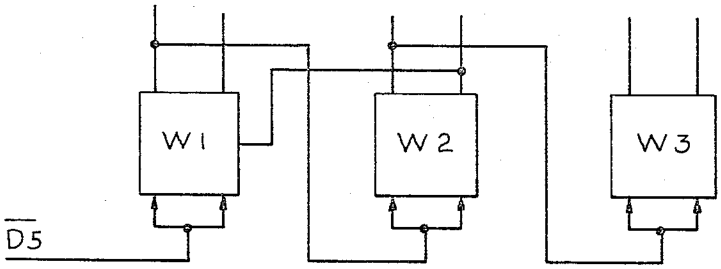
FIGURE 5 is a block schematic diagram of the word (W) counter of FIGURE 1.

The memory 12 is preferably of the movable magnetic media type, as for example disc or drum, and is provided with a plurality of tracks as shown in greater detail in FIGURE 2. The plurality of tracks includes a clock track, a delay track, and a plurality of register tracks respectively identified as the multiplier-quotient (M) register, the entry (E) register, the accumulator (A) register, and three reserve or scratch pad registers R1, R2, and R3. Each of the register tracks includes 28 digit sectors followed by a gap. Each of the digit sectors includes 9 bit positions and 3 space positions.

A magnetically recognizable mark or pulse is recorded in each of the bit and space positions of the clock track and is capable of being sensed by a head coupled to the input of clock track output amplifier $C_{lo}$.

Aligned with the output amplifier $C_{lo}$ head are heads coupled to output amplifiers $M_0$, $E_0$, $A_0$, $R1_0$, $R2_0$, and $R3_0$ which are each respectively associated with the M, E, A, R1, R2, and R3 registers. Positioned so as to follow these output amplifier heads by one digit sector (note that the direction of disc movement is from left to right and therefore a specific disc area initially passes under a head positioned to the left and subsequently passes under a head positioned to the right) are heads associated with input amplifiers $M_I$, $E_I$, $A_I$, $R1_I$, $R2_I$, and $R3_I$.

Aligned with the output amplifier heads is a delay track head coupled to input amplifier $D_I$. Following the input amplifier $D_I$ head by two digit sectors is the head of an output amplifier $D_0$.

Information is stored in the memory in accordance with an incremental digital code. That is, for the digit "9," nine pulses (one pulse in each bit position of a digit sector) will be recorded on a track digit sector. For the number "932," nine pulses will be recorded in the hundred's digit sector, three pulses in the ten's digit sector, and 2 pulses in the unit's digit sector. Information can be so recorded in each of the memory tracks other than the clock track.

Connected to the amplifier $C_{lo}$ is a reset circuit 16 (FIGURE 1) which functions to sense the previously mentioned gap and in response thereto to provide a reset signal once for each cycle of the memory. In addition to the reset circuit 16, a bit or B counter is connected to the amplifier $C_{lo}$. Coupled to the B counter 18 is a digit or D counter 20 and coupled to the D counter 20 is a word or W counter 22.

The B counter is a four stage binary scale of twelve counter and is incremented by pulses derived from the memory clock track. The D counter 20 is a five-stage binary counter and is reset once during each cycle of the disc by a reset signal provided by the reset circuit 16. The W counter 22 is a scale of six counter, each of its states being associated with a different one of the memory register tracks.

The contents of each of the memory registers is continually displayed by the display device 14. The output amplifiers associated with each of the memory registers is connected to a sequencing switch 24 which is operated in response to the states of the W counter 22. The state of the W counter selects the particular track whose contents are transferred through the sequencer 24 to the display counter 26. The display counter 26 functions to count the number of pulses recorded in each digit sector. The reset input terminal of the display counter 26 is controlled by the B counter 18 such that the display counter 26 is reset for each cycle of the B counter. The upper count, for each digit sector, in the display counter 26 is coupled to a character signal generator 28 which develops appropriate video signals and applies them to the display device 14 which is preferably of the cathode ray tube type. The video signals function to trace a digit represented by the count (number of pulses) in the digit sector in the memory register just read. The traced digit is properly placed on the display device 14 by the development of deflection signals by digital-to-analog converters 30 and 32 which are respectively connected to the output of the D counter 20 and W counter 22. Preferably, the W counter 22 controls the vertical deflection of the display device 14 and the D counter 20 controls the horizontal deflection. As a consequence, the digits in each of the numbers respectively stored in the memory registers are displayed displaced horizontally from one another across the face of the cathode ray tube display device and the numbers in the different registers are vertically spaced from one another.

The state of the D counter at all times defines the digit sector currently moving under the heads connected to the memory register output amplifiers and therefore the digit sector from which information can be immediately read. The output of the D counter 20 is connected to the input of a first coincidence circuit 34 along with the output of a selector circuit 36. The selector circuit 36 is a manually operable device including a decimal point selector portion and a preset selector portion. A number of a digit can be manually entered into either one of the portions. Coincidence between the state of the D counter 20 and the state of the decimal point selector portion is normally detected by the coincidence circuit 34 and a coincidence signal $K_p$ is provided as a manifestation of the coincidence. However, when the preset function flip-flop, referred to in greater detail below, is set, then the coincidence circuit 34 compares the D counter 20 with the number set into the preset selector portion. The signal $K_p$ is applied to the display device 14 to cause the appearance of a decimal point which is consequently aligned in all the registers. Similarly, a second coincidence circuit 38 is provided which detects coincidence between the D counter 20 and a control or C counter 40 to provide a coincidence signal $K_{DC}$. The control counter 40 can be manually set through the use of the preset function key to be described or can be set by a logic network 42. The state of the control counter identifies a particular digit sector and the coincidence signal $K_{DC}$ indicates when the digit stored therein can be operated upon.

Connected to the logic network 42 is an adder 44 which comprises a decade counter hereafter called the A counter. The output of the A counter is coupled to a carry flip-flop 46 and to an R counter 48. In addition, a multiplier-quotient or M decade counter 50 is provided and is also controlled by the logic network 42 and also has an output coupled to the input of R counter 48. Inputs to the A and M counters are derived from the output of a track switching logic network 52, coupled to the input and output amplifiers associated with the memory tracks through the logic network 42. The output of R counter 48 is connected to the input of the track switching logic network 52. A cycle or S counter 54 is provided for the purpose of defining a sequence of different states which are utilized in the performance of arithmetic operations, such as multiplications, for causing specific operations to be performed in a desired sequence.

The keyboard 10 consists of three sets of keys, namely a set of register keys, a set of numeric keys, and a set of function keys. The set of register keys has a subset of "from" keys and a subset of "to" keys. In each subset of keys, one key corresponds to a different one of each of the memory registers. The set of numeric keys includes ten keys each of which corresponds to a different decimal digit, i.e., zero through nine.

The set of function keys includes sixteen keys each of which is capable of initiating a different sequence of operations on numbers stored in the memory registers. The function keys and a description of the operations initiated by their respective actuations are as follows:

Preset (PS) functions to permit the control counter to be driven to a state designated by a manually settable means;

Forward Space (FS) causes the control counter to be decremented, as for example from count 14 to count 13, which means that the coincidence circuit 38 will generate the coincidence signal $K_{DC}$ when the thirteenth digit sector is in a readable position rather than the fourteenth digit sector, the effect being noticeable on the display device 14 and being analogous to the function performed in response to the actuation of a typewriter space key.

Backspace (BS) permits the control counter to be incremented by one which thereby means that the coincidence signal $K_{DC}$ generated by the coincidence circuit 38 will be generated when, e.g., the fifteenth rather than the fourteenth digit sector is in a readable position;

Transfer (XF) permits information to be transferred from a first designated memory register to a second memory register;

Add (AD) permits the contents of a designated register to be added to the contents of the accumulator register, the sum remaining in the accumulator register;

Subtract (SB) permits the contents of a designated register to be subtracted from the contents of the accumulaor register, the difference remaining in the accumulator register;

Shift Left (SL) permits the contents of a designated register to be shifted one digit to the left (effectively multiplying by 10);

Shift Right (SR) permits the contents of a designated register to be shifted one digit to the right (effectively dividing by 10);

Add and Multiply (+ and ×) permits the numbers in the multiplier-quotient register and entry register to be multiplied and the product added to the number in the accumulator register;

Subtract and Multiply (− and ×) permits the numbers in the multiplier-quotient register and entry register to be multiplied and the product subtracted from the number in the accumulator register;

Clear and Multiply (C and ×) causes the accumulator to be cleared prior to entering the product of the numbers in the multiplier-quotient register and entry register;

Divide (÷) causes the contents of the entry register to be divided into the contents of the accumulator register with the quotient being provided in the multiplier-quotient register which is initially cleared;

Square Root ($\sqrt{\phantom{x}}$) causes the root of the number in the accumulator register to be developed and stored in the multiplier-quotient register, both the entry and multiplier-quotient registers being initially cleared;

Clear Multiplier-Quotient register (CM) causes the contents of the multiplier-quotient register to be reduced to zero;

Clear Entry register (CE) causes the contents of the entry register to be reduced to zero; and Clear Accumulator register (CA) causes the contents of the accumulator register to be reduced to zero.

Figures 3A, 3B:
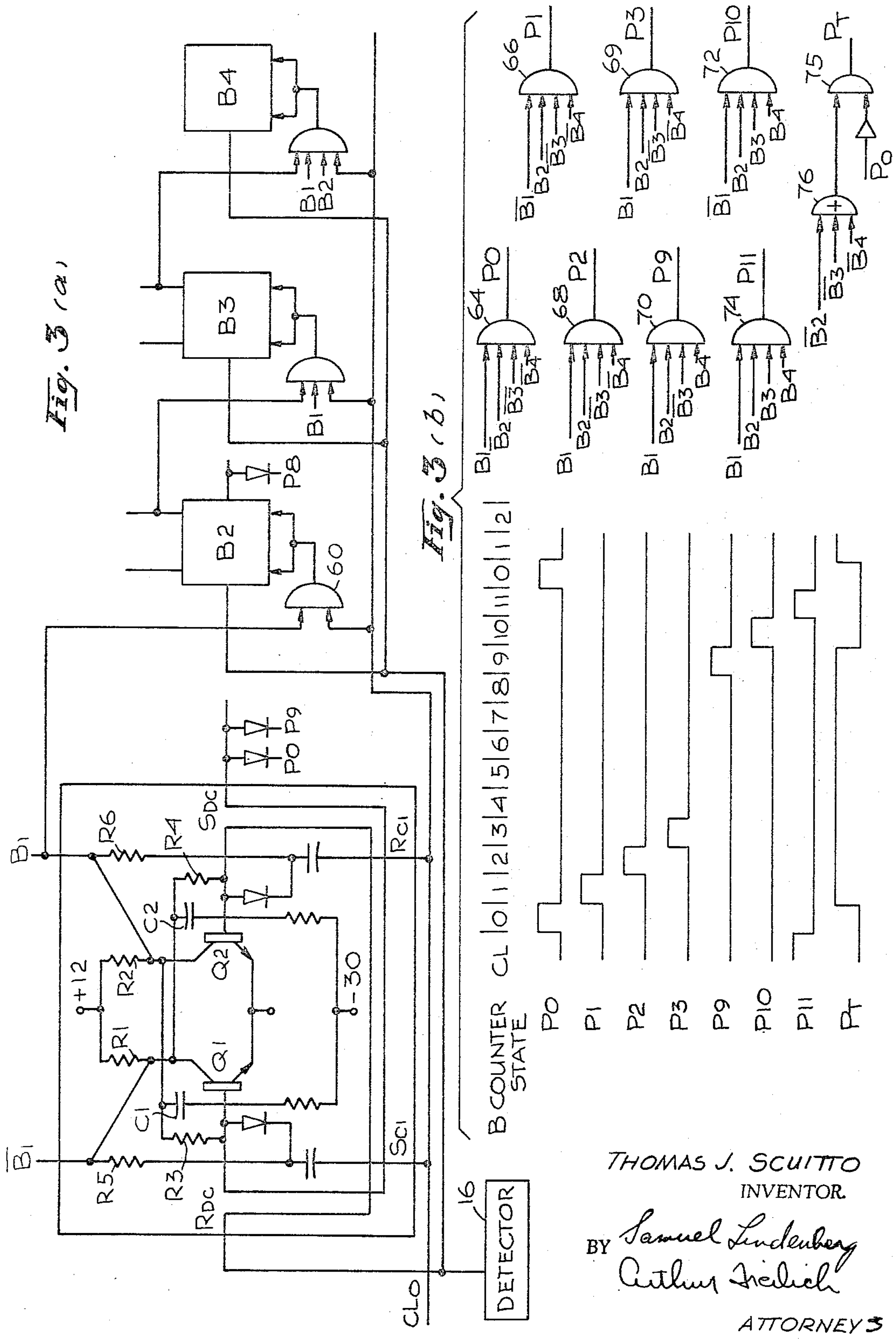
FIGURE 3(*a*) is a block schematic diagram of the bit (B) counter of FIGURE 1 and FIGURE 3(*b*) illustrates the gating means utilized to form the illustrated timing signals based on the state of the B counter.

Attention is now directed to FIGURE 3(*a*) which schematically illustrates the construction of the B counter 18 of FIGURE 1. The B counter includes four stages, respectively identified as B1, B2, B3, and B4, each stage comprising a solid state flip-flop circuit. Each of the B counter flip-flop circuits is identical to the circuit illustrated for the flip-flop B1. The circuit of flip-flop B1 includes a pair of transistors Q1 and Q2, both of the NPN type. The transistors Q1 and Q2 have their emitters connected together and to a source of negative potential, nominally shown as −12 volts. The collectors of each of the transistors Q1 and Q2 are respectively connected through resistors R1 and R2 to a source of positive potential, nominally shown as +12 volts. Connected in parallel between the collector of transistor Q2 and the base of transistor Q1 are a resistor R3 and a capacitor C1. Similarly, connected in parallel between the collector of transistor Q1 and the base of transistor Q2 are a resistor R4 and a capacitor C2. A first series circuit branch including a capacitor C3 and a diode D1 is connected to the base of transistor Q1. Similarly, a second series branch including a capacitor C4 and a diode D2 is connected to the base of transistor Q2. Resistors R5 and R6 respectively couple the collectors of transistors Q1 and Q2 to the junctions in the first and second series branches. Resistors R7 and R8 respectively couple the bases of transistors Q1 and Q2 to a source of negative potential, nominally shown as −30 volts. Reset and set input terminals respectively identified as $R_{DC}$ and $S_{DC}$ are connected to the bases of transistors Q1 and Q2, respectively. Reset and set clock input terminals respectively identified as Rc1 and Sc1 are connected to the free ends of the first and second series branches, respectively. False and true output terminals respectively identified as $\overline{B}_1$ and $B_1$ are respectively connected to the collectors of transistors Q1 and Q2. When the flip-flop B1 is reset or false, transistor Q2 will be conducting and its collector will be at a low potential. Consequently, output terminals $\overline{B}_1$ and $B_1$ will be at high and low potentials respectively. Conversely, when transistor Q1 is conducting, output terminals $\overline{B}_1$ and $B_1$ will be at a low and high potential respectively and flip-flop B1 will be considered true. In the operation of flip-flop B1, the application of a negative clock signal to the input terminal Sc1 will cause the flip-flop B1 to assume a true state, regardless of which state it is in. Similarly, the application of a negative clock signal to the input terminal Rc1 will cause the flip-flop B1 to assume a false state and the simultaneous application of a clock signal to both input terminals Rc1 and Sc1 will cause the flip-flop to change state regardless of the state it is in. A sufficiently high positive potential applied to input terminal $S_{DC}$ will switch the flip-flop true and a sufficiently high potential applied to input terminal $R_{DC}$ will switch the flip-flop false.

The stages of the B counter are connected together to form a scale of twelve counters to successively define the states according to Table I in response to the clock pulses successively derived from the memory clock track and applied to the clock input terminals of flip-flop B1.

TABLE I

| | B4 | B3 | B2 | B1 |
|---|---|---|---|---|
| P0 | 0 | 0 | 0 | 1 |
| P1 | 0 | 0 | 1 | 0 |
| P2 | 0 | 0 | 1 | 1 |
| P3 | 0 | 1 | 0 | 0 |
| P4 | 0 | 1 | 0 | 1 |
| P5 | 0 | 1 | 1 | 0 |
| P6 | 0 | 1 | 1 | 1 |
| P7 | 1 | 0 | 0 | 0 |
| P8 | 1 | 0 | 1 | 1 |
| P9 | 1 | 1 | 0 | 1 |
| P10 | 1 | 1 | 1 | 0 |
| P11 | 1 | 1 | 1 | 1 |

Although the manner in which the B counter counts is somewhat arbitrary, the manner expressed by the above table was chosen because in its environment it proved to be the least expensive. The terms P0 through P11 respectively represent the various B counter states or bit periods. It is to be noted that set input terminals are applied to stage B1 during states P0 and P9 and to stage B2 during state P8. Otherwise, the B counter counts in a standard binary fashion incrementing by one in response to each clock pulse. The B counter is implemented by connecting the true output terminal of each B counter flip-flop through an And gate 60 to the clock input terminals of a succeeding stage. In addition, the output of clock track output amplifier **C1*o* and the true output terminal of all other preceding B counter stages is connected to the input of each And gate 60. The signals P0 and P9** [developed as shown in FIGURE 3(*b*)] are applied to the set input terminal of flip-flop B1 through a pair of diodes. Signal P8 is similarly applied to flip-flop B2. The output of the reset circuit 16 is connected to the $R_{DC}$ input terminal of each of the flip-flops of the B counter for maintaining the B counter in synchronism with the rotation of the disc.

FIGURE 3(*b*) illustrates a plurality of significant gating signals derived from the B counter. These signals represent different bit periods in each digit period (i.e., the time it takes for a digit sector to move past a read head) and, as will be seen below, are utilized in the performance of several of the operations to be described. Initially, a signal P0 derived from the output of And gate 64 whose inputs respectively comprise the false output terminals of flip-flops B1, B2, B3, and B4 defines the initial bit period during each digit period. A signal P1 is derived from And gate 66 whose inputs respectively comprise the true output terminal of flip-flop B2 and the false output terminals of flip-flops B1, B3, and B4. Similarly, signals P2, P3, P9, P10, and P11 are derived from And gates 68, 69, 70, 72, and 74. A further signal $P_t$ which is true during bit periods 1 through 9 is developed by applying the false output terminals of flip-flops B2, B3, and B4 to the input of Or gate 76 and the output of gate 76 to the input of And gate 77 along with the output of an inverter to which is applied signal P0.

Figure 4:
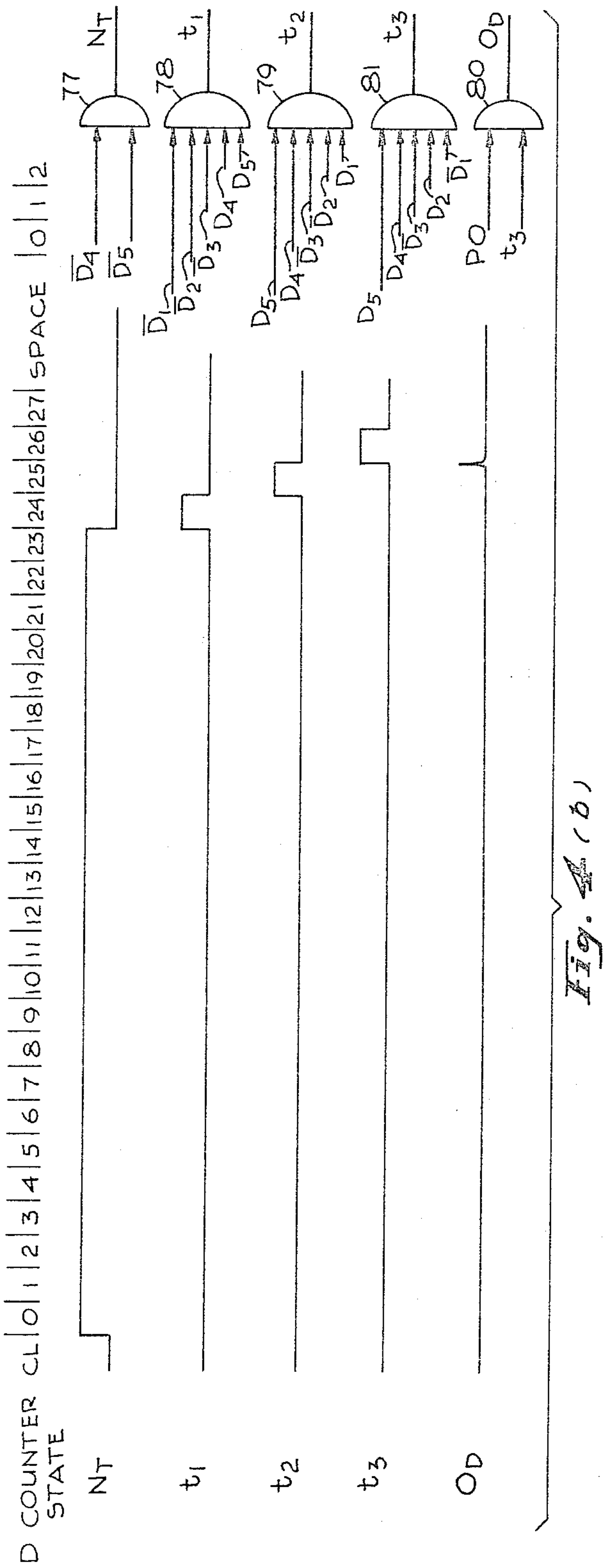
FIGURE 4(*a*) is a block schematic diagram of the digit (D) counter of FIGURE 1 and FIGURE 4(*b*) illustrates the gating means utilized to form the illustrated timing signals based upon the state of the D counter.
Figure 4:
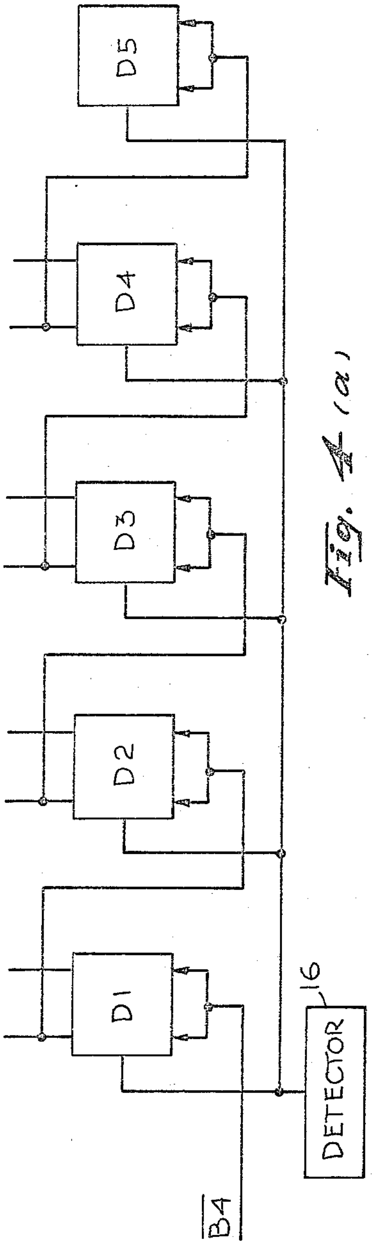

FIGURE 4(*a*) illustrates a block diagram of the D counter which consists of five stages, each stage including a flip-flop respectively identified as D1, D2, D3, D4, and D5. The external terminals of the D counter flip-flops correspond to the external terminals of the flip-flop B1 already discussed. The internal circuit of the D counter flip-flops can be substantially similar to the circuit illustrated for flip-flop B1. Table II below defines the D counter states.

*Table II*

| | D5 | D4 | D3 | D2 | D1 |
|---|---|---|---|---|---|
| 0 | 0 | 0 | 0 | 0 | 0 |
| 1 | 0 | 0 | 0 | 0 | 1 |
| 2 | 0 | 0 | 0 | 1 | 0 |
| 3 | 0 | 0 | 0 | 1 | 1 |
| 4 | 0 | 0 | 1 | 0 | 0 |
| 5 | 0 | 0 | 1 | 0 | 1 |
| 6 | 0 | 0 | 1 | 1 | 0 |
| 7 | 0 | 0 | 1 | 1 | 1 |
| 8 | 0 | 1 | 0 | 0 | 0 |
| 9 | 0 | 1 | 0 | 0 | 1 |
| 10 | 0 | 1 | 0 | 1 | 0 |
| 11 | 0 | 1 | 0 | 1 | 1 |
| 12 | 0 | 1 | 1 | 0 | 0 |
| 13 | 0 | 1 | 1 | 0 | 1 |
| 14 | 0 | 1 | 1 | 1 | 0 |
| 15 | 0 | 1 | 1 | 1 | 1 |
| 16 | 1 | 0 | 0 | 0 | 0 |
| 17 | 1 | 0 | 0 | 0 | 1 |
| 18 | 1 | 0 | 0 | 1 | 0 |
| 19 | 1 | 0 | 0 | 1 | 1 |
| 20 | 1 | 0 | 1 | 0 | 0 |
| 21 | 1 | 0 | 1 | 0 | 1 |
| 22 | 1 | 0 | 1 | 1 | 0 |
| 23 | 1 | 0 | 1 | 1 | 1 |
| 24 | 1 | 1 | 0 | 0 | 0 |
| 25 | 1 | 1 | 0 | 0 | 1 |
| 26 | 1 | 1 | 0 | 1 | 0 |
| 27 | 1 | 1 | 0 | 1 | 1 |
| Reset | 0 | 0 | 0 | 0 | 0 |

It will be noted that the D counter counts in straight binary fashion in response to transitions of flip-flop B4 of the B counter from a true to a false state. The D counter is periodically reset every 28 digit periods by the output of the reset circuit 16.

FIGURE 4(*b*) illustrates a plurality of gating signals derived from the states of the D counter. A signal $N_t$, representing the numeric portion of each memory cycle is developed by Or gate 77 whose inputs comprise the false output terminals of flip-flops D4 and D5. Signal $N_t$ is true during states 0 through 23 of the D counter.

A signal $t_1$ which is true during state 24 of the D counter is developed by gate 78. Similarly, signals $t_2$ and $t_3$ are respectively developed by gates 79 and 81. In addition, a memory origin signal $O_d$ is developed by gate 80 by applying the signals P0 and $t_3$ to the input thereof.

The W counter 22 is utilized in conjunction with display device 14 for sequentially displaying the contents of the memory registers and for developing vertical deflection voltages to properly position the displayed contents. The W register is a scale of six counter consisting of three binary stages, each stage comprising a flip-flop whose circuit arrangement can be similar to that disclosed for flip-flop B1. Table III describes the states of the W counter.

*Table III*

| | W3 | W2 | W1 |
|---|---|---|---|
| State 0 | 0 | 0 | 1 |
| State 1 | 0 | 1 | 0 |
| State 2 | 0 | 1 | 1 |
| State 3 | 1 | 0 | 1 |
| State 4 | 1 | 1 | 0 |
| State 5 | 1 | 1 | 1 |
| State 0 | | | |

The first stage of the W counter is driven by true-to-false transitions of flip-flop D5 of the C counter. True-to-false transitions of flip-flop W1 are coupled to the clock input terminals of flip-flop W2. The false output terminal of flip-flop W2 is similarly connected to the clock input terminals of flip-flop W3 for normal binary counting. The true output terminal of flip-flop W2 is connected to the $S_{DC}$ input terminal of flip-flop W1. Consequently, when flip-flop D5 switches false and the W counter is in state 2, flip-flops W2 and W3 switch state but flip-flop W1 is forced back to the true state by the connection between the true output terminal of flip-flop W2 and the $S_{DC}$ input terminal of flip-flop W1. Similarly, when the W counter is in state 5, the true-to-false transition of flip-flop D5 will again cause flip-flops W1, W2, and W3 to change state but again W2 will force flip-flop W1 into a set condition.

Figure 6:
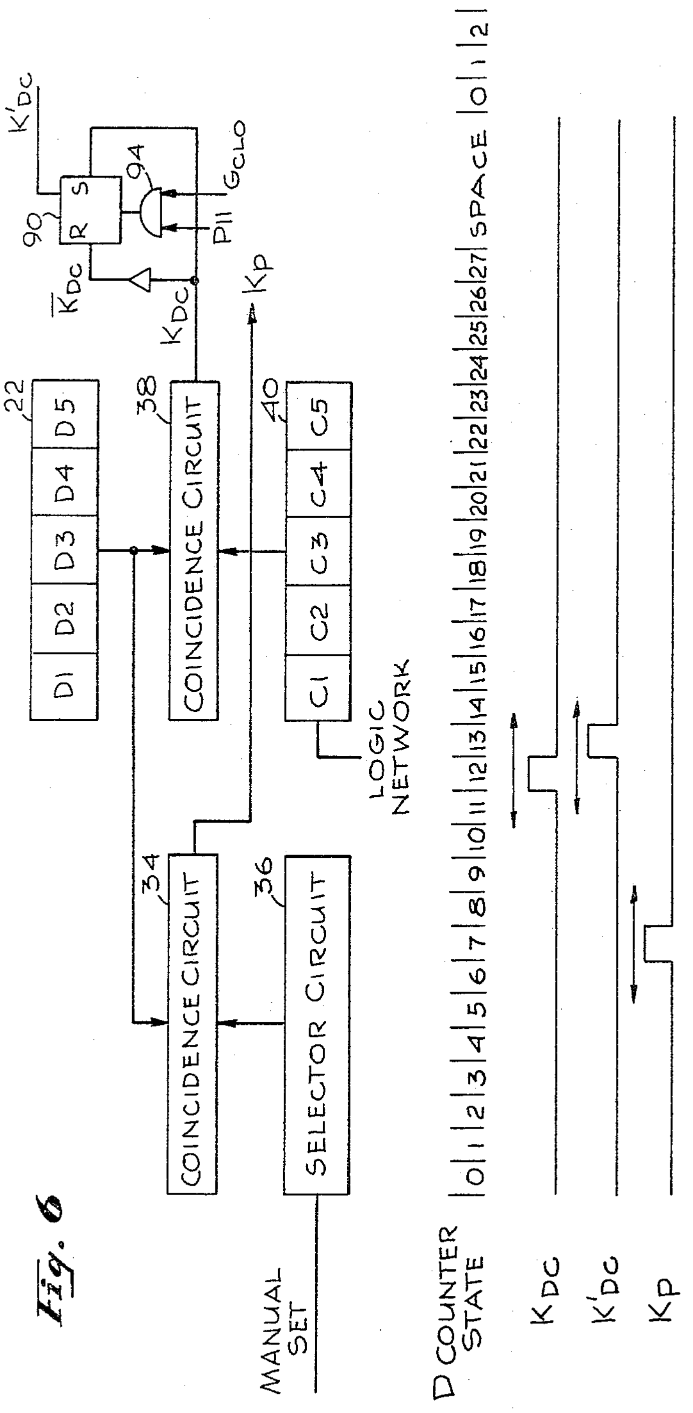
FIGURE 6 is a block diagram illustrating the means for deriving signals respectively representing coincidence between the D counter and the decimal point selector of FIGURE 1 and the D counter and the control (C) counter of FIGURE 1.

Attention is now called to FIGURE 6 which illustrates in greater detail the means for developing the previously mentioned coincidence signals $K_p$ and $K_{DC}$ and a not yet introduced signal $K'_{DC}$ which represents the coincidence signal $K_{DC}$ delayed by one digit period. Each portion of the selector circuit 36 is manually settable to any even count between 0 and 23. Except when the preset function flip-flop is set, the coincidence circuit 34 continually compares the number represented by the decimal point selector portion of circuit 36 with the state of the D counter 22 which of course represents the position of the movable memory. When coincidence is sensed, the coincidence circuit 34 provides the coincidence signal $K_p$ which, as will be noted in the timing chart of FIGURE 6, is true for one digit period. When the preset function flip-flop is set, generation of the signal $K_p$ indicates coincidence between the D counter and the preset selector portion of circuit 36.

The C counter 40 is set by the logic network 42 and coincidence between the C counter 40 and D counter 22 is indicated by the provision of the signal $K_{DC}$ by the coincidence circuit 38. As noted in the timing chart of FIGURE 6, the coincidence signal $K_{DC}$ is true for one digit period during the initial 24 states of the D counter. In addition to the coincidence signals $K_p$ and $K_{DC}$, utilization will subsequently be made of the signal $K'_{DC}$ which constitutes the coincidence signal $K_{DC}$ delayed by one digit period. The signal $K'_{DC}$ is developed by applying the signal $K_{DC}$ directly to the set input terminal of a flip-flop 90 and through an inverter 92 to the reset input terminal thereof. The output of an And gate 94 is connected to the clock input terminals of the flip-flop with the inputs to the And gate 94 comprising the signal P11 and an odd gated clock signal $G_{clo}$ which will be discussed in further detail below but for the present, can be considered as occurring in synchronism with the clock pulses read off the memory clock track. The signal $K'_{DC}$ is derived from the true output terminal of the flip-flop 90. In operation, when the movable memory moves into a position such that the digit sector identified by the number stored in the C counter 40 moves under the heads associated with the output register amplifiers, the state of the D counter 22 will coincide with the state of the C counter 40 and as a consequence the coincidence circuit 38 will provide the coincidence signal $K_{DC}$. The flip-flop 90 will be set true in response to the development of the signal $K_{DC}$ and the subsequent generation of the signal P11. The flip-flop 90 will remain true for one digit period, i.e., until the subsequent generation of the signal P11 which of course will occur when signal $K_{DC}$ is false.

Figure 7:
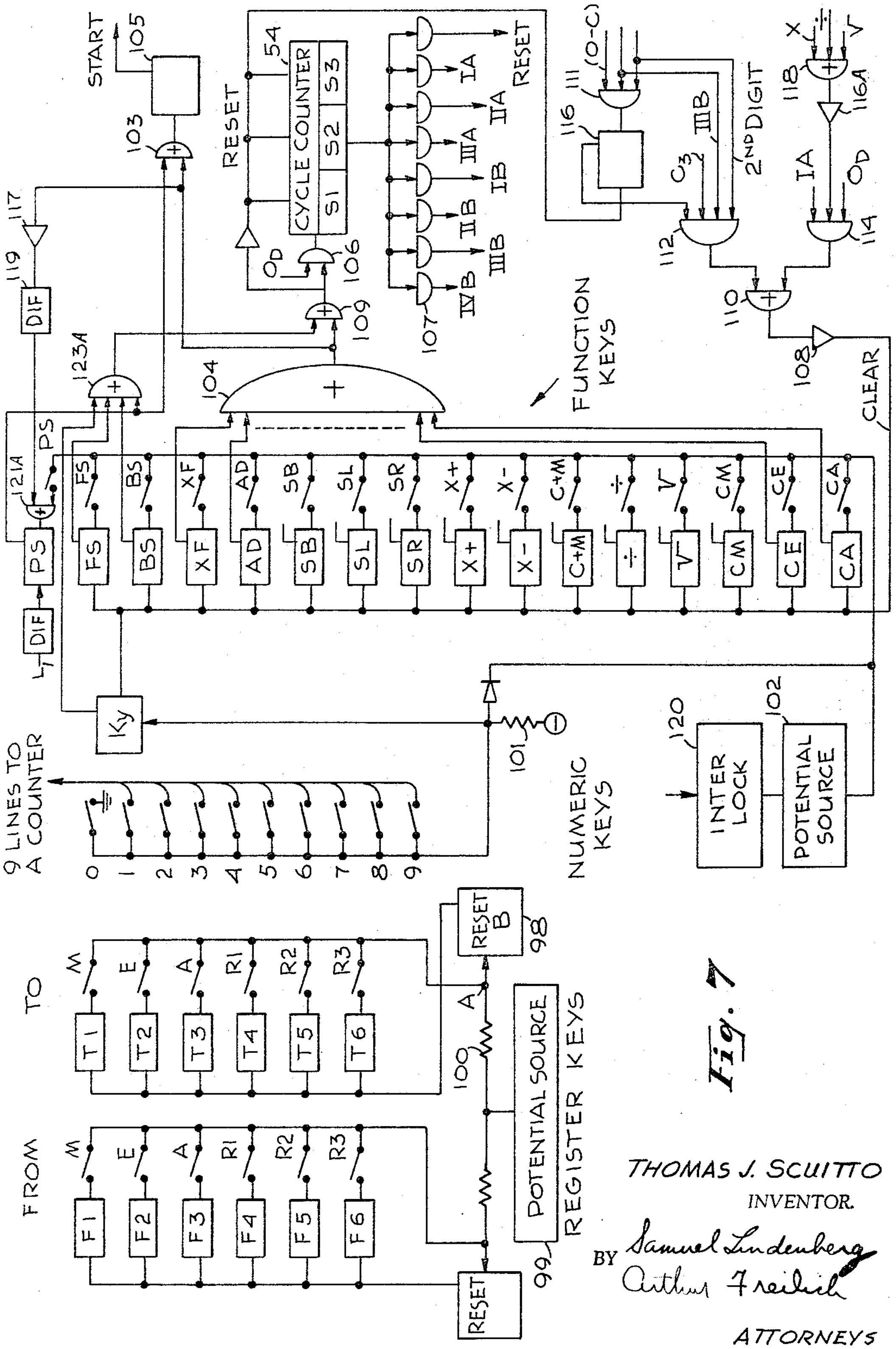
FIGURE 7 is a block schematic diagram illustraitng both the flip-flops, which are set in response to the selective actuation of the keys on the calculator keyboard, and the cycle counter whose operation is initiated in response to the setting of any of the flip-flops in the set of function flip-flops.

Attention is now called to FIGURE 7 of the drawings which illustrates the various flip-flops set in response to the actuation of the keys introduced in FIGURE 1. The keys M, E, A, R1, R2, and R3 of the "from" subset of the register keys are respectively connected to the set input terminals of the flip-flops F1 through F6 respectively. Closure of any one of these keys connects the potential source 100 to the corresponding flip-flop causing it to be set. Similarly, the keys M, E, A, R1, R2, and R3 in the subset of "to" register keys are respectively connected to the set input terminals of the flip-flops T1 through T6 respectively. Energizing any one of the "to" switches sets the corresponding "to" flip-flop. The burst of energy used in setting the "to" flip-flop also generates a positive pulse at the input to reset circuit 98 connected to the potential source 99 through resistor 100 thereby resetting all the "to" flip-flops previously set. The "to" flip-flops being set remains set inasmuch as the setting pulse lasts longer than the resetting pulse. The "from" switches similarly set and reset the "from" flip-flops.

Each of the numeric keys 0 through 9 is connected to the appropriate input on the adder counter 44 and to the set input terminal of flip-flop key $K_y$, each numeric key serving to connect the potential source 102 to the adder counter in such a manner to cause it to be set to the state corresponding to the number of the key energized. The $K_y$ flip-flop is set by detecting the positive pulse on upper terminal of resistor 101.

Similarly, each of the function keys, upon actuation, connects the potential source 102 to a corresponding function flip-flop. For example, actuation of the Add (AD) key causes the AD flip-flop to be set and actuation of the Divide (÷) causes the ÷ flip-flop to be set. The true output terminal of each of the function flip-flops, other than Preset, Forward Space, Backspace, and $K_y$ flip-flops, is connected to the input of an Or gate 104 whose output is connected through Or gate 103, to the reset input terminal of a delay multivibrator 105 which in turn provides a short duration "start" pulse. The output of gate 104 is also connected through Or gate 109 to the input of an And gate 106 along with the output of gate 80 of FIGURE 4(*b*) providing the origin signal $O_d$. The output of And gate 106 is connected to an enabling input of the cycle (S) counter 54 which is capable of defining a series of states as indicated by Table IV.

*TABLE IV*

| State | S3 | S2 | S1 |
|---|---|---|---|
| Reset | 0 | 0 | 0 |
| IA | 0 | 0 | 1 |
| IIA | 0 | 1 | 0 |
| IIIA | 0 | 1 | 1 |
| IB | 1 | 0 | 1 |
| IIB | 1 | 1 | 0 |
| IIIB | 1 | 1 | 1 |
| IVB | 1 | 0 | 0 |

The cycle counter is capable of successively defining the indicated states in response to various logical decisions made in the course of performing the several functions described below. Connected to the output of the cycle counter are eight And gate state detectors 107 each responsive to a different state to provide a true output signal.

The reset input terminal of each of the function flip-flops except the "Preset" flip-flop and the $K_y$ flip-flop, is connected to a common clear line which is connected through an inverter 108 to the output of an Or gate 110. The inputs to the Or gates 110 are connected to the outputs of And gates 112 and 114. A first input to And gate 112 is derived from the true output terminal of flip-flop 116 which is set by the output of And gate 111. The inputs to gate 111 comprise the output of a circuit (not shown) which senses the zero state of the control counter 40 and provides a signal $O_c$ representative thereof, the output of state detector IIIB, and a signal derived from the D counter representing the second digit period during a memory cycle. A second input to the And gate 112 comprises the output of the state detector IIIB. A third input to And gate 112 comprises the signal representing the second digit period in a memory cycle. A fourth input to gate 112 comprises the true output terminal of flip-flop C3 of the C counter.

The first input to And gate 114 is derived from a circuit (not shown) which provides a signal $O_d$ in response to the D counter defining a zero state. A second input to the And gate 114 is derived from state detector IA. The third input to And gate 114 is connected to the output of an inverter 116A whose input is connected to the output of an Or gate 118. The inputs to Or gate 118 respectively comprise the true output terminal of the Multiply function flip-flop, the Divide function flip-flop, and the Square Root function flip-flop. It has been indicated that the Preset, Forward Space, Backspace, and $K_y$ flip-flops are connected differently from the various other function flip-flops. These connections included connecting the output of gate 104 through an inverter 117 and differentiator circuit 119 to the input of an Or gate 121A along with the conductor connected through the Preset key to the potential source 102. The output of Or gate 121A is connected to the set input terminal of the Preset function flip-flop. The reset input terminal is connected through a differentiator circuit to the true output terminal of a logic flip-flop $L_1$ to be described.

The effect of coupling the output of gate 104 through the inverter 117 and differentiator 119 to the input of gate 121A, is to cause the Preset flip-flop to be set after the completion of each operation other than Forward Space, Backspace, Numeric key, and Preset. Completion of an operation is indicated by the generation of the clear signal from gate 110 which resets all function flip-flops other than the Preset function flip-flop. Resetting of the function flip-flops causes the output of gate 104 to change to thereby set the Preset function flip-flop if any of the function flip-flops other than FS. BS, $K_y$, or PS had been set. It is desirable to initiate a preset operation after other operations, e.g., add, in order to set the control counter to the state which will properly position the initial digit of a subsequent number to be entered.

The true output terminals of the Preset, Forward Space, Backspace and $K_y$ flip-flops are all connected to the input of Or gate 123A whose output is connected to the input of Or gate 109. The output of Or gate 109 is connected to the reset input terminals of flip-flop 116 and the flip-flops of the cycle counter.

Connected to the potential source 102 is an interlock circuit 120 which permits actuation of only one of the function and $K_y$ flip-flops at a time. The interlock circuit controls the potential source 102 so as to effectively reduce the level provided by the source 102 when one of the function or $K_y$ flip-flops is set so that until that flip-flop is cleared, subsequent actuation of one of the numeric or function keys will have no effect.

Figure 8:
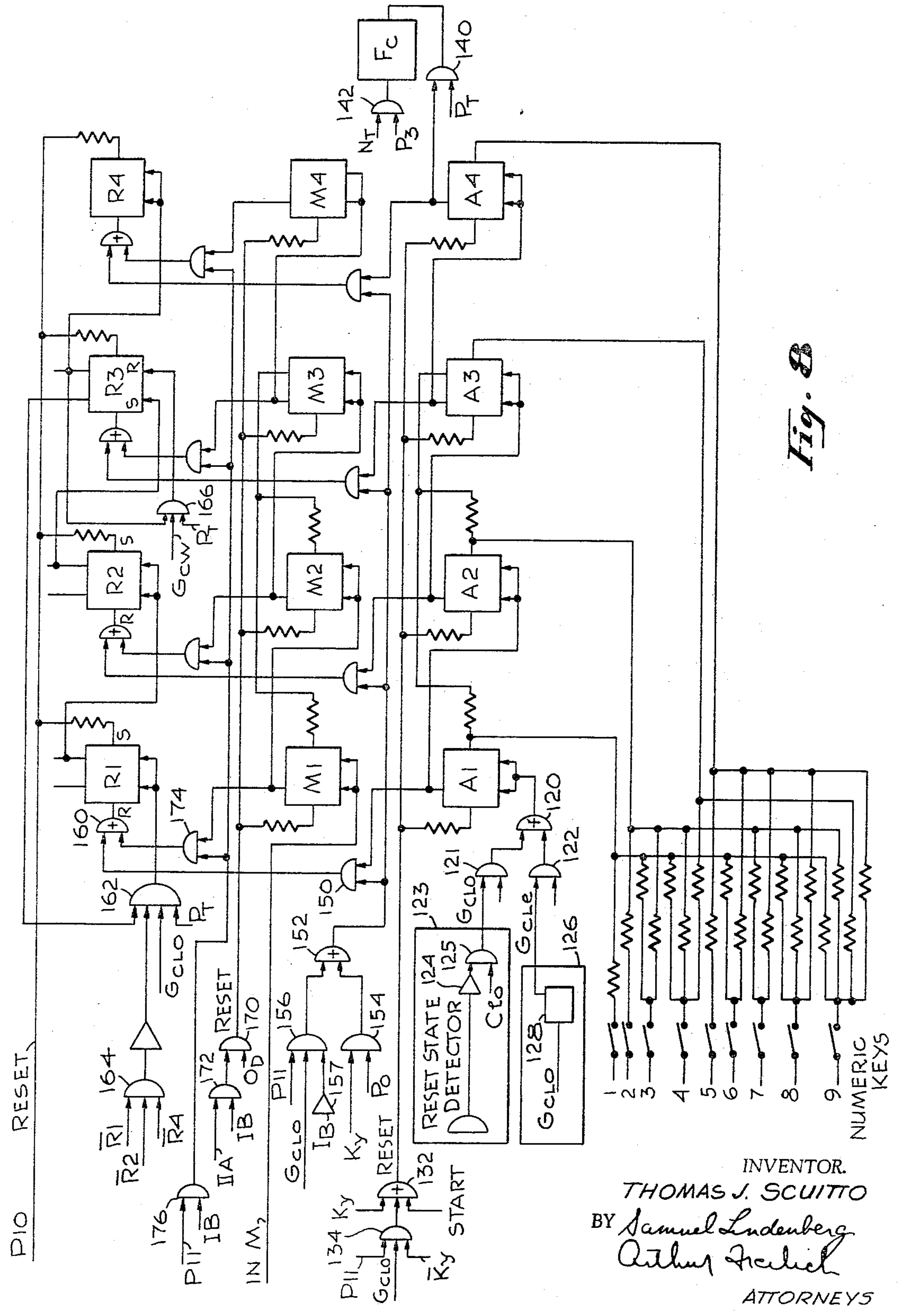
FIGURE 8 is a block schematic diagram of the R, M, and A decade counters of FIGURE 1 and the circuit interconnections therebetween.

Attention is now called to FIGURE 8 of the drawings which illustrates the previously referred to R, M, and A decade counters and the interconnections therebetween. Each of the decade counters consists of four flip-flop stages, the flip-flop circuits being substantially similar to the circuit of flip-flop B1. Connected by encoding resistors to the set input terminals of the A counter flip-flops are the numeric keys. In response to the actuation of any one of the numeric keys, the A counter flip-flops are set according to Table V.

*Table V*

| Count | A4 | A3 | A2 | A1 |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 1 | 1 |
| 5 | 1 | 0 | 0 | 0 |
| 6 | 1 | 0 | 0 | 1 |
| 7 | 1 | 0 | 1 | 0 |
| 8 | 1 | 0 | 1 | 1 |
| 9 | 1 | 1 | 1 | 1 |

Note for example that numeric key 1 is connected only to the set input terminal of flip-flop A1. Note that numeric key A3 is connected through resistors to the set input terminals of both flip-flop A1 and flip-flop A2. Note for example that numeric key 5 is connected through a resistor to the set input terminal of flip-flop A4 and that numeric key 8 is connected through resistors to the set input terminals of flip-flops A1, A2, and A4.

In addition to the A counter comprising a register which can be loaded by the numeric keys, it comprises a counter useful for performing arithmetic operations. The false output terminals of each of counter stages A1, A2, and A3 are respectively connected to the clock input terminals of stages A2, A3, and A4. The true output terminal of stage A3 is connected through a pair of resistors to the set input terminals of stages A1 and A2.

The output of an Or gate 120 is connected to the clock input terminals of stage A1. The two inputs to gate 120 are respectively derived from And gates 121 and 122. A first input to gate 121 is derived from a source 123 of odd gated clock signals $G_{clo}$. The source 123 includes the reset state detector which is connected through inverter 124 to the input of gate 125. The second input to gate 125 is derived from clock track output amplifier $C_{lo}$. The second input to gate 121 is derived from different elements of the calculator apparatus during different operations. In order to facilitate the understanding of the operation of the calculator, each of these operations will be considered separately below and at that time a clearer understanding of the elements connected to the second input of And gate 121 will be developed.

Connected to a first input of gate 122 is the output of a source 126 of even gated clock signals $G_{cle}$. The source 126 includes a one shot multivibrator 128. Connected to the reset input terminal of the one shot multivibrator 128 is the output of gate 125. Application of the odd gated clock signal to the reset input terminal of the one shot multivibrator 128 causes it to momentarily shift to a false condition from which it will subsequently switch to a true condition a predetermined interval later. The transition of the multivibrator 128 to a true condition constitutes the even gated clock signal $G_{cle}$. The delay of the one shot multivibrator is established such that a signal $G_{cle}$ is developed in the middle of the period defined between successive signals $G_{clo}$. It should be apparent that the signals $G_{clo}$ are generated in synchronism with the pulse read from the memory clock track at all times other than when the cycle counter 54 is in a reset state. The second input to gate 122 is generally derived from the accumulator register output amplifier $A_0$ and will be discussed in greater detail below.

Connected to the reset input terminal of each of the flip-flops of the A counter is the output of an Or gate 132. A first input to the Or gate 132 comprises the true output terminal of the previously mentioned $K_y$ flip-flop. A second input to the Or gate 132 is derived from the output of an And gate 134. A first input to the And gate 134 is derived from gate 74 developing the signal P11. The second input to the And gate 134 is derived from source 123 developing the signal $G_{clo}$ and the third input is connected to the false output terminal of the flip-flop $K_y$. A third input to the Or gate 132 comprises a start signal derived from the multivibrator 105 (FIGURE 7).

A carry flip-flop $F_c$ is provided for the purpose of sensing a count greater than nine in the A counter. Connected to the set input terminal of the carry flip-flop is the output of an And gate 140. A first input to the And gate 140 comprises the false output terminal of flip-flop A4 and a second input thereto comprises the output of gate 76 of FIGURE 3(*b*) developing the signal $P_t$. Connected to the reset input terminal of the flip-flop $F_c$ is the output of an And gate 142. A first input to the And gate 142 comprises the output of gate 77 developing the signal $N_t$ and a second input thereto comprises the output of gate 69 developing the signal P3.

Whereas the A counter is an incrementing counter, the R counter is a decrementing counter. That is, instead of normally coupling transitions from one to zero from a less to a more significant stage, transitions from zero to one are coupled from each stage to the immediately more significant stage. Note that the true output terminals of flip-flops R1, R2, and R3 are coupled to the clock input terminal of the immediately more significant stage. A reset line connected to the output of the gate 72 in FIGURE 3(*b*) developing the signal P10 is connected to the set input terminal of each of the flip-flop stages of the R counter to permit resetting to force the R counter to an all "1's" state. Transfers from the A to the R register are effected through And gates 150. In order to transfer information directly from the incrementing A counter to the decrementing R counter without generating any carries in the R counter, transfers are effected when all the stages of the R counter are set to "1's" and "0's" are transferred in parallel. Transfer through the And gates 150 is effected by connecting the false output terminals of each of the A counter flip-flops to the input of a different one of the And gates 150. A second input to each of the And gates 150 is connected to the output of an Or gate 152. A first input to the Or gate 152 is derived from the output of an And gate 154. A first input to the And gate 154 is connected to the true output terminal of the flip-flop $K_y$ and a second input to the And gate 154 is connected to the output of the gate 64 of FIGURE 3(*b*) developing the signal $P_0$. A second input to the Or gate 152 is derived from the And gate 156. A first input to the And gate 156 is derived from the gate 74 of FIGURE 3(*b*) developing the signal P11. A second input to the And gate 156 is derived from source 123 developing the signal $G_{clo}$. A third input to the And gate 156 is derived from the IB state detector applied through inverter 157. That is, so long as the cycle counter is in a state other than IB, the third input to the And gate 156 will be true. The output of And gate 150 is connected to the input of an Or gate 160 whose output in turn is connected to the reset input terminal of an R counter flip-flop corresponding in position to the A counter flip-flop connected to the And gate 150 associated therewith.

Connected to the clock input terminals of flip-flop R1 is the output of And gate 162. The inputs to And gate 162 comprise the outputs of source 123 ($G_{clo}$), the output of gate 77 ($P_t$), the false output terminal of stage R3 and the inverted output of gate 64 which functions to indicate when the R counter defines state "0." The output of gate 166 is connected to reset clock input terminal of stage R3. Along with the output from source 123 and 77, the true output terminal of stage R3 is connected to the input of gate 166.

From what has been said of FIGURE 8 thus far, it should be apparent that numeric information can be entered into the A counter by virtue of the actuation of the numeric keys and in addition a count can be entered into the A counter by And gates 121 and 122 developing pulses which are applied to the clock input terminals of flip-flop A1. Whatever information is stored in the A counter is transferred through And gates 150, "0's" in parallel, to the R counter flip-flops at times determined by the input terms to the And gates 154 and 156. The signals applied through gates 162 and 166 to the clock input terminals of flip-flops R1 and R3 respectively cause the count in the R counter to be decremented. The R counter follows the same "State" table as the A counter, but in reverse. The clock inputs to the stage R1 are gated by the state of stage R3 such that R1 and thus R2 do not receive counts when R3 is true. The reset clock input terminal of stage R3 is connected to the output of gate 166 so that stage R3 will be reset on the next clock signal $G_{clo}$ after it comes true. After the R counter reaches zero, further counting is inhibited by gate 64.

The M counter is constructed similarly to the A counter and it defines the same states as shown in Table V. It is also an incrementing counter containing four flip-flop stages with the stage interconnections being the same as in the A counter. Connected to the clock input terminals of flip-flop M1 is a conductor identified in FIGURE 8 merely as "IN M." As was the case with the input signals applied to the clock input terminals of flip-flop A1, the input signals applied to the clock input terminals of flip-flop M1 are different during different operations of the calculator apparatus. Consequently, in order to facilitate an explanation of the invention, a discussion of the signals provided to the clock input terminal of flip-flop M1 will be deferred until the various calculator operations are individually discussed. The M counter reset is derived from the output of And gate 170. One input to And gate 170 comprises the output of gate 80 for developing the origin signal. A second input to the And gate 170 is developed by the Or gate 172 whose inputs respectively comprise the output of state detectors IA and IIA. Transfer between the M counter and the R counter is effected through And gates 174. Consequently, the false output terminals of the flip-flops M1, M2, M3, and M4 are each connected to the input of a different one of the And gates 174. A second input to each of the And gates 174 is derived from the output of And gate 176. A first input to And gate 176 is developed by the gate 74 of FIGURE 3(*b*) developing the signal P11. A second input to the And gate 176 is developed by the state detector IB. As was the case with transfers between the A counter and R counter, "0's" are transferred in parallel between the M counter and R counter.

Figure 9:
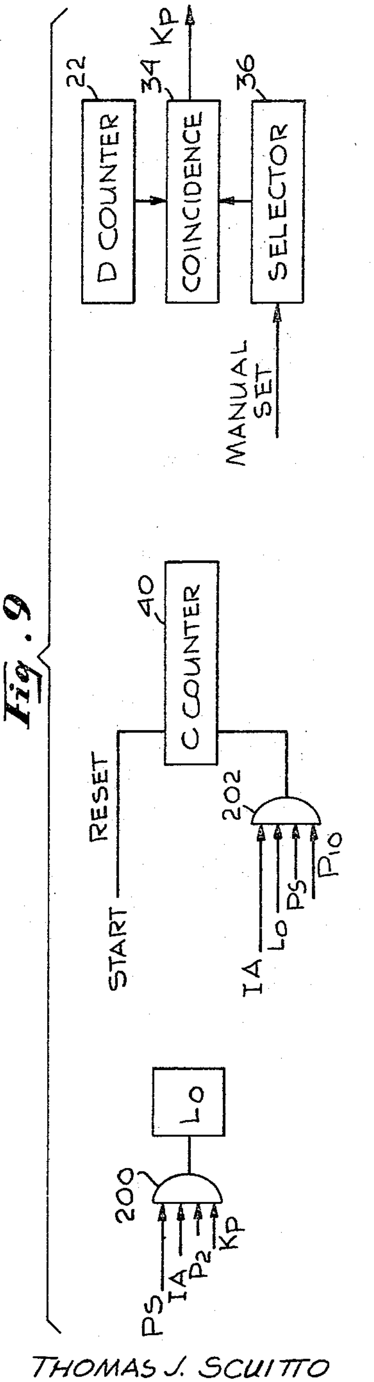
FIGURE 9 is a block schematic diagram illustrating the portions of the calculator apparatus responsive to the actuation of the "preset" key for setting the control (C) counter.

Attention is now called to FIGURE 9 which illustrates the portion of the calculator apparatus utilized to preset the C counter 40 to a desired state. For this purpose, a logic flip-flop $L_0$ and an And gate 200 whose output is coupled to the reset input terminal of the flip-flop $L_0$, are provided. Both the flip-flop $L_0$ and the gate 200 form part of the logic network 42 of FIGURE 1. In order to preset the C counter 40 to a desired state, the Preset function key is actuated which in turn sets the Preset function flip-flop. The setting of the Preset function flip-flop causes Or gate 103 to provide a true output signal which in turn generates a start signal thereby resetting the C counter 40. The true output signal provided by the Or gate 123A causes the cycle counter 54, upon the generation of the next origin signal, to switch from the reset state to state IA. State detector IA is connected to the input of And gate 202 whose output is connected to the clock input terminals of the least significant stage of the control counter 40. In addition, the true output terminal of the logic flip-flop $L_0$ is connected to the input of the And gate 202. Further, the true output terminal of the Preset function flip-flop is connected to the input of the And gate 202 along with the output of gate 72 of FIGURE 3(*b*) providing signal P10. Consequently, during each digit period after the generation of the origin signal $O_d$ and subsequent to the actuation of the Preset key, the control counter 40 will be incremented by one count. The incrementing of the control counter 40 will continue so long as the logic flip-flop remains true. The logic flip-flop will be reset when And gate 200 provides a true signal to its reset input terminal. A first input to the And gate 200 is derived from the true output terminal of the Preset function flip-flop. A second input to the And gate 200 is derived from the state detector IA, a third from gate 68 which develops signal P2 and a fourth input from the coincidence circuit 34 which develops coincidence signals $K_p$ indicating coincidence between the state of the D counter 22 and the preset selector portion of the selector circuit 36, it being recalled that the Preset function flip-flop is set.

In summary, in response to the actuation of the Preset key and the manual setting of a number into the preset selector portion of circuit 36, the control counter 40 will initially be reset and then will subsequently count up in synchronism with the D counter 22. When coincidence between the D counter 22 and the selector circuit 36 is recognized, the application of incrementing signals to the C counter 40 will be terminated leaving the C counter 40 in a state equal to that manually set into the preset selector portion of circuit 36.

Figures 10, 11, 12:
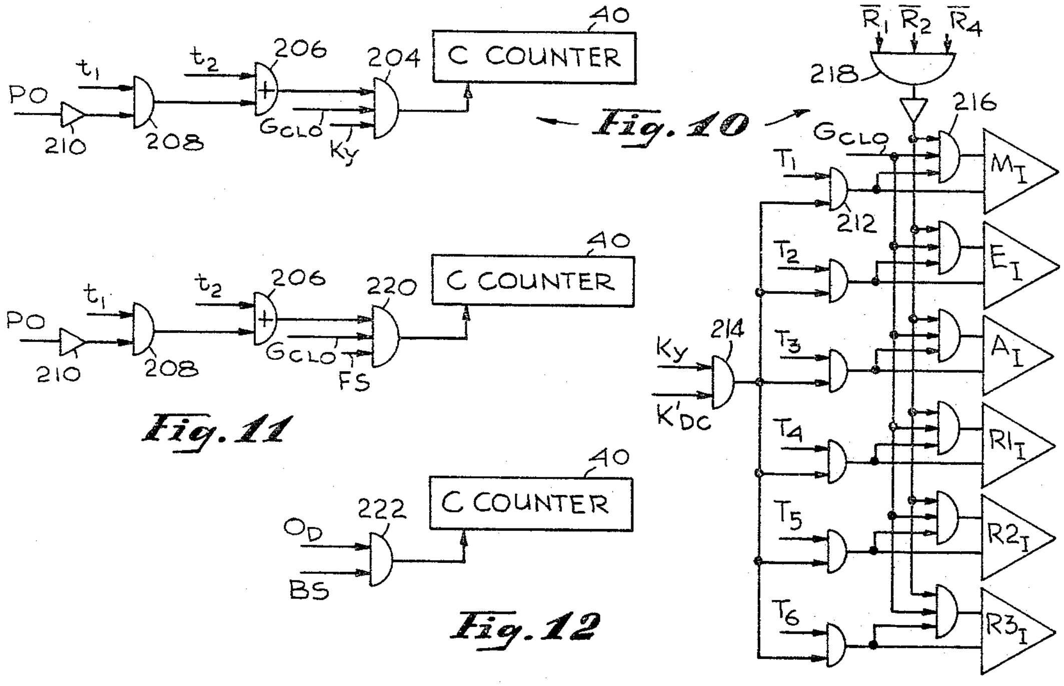
FIGURE 10 is a block schematic diagram illustrating the portions of the calculator apparatus responsive to the actuation of one of the numeric keys for entering information into a selected one of the memory registers.
FIGURE 11 is a block schematic diagram illustrating the portions of the calculator apparatus responsive to the actuation of the "forward space" key.
FIGURE 12 is a block schematic diagram illustrating the portions of the calculator apparatus responsive to the actuation of the "backspace" key.

Attention is now called to FIGURE 10 which illustrates the portions of the calculator apparatus utilized to enter numbers into any one of the memory registers. In order to enter a number into a selected register, one of the "to" register keys has to be actuated and in addition a numeric key for each digit to be entered has to be actuated. The initial digit entered will be placed in a position determined by the state of the C counter. The state of the C counter of course can be preset by operation of the apparatus of FIGURE 9. In the apparatus of FIGURE 10, in response to the entry of each digit, the C counter will be decremented by one so that successively less significant digits can be entered into the selected register.

The C counter 40 is a scale of 24 counter consisting of five flip-flop stages, each stage being similar in construction to the previously discussed flip-flop B1. Inasmuch as the C counter 40 is an incremental counter in order to decrement it by one, after an initial digit has been entered into a register digit sector, twenty-three incrementing pulses can be applied thereto. Twenty-three incrementing pulses are provided by And gate 204. A first input to And gate 204 is derived from the true output terminal of flip-flop $K_y$ and a second input is derived from the And gate 122 providing signal $G_{clo}$. A third input to And gate 204 is connected to the output of Or gate 206. A first input to Or gate 206 is derived from the output of gate 79 of FIGURE 4(*b*) which develops signal $t_2$ and a second input is derived from the output of And gate 208. A first input to the And gate 208 is connected to the output of gate 78 of FIGURE 4(*b*) which develops the signal $t_1$ and a second input is connected to the output of inverter 210 whose input is connected to gate 64 of FIGURE 3(*b*) developing the signal P0. Consequently, during states 24 and 25 of the D counter, 23 successive pulses will be developed by Or gate 206. That is, signal $t_2$ will be true for 12 clock pulses and the output of And gate 208 will be true for eleven clock pulses. More particularly, the output of gate 208 will be false only during the bit period in which signal P0 is developed.

From what has been said of FIGURE 10 thus far, it should be apparent that for each actuation of a numeric key, the flip-flop $K_y$ will be set and the control counter 40 will be decremented by one. In accordance with the previously described FIGURE 8, in response to a numeric key being actuated, a digit will be entered into the A counter representative of the value of the numeric key actuated. In response to the development of signal P0 after the entry of the digit into the A counter, it will be transferred into the R counter as previously described. Thence, the R counter will be decremented by one count in response to each generation of the signal $G_{clo}$. By enabling the appropriate register input amplifier during the digit period identified by the state of the C counter, for so long as the R counter is in a non-zero state, an appropriate number of pulses will be recorded in the proper memory register digit sector.

Each of the register input amplifiers, as shown in FIGURE 10, is provided with an upper and lower input terminal. The application of a signal to the lower input terminal enables the input amplifier and permits a pulse to be recorded in the register each time a pulse is applied to the upper input amplifier terminal. If no pulses are applied to the upper input amplifier terminal, the effect of enabling the lower input amplifier terminal is to erase that which was previously recorded on the memory register. Connected to the lower input terminal of each of the input amplifiers is the output of a different And gate 212. A first input to each of the And gates 212 is connected to the output of an And gate 214. A first input to the And gate 214 is connected to the true output terminal of the flip-flop $K_y$, a second input is connected to the flip-flop 90 of FIGURE 6 which develops the signal $K'_{DC}$. A second input to each of the And gates 212 comprises the true output terminal of a different one of the "to" register flip-flops.

Consequently, in response to the actuation of one of the numeric keys, the flip-flop $K_y$ is set. In response to sensing coincidence between the C and D counters, the And gate 214 will provide an enabling signal to each of the And gates 212. The And gate 212 connected to the true output terminal of the set "to" register flip-flop will provide an output signal to the lower input terminal of its associated input amplifier. In order to then record the R counter count in the register associated with the enabled input amplifier, the output of a different one of a plurality of And gates 216 is connected to the upper input terminal of each of the input amplifiers. Signal $G_{clo}$ is applied to the input of each of the And gates 216 along with the inverted output of an And gate 218. The inputs to And gate 218 comprise the false output terminals of each of the flip-flop stages R1, R2, R4 of the R counter. That is, the And gate 218 functions to sense the zero state of the R counter. The third input to each of the And gates 216 is connected to the output of the associated And gate 212.

Thus, it should be apparent that actuation of one of the "to" register flip-flop keys selects one of the And gates 212. The generation of the coincidence signal $K'_{DC}$ enables the selected gate 212 when the appropriate digit sector moves into position beneath the head associated with the register input amplifiers. Thence, a number of pulses are recorded in the digit sector equal to the number stored in the R counter at the beginning of the digit period.

Attention is now called to FIGURE 11 which illustrates the hardware responsive to the actuation of the Forward Space function key. The effect of actuating the Forward Space function key is to decrement the control counter 40 by one count to thereby effectively permit a different digit sector to be selected for the purpose of utilizing or modifying the digit stored therein. The C counter 40 is decremented in the same manner as it was decremented in FIGURE 10. That is, by applying 23 pulses thereto. For this purpose, an And gate 220 is provided. A first input to the And gate 220 is connected to the output of previously mentioned Or gate 206. A second input to the And gate 220 is connected to a source of signal $G_{clo}$ and a third input is connected to the true output terminal of the function flip-flop FS which of course is set in response to the actuation of the Forward Space key.

Attention is now called to FIGURE 12 which illustrates the hardware responsive to the actuation of the Backspace key. The backspace operation involves merely incrementing the C counter 40. Since the C counter 40 is an incrementing counter, it is merely necessary to apply a single pulse to the clock input terminal of the first stage thereof. This single pulse is derived from the output of the And gate 222. A first input to And gate 222 is derived from the And gate 80 of FIGURE 4(*b*) which develops the origin signal $O_d$ and a second input is derived from the true output terminal of the function flip-flop BS which is set in response to the actuation of the Backspace key.

Figure 13:
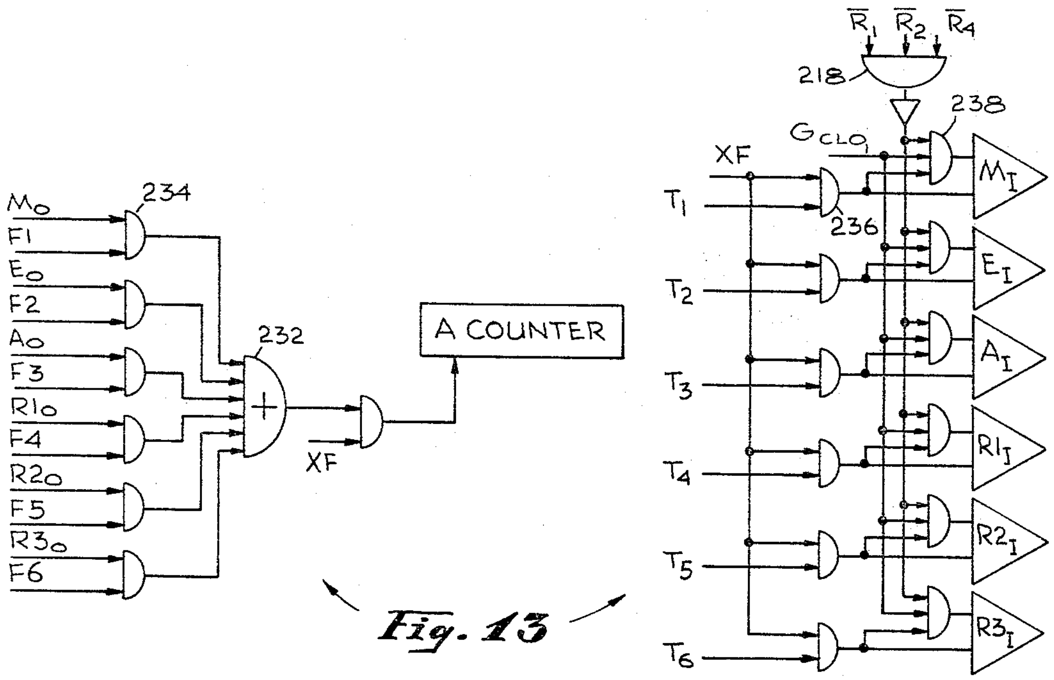
FIGURE 13 is a block schematic diagram illustrating the portions of the calculator apparatus responsive to the actuation of the "transfer" key.

Attention is now called to FIGURE 13 which illustrates the hardware responsive to the actuation of the Transfer function key. In conjunction with actuating the Transfer function key, it is necessary to actuate one of the "from" register keys and one of the "to" register keys. As previously noted, all of the information entered into any of the registers is derived from the R counter. Information is entered into the R counter from either the M counter or A counter. For the transfer operation, the information is initially transferred from the register identified by the actuated "from" register key to the A counter from which it is transferred to the R counter and thence into the register identified by the actuated "to" key. Entry into the A counter is accomplished through And gate 230 which is enabled by the true output terminal of function flip-flop XF which is set in response to the actuation of the Transfer function key. A second input to the And gate 230 is connected to the output of Or gate 232. Or gate 232 is provided with six inputs each of which is connected to the output of a different one of the And gates 234. The inputs to a first of the And gates 234 comprises the output of register output amplifier $M_0$ and the true output terminal of the "from" register flip-flop F1. Similarly, the inputs to the second flip-flop 234 comprise the output of the output amplifier $E_0$ and the true output terminal of the register flip-flop F2. The inputs to the third And gate 234 comprise the output of the output amplifier $A_0$ and the true output terminal of register flip-flop F3. Similarly, the pairs of input terminals of the other And gates 234 are respectively derived from the output of the output amplifier $R1_0$ and the true output terminal of flip-flop F4, the output of the output amplifier $R2_0$ and the true output terminal of flip-flop F5, and the output of the output amplifier $R3_0$ and the true output terminal of flip-flop F6. Thus, it is apparent that as each digit sector on the selected register moves under the head associated with its register output amplifier, its digit value will be read into the A counter. It will be recalled that a digit is read into the A counter from a register in a pulse counting manner. That is, assuming a digit being read from a sector has the value 5 five pulses, each in synchronism with the signal $G_{clo}$, will be provided by the Or gate 232 and passed through the And gate 230. The A counter will thereby count up to five. The A counter will be reset in response to the development of signal P11 as will be recalled from FIGURE 8. Also, in response to the development of signal P11, the contents of the A counter will be transferred into the R counter which was reset to an all "1's" state, in response to the development of the signal P10. Thereafter, the R counter will be decremented to provide a number of pulses equal to the counter stored therein. These pulses can be entered into the register input amplifiers in the same manner as information was written on to the memory register tracks in FIGURE 10. That is, the output of each of the plurality of And gates 236 is connected to a lower input terminal of a different one of the input amplifiers. A first input to each of the And gates 236 is connected to the true output terminal of the function flip-flop XF and a second input to the true output terminal of a different one of the "to" register flip-flops. Consequently, for so long as the function flip-flop XF remains true, the selected input amplifier will be enabled to record pulses provided to its upper input terminal. Connected to the upper input terminal of each of the input amplifiers is the output of a different And gate 238. A first input to each of the And gates 238 is derived from the And gate 122 of FIGURE 8 providing the signal $G_{clo}$ and a second input is derived from the output of And gate 218 through an inverter which is true only when the R counter state is not zero. The third input to each of the And gates 238 is connected to the output of a different one of the And gates 236.

Figure 14:
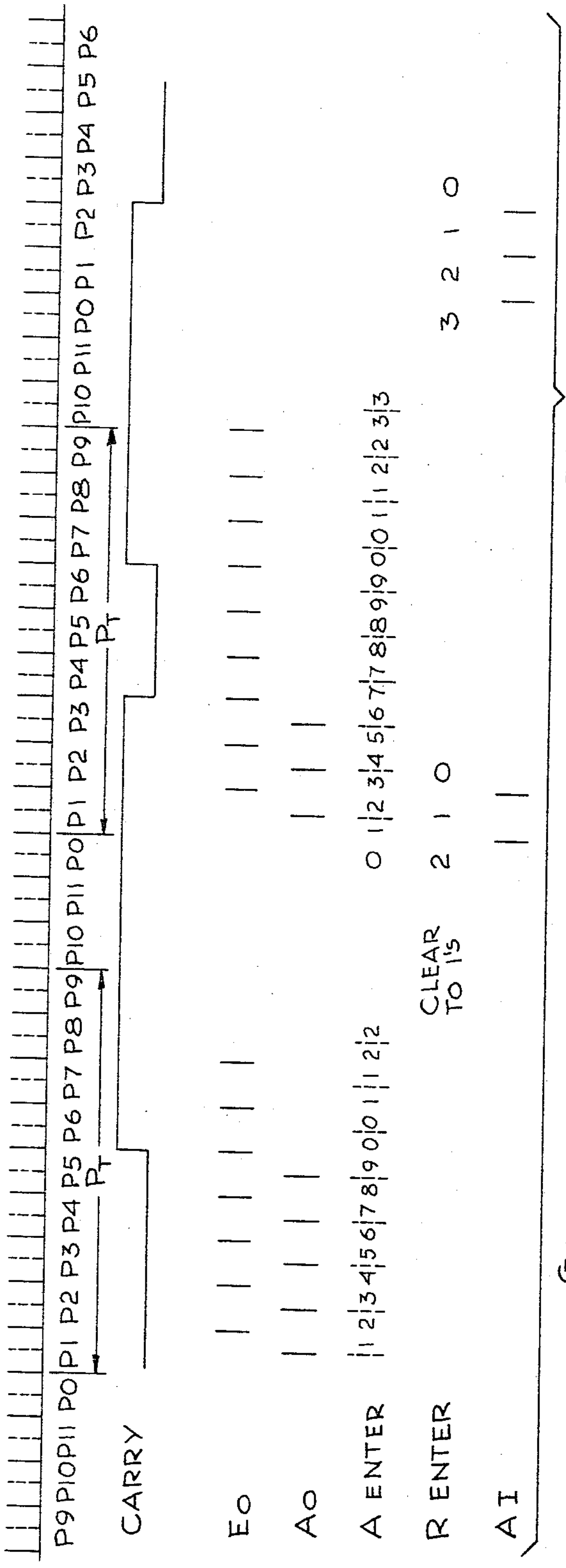
FIGURE 14(*a*) is a block diagram illustrating the portions of the calculator apparatus responsive to the actuation of the "add" key and FIGURE 14(*b*) is a timing chart illustrating the add operation.
Figure 14:
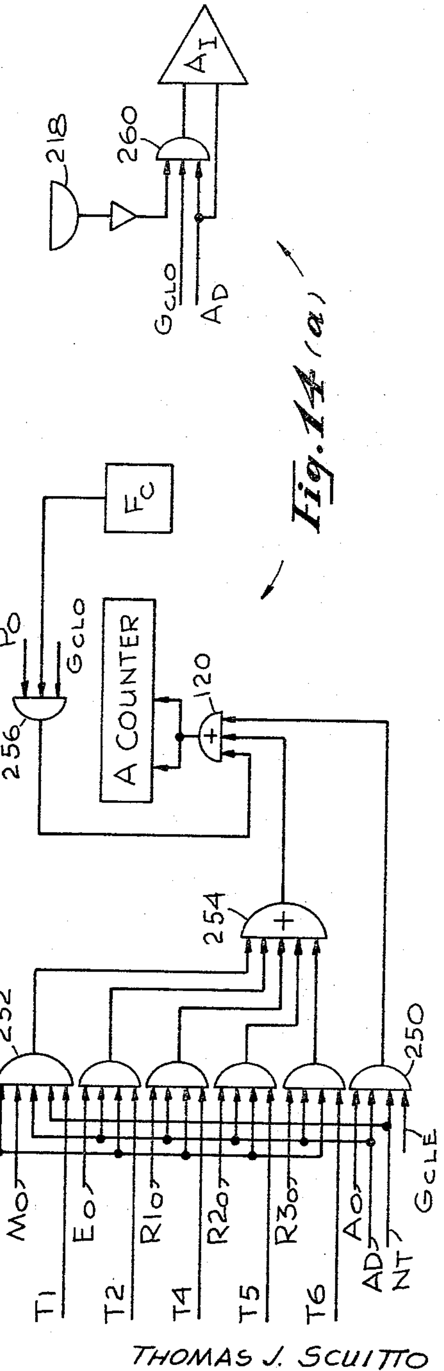

Attention is now called to FIGURE 14(*a*) which illustrates the portions of the calculator apparatus responsive to the actuation of the Add function key. Actuation of the Add function key causes the contents of a designated one of the multiplier-quotient, entry or reserve registers to be added to the contents of the accumulator register with the sum being entered into the accumulator register. A particular one of the registers is designated by actuating the appropriate "to" key. FIGURE 14(*b*) is a timing chart illustrating the addition of the contents of the entry register to the contents of the accumulator register. The example assumed therein refers to an addition of the number 97 stored in the entry register and the number 35 stored in the accumulator register. The adding technique utilized is to alternately apply pulses derived from the output amplifiers $A_0$ and $E_0$ to the clock input terminals of stage 1 of the A counter.

More particularly, an And gate 250 and a plurality of And gates 252 are provided. (Whereas gates 121 and 122 in FIGURE 8 were introduced to generically represent the input to the A counter, gates 250 and 252 are the gates specifically used to perform addition.) The outputs of And gate 252 are connected to the input of Or gate 254 along with the outputs of And gates 250 and 256 is connected to the input of Or gate 120. The output of Or gate 120 is of course connected to the clock input terminals of stage A1 of the A counter.

A first input to And gate 256 is connected to the true output terminal of the carry flip-flop $F_c$, a second input is connected to the output of And gate 64 of FIGURE 3(*b*) developing signal P0 and a third input is connected to the output of source 123 of FIGURE 8 developing the clock signal $G_{clo}$.

And gate 250 effectively applies the contents of the accumulator register to the A counter. The inputs to And gate 250 comprise the signal $G_{cle}$ derived from source 126 of FIGURE 8, the true output terminal of the function flip-flop AD, and the output of And gate 77 of FIGURE 4(*b*) which develops the signal $N_t$ restricting the addition operation to the numeric digit states. The fourth input to And gate 250 is connected to the output of memory register output amplifier $A_0$. Each of And gates 252 is associated with a different one of the register output amplifiers $M_0$, $E_0$, $R1_0$, $R2_0$, and $R3_0$. Thus, the true output terminal of each "to" register flip-flop is connected to the input of an And gate 252 along with the output of the associated register output amplifier, e.g., the true output of flip-flop T1 and the output of amplifier $M_0$ are connected to the input of the same gate 252. Connected to the input of all of the gates 252 are the outputs of source 123 ($G_{clo}$), the Add function flip-flop and gate 77 ($N_t$).

Note in FIGURE 14(*b*) that seven successive pulses are derived from the output amplifier $E_0$ representative of the unit's digit of the number stored in the entry register. Note that five pulses are derived from the output amplifier $A_0$ representing the unit's digit of the number stored in the accumulator register. It is assumed that the carry flip-flop is initially reset. The pulses provided by the output amplifiers $E_0$ and $A_0$ are alternately applied to the A counter so as to cause the state of the A counter to be incremented in the manner illustrated. Note that the fifth pulse derived from the amplifier $E_0$ causes the A counter to overflow, this action setting the carry flip-flop $F_c$ (FIGURE 8), when it occurs while the signal $P_t$ is being developed by the gate 76 of FIGURE 3(*b*). As previously noted, in response to the development of signal P10 by gate 72 of FIGURE 3(*b*), the R counter is cleared to an all "1's" state. In response to the signal $G_{clo}$ occurring while signal P11 is being developed by gate 74 in FIGURE 3(*b*), the contents of the A counter are transferred into the R counter. The R counter is then decremented to enter a number of pulses into the accumulator register input amplifier $A_I$. Note in the timing chart of FIGURE 14(*b*) that a count of two is entered into the R counter during the time signal P0 is developed. Note that the subsequent signal pulses $G_{clo}$ are applied to input amplifier $A_I$. The hardware utilized to transfer the count from the R counter to the accumulator register is illustrated in FIGURE 14(*a*). For this purpose, the true output terminal of the function flip-flop AD is connected to the lower input terminal of the accumulator register input amplifier $A_I$. It is also connected to the input of And gate 260 whose output is connected to the upper input terminal of accumulator register input amplifier $A_I$. Second and third inputs to the And gate 260 comprises the signal $G_{clo}$ and the inverted output of And gate 218 sensing the R counter zero state respectively.

The carry bit developed by the addition of the unit's digits 7 and 5 is transferred into the A counter in response to the signal $G_{clo}$ occurring while signal P0 is being developed by the gate 64 of FIGURE 3(*b*). The carry flip-flop $F_c$ is reset when signal P3 is developed. Thus, it has been shown how two numbers respectively stored in the entry and accumulator registers can be added to one another by a counting technique with the sum being stored in the accumulator register.

Figures 15A, 15B:
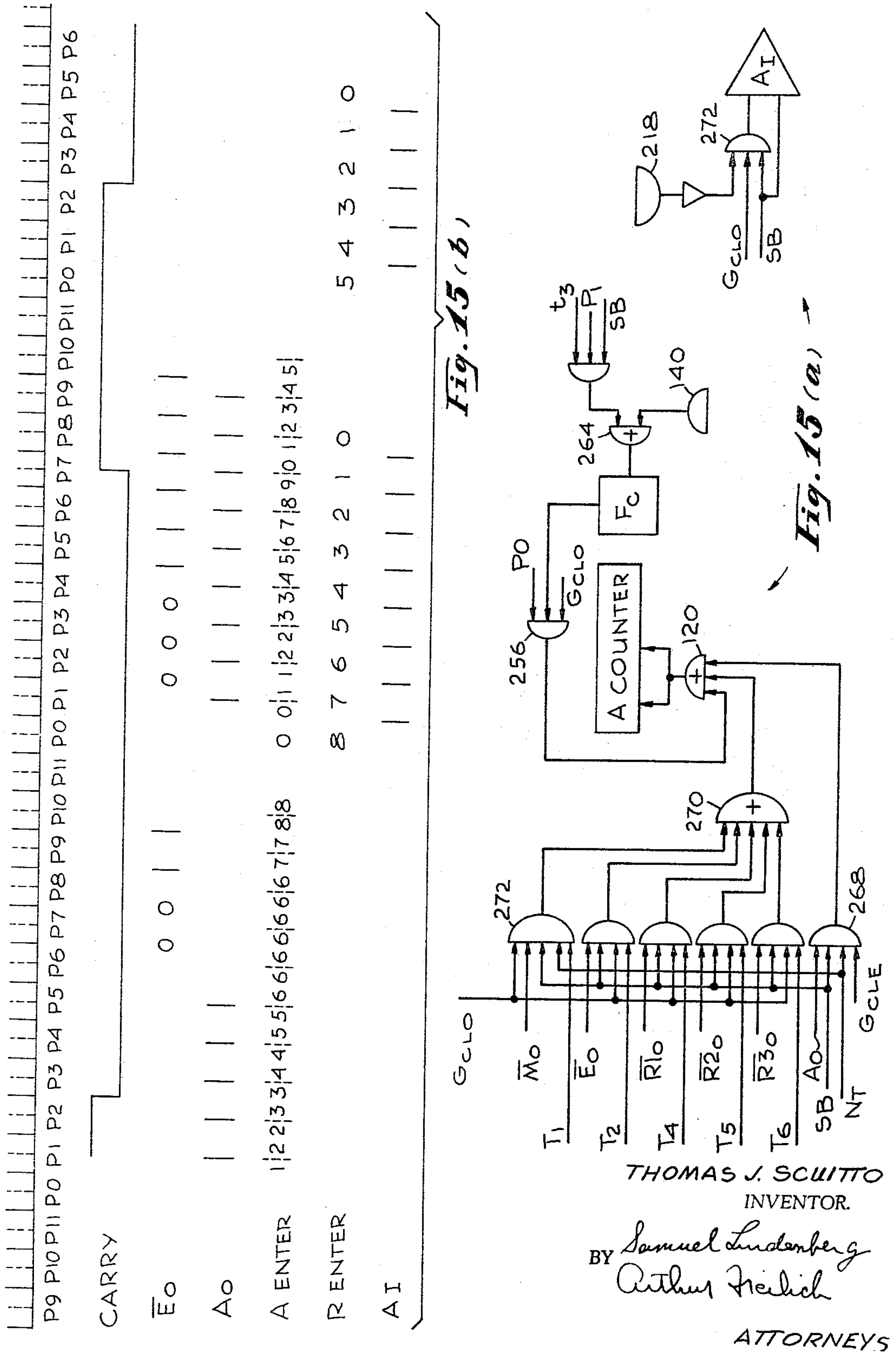
FIGURE 15(*a*) is a block schematic diagram illustrating the portions of the calculator apparatus responsive to the actuation of the "subtract" key and FIGURE 15(*b*) is a timing chart illustrating the subtraction operation.

Attention is now called to FIGURE 15(*a*) which illustrates the portions of the calculator apparatus utilized to subtract the number stored in a designated register from the number stored in the accumulator register and FIGURE 15(*b*) which is a time chart illustrating an exemplary subtraction operation in which a number 37 stored in the accumulator register is subtracted from a number 95 stored in the entry register. The difference resulting from the subtraction is stored in the accumulator register. Briefly, the essence of the subtraction operation herein involves adding the nine's complement of the number in the entry register to the number in the accumulator register according to the addition technique disclosed in FIGURES 14(*a*) and 14(*b*). The nine's complement sum (i.e., the unit's difference digit with respect to the numbers actually stored in the entry and accumulator registers) is corrected by adding one to the unit's digit thereof and this is accomplished by initially setting the carry flip-flop $F_c$ to a "1" state. Note in FIGURE 15(*a*) that this function is performed by applying signal $t_3$ developed by gate 81 in FIGURE 4(*b*) together with the true output terminal of the function flip-flop SB to the input of And gate 262 whose output is coupled to the input of Or gate 264. A second input to Or gate 264 is derived from gate 140 of FIGURE 8. The true output terminal of carry flip-flop $F_c$ is again coupled through And gate 256 to the input of Or gate 120. Second and third inputs to the Or gate 266 comprise the outputs of And gate 268 and Or gate 270. The inputs to Or gate 270 comprise the outputs of And gates 272.

The output of source 128 providing signal $G_{cle}$ is connected to the input of And gate 268 along with the true output terminal of the function flip-flop SB, the output of gate 77 of FIGURE 4(*b*) providing signal $N_t$ and the output of the output amplifier $A_0$. Each of And gates 272 is also provided with the inputs derived from the function flip-flop SB and gate 77. In addition, the signal $G_{clo}$ is applied to the input of each of gates 272. Each of gates 272 is associated with a different one of the registers. Thus, a first gate 272 has inputs derived from "to" flip-flop T1 and the complement of output amplifier $M_0$.

Note in the example of FIGURE 15(*b*) that the A counter sums the initial correction carry and the contents of the accumulator register and the complement of the contents of the entry register. In response to the signal $G_{clo}$ occurring while signal P11 is developed, the contents of the A counter are transferred to the R counter and the subsequent generation of signals $G_{clo}$ decrements the R counter and enters pulses into the accumulator register input amplifier. Note in FIGURE 15(*a*) that the true output terminal of the function flip-flop SB is connected to the lower input terminal of the accumulator register input amplifier. Additionally, this true output terminal is connected to the input of And gate 272 along with the source of signal $G_{clo}$ and the inverted output of And gate 218 responsive to a zero state of the R counter.

Thus, from FIGURES 15(*a*) and 15(*b*), it should be apparent that a subtraction operation can be performed in substantially the same manner as an addition operation merely by utilizing the complement of the contents of a register designated by actuation of the appropriate "to" key. It should further be apparent that one digit from each of the entry and accumulator registers is handled during each digit period and as a consequence 24 digit numbers in the accumulator register and any other designated register can be added to or subtracted from one another in one memory cycle.

Figure 16:
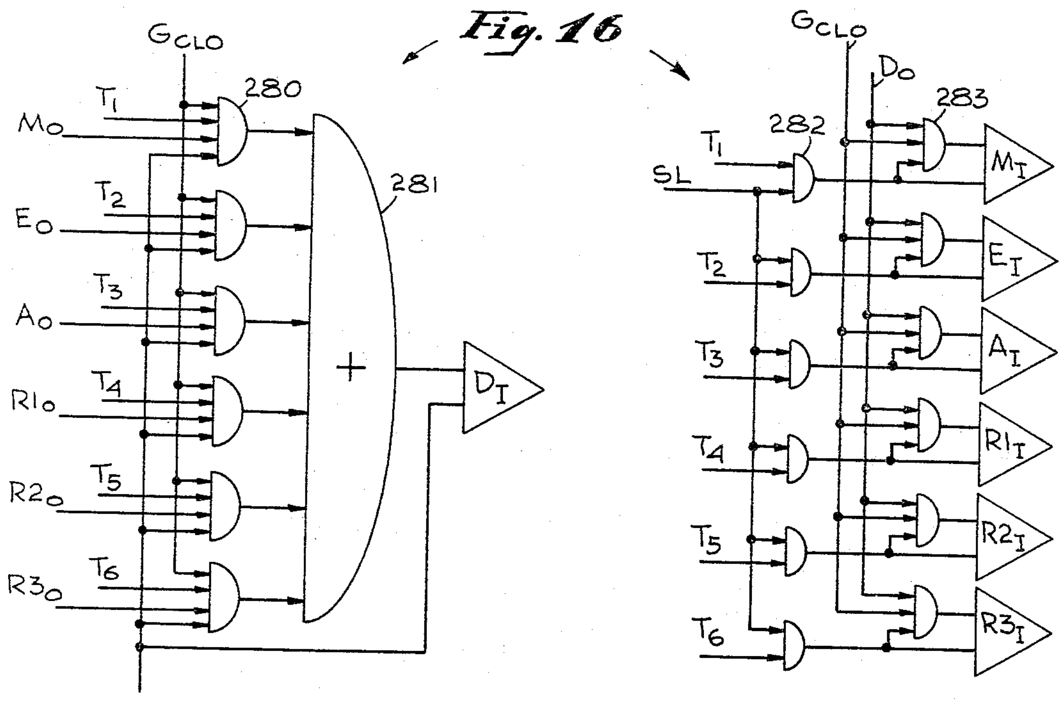
FIGURE 16 is a block schematic diagram illustrating the portions of the calculator apparatus responsive to the actuation of the "shift left" key.

Attention is now called to FIGURE 16 which illustrates the portions of the calculator apparatus responsive to the action of the Shift Left function key. The orientation of the heads associated with the output and input amplifiers in FIGURE 2 should now be recalled. Note that the heads associated with the delay track input amplifier $D_I$ is spaced two digit sectors ahead of the head associated with the delay track output amplifier $D_0$. Consequently, information recorded on the delay track can be read out two digit times after it was read in. Note that the heads respectively associated with each of the register output and input amplifiers, e.g., $A_0$ and $A_I$, are spaced by one digit sector. Consequently, if information is read out of a register, and onto the delay track, and subsequently read out of the delay track and back into the register, the effect will be to place that information one digit sector later than where it had been prior to having been transferred to and from the delay track.

The hardware utilized to perform this shift left operation entails connecting the true output terminal of the function flip-flop SL to the lower input terminal of the input amplifier $D_I$ and to the input of each of a plurality of And gates 280 whose outputs are connected through Or gate 281 to the upper input terminal of the input amplifier $D_I$. Second and third inputs to each of the And gates 280 comprise the output of a different register output amplifier, e.g., $A_0$ and the true output of an associated "to" flip-flop. Thus, e.g., the outputs of amplifier $A_0$ and flip-flop $T_3$ are connected to the input of one of gates 280. The output ($G_{clo}$) of source 123 is connected to the input of each of gates 280. This hardware transfers the information on the register track designated by the set "to" flip-flop to the delay track.

The information is transferred from the delay track back to the accumulator track by the remaining hardware illustrated in FIGURE 16 including the plurality of gates 282 and plurality of gates 283. Connected to the input of each of gates 282 is the true output of a different "to" flip-flop along with the true output of the function flip-flop SL. The output of each of gates 282 is connected to the lower input terminal of a different register input amplifier and to the input of a different And gate 283. The outputs of source 123 ($G_{clo}$) and the delay track output amplifier are also connected to the input of each gate 123. The output of each gate 123 is in turn connected to the upper input terminal of a different one of the register input amplifiers.

Figure 17:
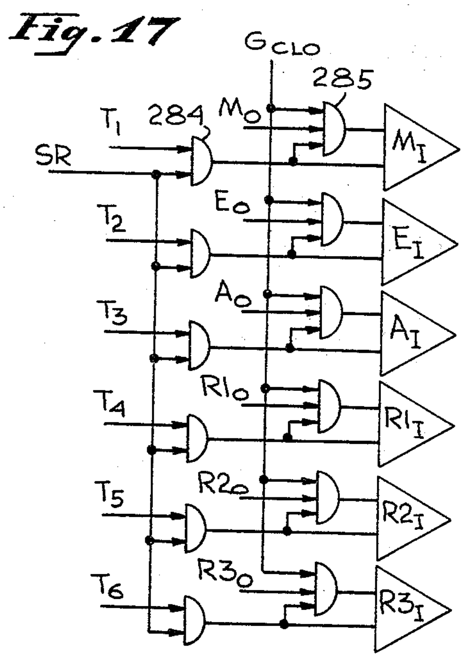
FIGURE 17 is a block schematic diagram illustrating the portions of the calculator apparatus responsive to the actuation of the "shift right" key.

Attention is now called to FIGURE 17 which illustrates the apparatus for shifting information in any designated register one digit sector to the right in response to the actuation of both the Shift Right key and one of the "to" keys designating a particular register. Since the head associated with each register output amplifier, e.g., $A_0$ leads the head associated with the corresponding input amplifier, i.e., $A_I$ by one digit sector, information can be shifted right so that the information appears one digit time earlier, by merely transferring read information directly from the output amplifier to the input amplifier. This is accomplished by the apparatus of FIGURE 17 which couples the true output terminal of function flip-flop SR to the input of each of a plurality of And gates 284. The true output terminal of each "to" flip-flop is connected to the input of a different one of gates 284. The output of each And gate 284 is connected both to the lower input terminal of a register input amplifier associated therewith and to the input of a different one of And gates 285. The second and third inputs to each And gate 285 are respectively derived from the output of a different register output amplifier and the output of the source of signal $G_{clo}$.

Figure 18:
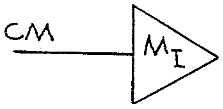
FIGURE 18 is a block schematic diagram illustrating the portions of the calculator apparatus responsive to the actuation of the "clear multiplier-quotient (M) register" key.
Figure 19:
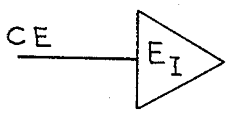
FIGURE 19 is a block schematic diagram illustrating the portions of the calculator apparatus responsive to the "clear entry (E) register" key.
Figure 20:
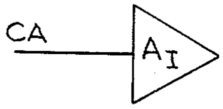
FIGURE 20 is a block schematic diagram illustrating the portions of the calculator apparatus responsive to the actuation of the "clear accumulator (A) register" key.
Figure 21E:
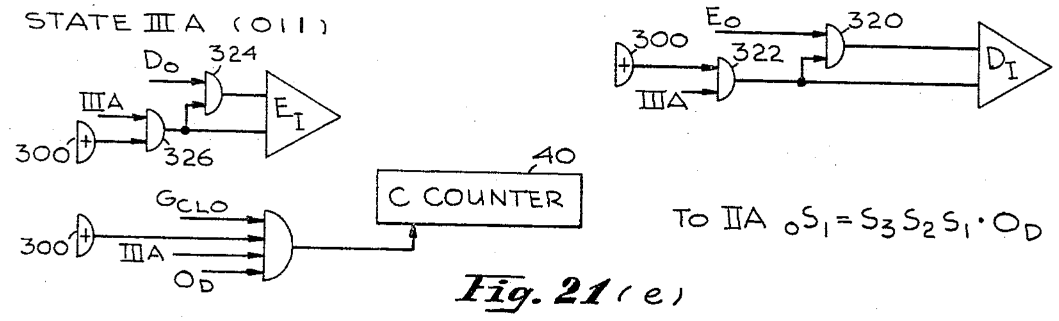
FIGURE 21(*a*) is a flow diagram illustrating the sequence of cycle (S) counter states utilized in the performance of multiplication and FIGURES 21(*b*)–(*i*) illustrate the portions of the calculator apparatus active in each of these states.
Figure 21F:
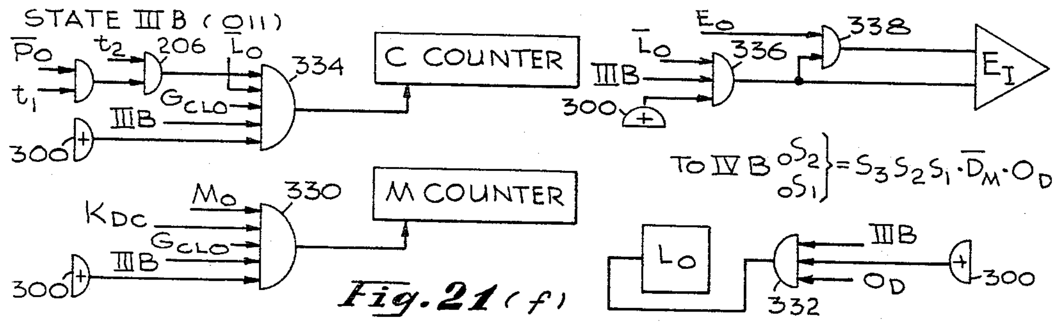
Figure 21G:
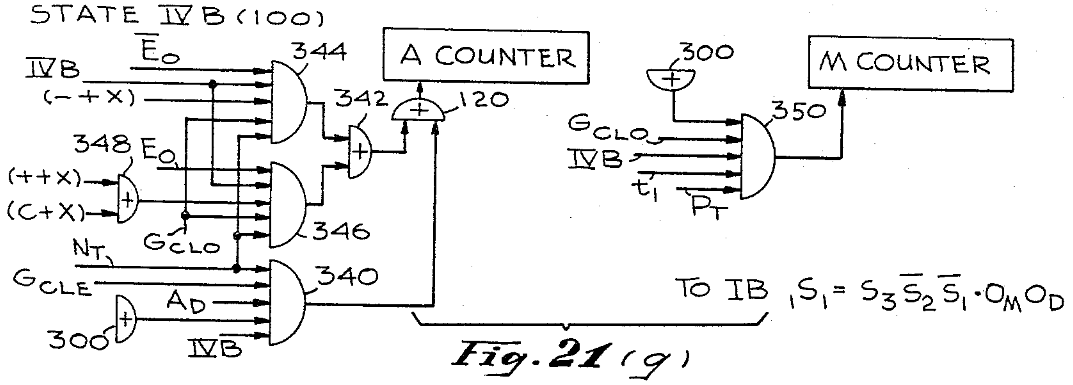
Figure 21H:
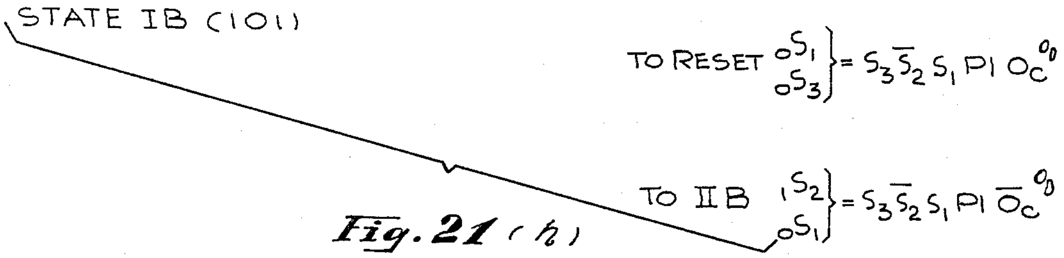
Figure 21I:
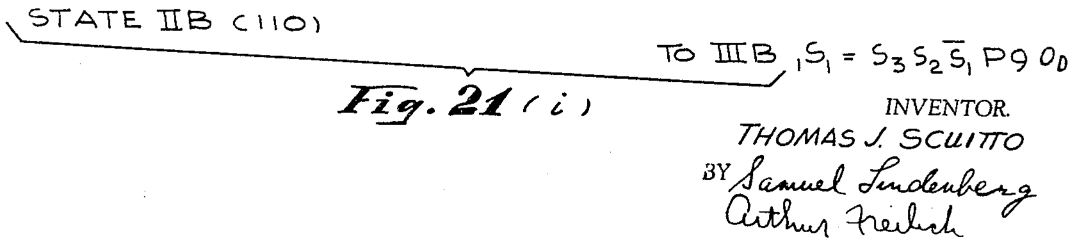

FIGURES 18, 19, and 20 illustrate the portions of the calculator apparatus respectively responsive to actuations of the clear multiplier-quotient register, clear entry register, and clear accumulator register. In FIGURE 18 the true output terminal of the function flip-flop CM is connected to the lower input terminal of the multiplier-quotient register input amplifier $M_I$. Similarly, the true output terminal of the function flip-flop CE is connected to the lower input terminal of the entry register input amplifier $E_I$ in FIGURE 19 and the true output terminal of the function flip-flop CA is connected to the lower input terminal of the accumulator register input amplifier $A_I$ in FIGURE 20.

Attention is now called to FIGURES 21(*a*) through (*i*) which illustrate the portions of the calculator apparatus utilized to perform multiplication and to Table VI set forth below.

*Table VI*

| | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|
| Entry register (Multiplicand) | | | | | | | | | | | 0 | 2 | 1. | 4 | 8 | 0 | 0 | | | | | | | | C counter=11 |
| Multiplier-Q register (Multiplier) | | | | | | | | | | | 0 | 3 | (9). | 6 | 5 | 0 | 0 | | | | | | | | |
| Accumulator register | | | | | | | | | | | 0 | 0 | 0 | 0 | 0 | 0 | 0 | | | | | | | | M counter= 0 |
| En | | | | | | | | | | | 2 | 1 | 4. | 8 | 0 | 0 | 0 | | | | | | | | C counter=12 |
| MQ | | | | | | | | | | | 0 | 3 | 9. | 6 | 5 | 0 | 0 | | | | | | | | |
| Acc | | | | | | | | | | | 0 | 0 | 0 | 0 | 0 | 0 | 0 | | | | | | | | M counter= 0 |
| En | | | | | | | | | | | 2 | 1 | 4. | 8 | 0 | 0 | 0 | | | | | | | | C counter=12 |
| MQ | | | | | | | | | | | 0 | 3 | 9. | 6 | 5 | 0 | 0 | | | | | | | | |
| Acc | | | | | | | | | | | 0 | 0 | 0 | 0 | 0 | 0 | 0 | | | | | | | | M counter= 3 |
| En | | | | | | | | | | | 2 | 1 | 4. | 8 | 0 | 0 | 0 | | | | | | | | C counter=12 |
| MQ | | | | | | | | | | | 0 | 3 | 9. | 6 | 5 | 0 | 0 | | | | | | | | |
| Acc | | | | | | | | | | | 2 | 1 | 4. | 8 | 0 | 0 | 0 | | | | | | | | M counter= 2 |
| En | | | | | | | | | | | 2 | 1 | 4. | 8 | 0 | 0 | 0 | | | | | | | | C counter=12 |
| MQ | | | | | | | | | | | 0 | 3 | 9. | 6 | 5 | 0 | 0 | | | | | | | | |
| Acc | | | | | | | | | | | 4 | 2 | 9. | 6 | 0 | 0 | 0 | | | | | | | | M counter= 1 |
| En | | | | | | | | | | | 2 | 1 | 4. | 8 | 0 | 0 | 0 | | | | | | | | C counter=12 |
| MQ | | | | | | | | | | | 0 | 3 | 9. | 6 | 5 | 0 | 0 | | | | | | | | |
| Acc | | | | | | | | | | | 6 | 4 | 4. | 4 | 0 | 0 | 0 | | | | | | | | M counter= 0 |
| En | | | | | | | | | | | 0 | 2 | 1. | 4 | 8 | 0 | 0 | | | | | | | | C counter=11 |
| MQ | | | | | | | | | | | 0 | 3 | 9. | 6 | 5 | 0 | 0 | | | | | | | | |
| Acc | | | | | | | | | | | 6 | 4 | 4. | 4 | 0 | 0 | 0 | | | | | | | | M counter= 0 |
| En | | | | | | | | | | | 0 | 2 | 1. | 4 | 8 | 0 | 0 | | | | | | | | C counter=11 |
| MQ | | | | | | | | | | | 0 | 3 | 9. | 6 | 5 | 0 | 0 | | | | | | | | |
| Acc | | | | | | | | | | | 6 | 4 | 4. | 4 | 0 | 0 | 0 | | | | | | | | M counter= 9 |
| En | | | | | | | | | | | 0 | 2 | 1. | 4 | 8 | 0 | 0 | | | | | | | | C counter=11 |
| MQ | | | | | | | | | | | 0 | 3 | 9. | 6 | 5 | 0 | 0 | | | | | | | | |
| Acc | | | | | | | | | | | 6 | 6 | 5. | 8 | 8 | 0 | 0 | | | | | | | | M counter= 8 |
| En | | | | | | | | | | | 0 | 2 | 1. | 4 | 8 | 0 | 0 | | | | | | | | C counter=11 |
| MQ | | | | | | | | | | | 0 | 3 | 9. | 6 | 5 | 0 | 0 | | | | | | | | |
| Acc | | | | | | | | | | | 6 | 8 | 7. | 3 | 6 | 0 | 0 | | | | | | | | M counter= 7 |
| En | | | | | | | | | | | 0 | 2 | 1. | 4 | 8 | 0 | 0 | | | | | | | | C counter=11 |
| MQ | | | | | | | | | | | 0 | 3 | 9. | 6 | 5 | 0 | 0 | | | | | | | | |
| Acc | | | | | | | | | | | 7 | 0 | 8. | 8 | 4 | 0 | 0 | | | | | | | | M counter= 6 |
| En | | | | | | | | | | | 0 | 2 | 1. | 4 | 8 | 0 | 0 | | | | | | | | C counter=11 |
| MQ | | | | | | | | | | | 0 | 3 | 9. | 6 | 5 | 0 | 0 | | | | | | | | |
| Acc | | | | | | | | | | | 7 | 3 | 0. | 3 | 2 | 0 | 0 | | | | | | | | M counter= 5 |
| En | | | | | | | | | | | 0 | 2 | 1. | 4 | 8 | 0 | 0 | | | | | | | | C counter=11 |
| MQ | | | | | | | | | | | 0 | 3 | 9. | 6 | 5 | 0 | 0 | | | | | | | | |
| Acc | | | | | | | | | | | 7 | 5 | 1. | 8 | 0 | 0 | 0 | | | | | | | | M counter= 4 |
| En | | | | | | | | | | | 0 | 2 | 1. | 4 | 8 | 0 | 0 | | | | | | | | C counter=11 |
| MQ | | | | | | | | | | | 0 | 3 | 9. | 6 | 5 | 0 | 0 | | | | | | | | |
| Acc | | | | | | | | | | | 7 | 7 | 3. | 2 | 8 | 0 | 0 | | | | | | | | M counter= 3 |
| En | | | | | | | | | | | 0 | 2 | 1. | 4 | 8 | 0 | 0 | | | | | | | | C counter=11 |
| MQ | | | | | | | | | | | 0 | 3 | 9. | 6 | 5 | 0 | 0 | | | | | | | | |
| Acc | | | | | | | | | | | 7 | 9 | 4. | 7 | 6 | 0 | 0 | | | | | | | | M counter= 2 |
| En | | | | | | | | | | | 0 | 2 | 1. | 4 | 8 | 0 | 0 | | | | | | | | C counter=11 |
| MQ | | | | | | | | | | | 0 | 3 | 9. | 6 | 5 | 0 | 0 | | | | | | | | |
| Acc | | | | | | | | | | | 8 | 1 | 6. | 2 | 4 | 0 | 0 | | | | | | | | M counter= 1 |
| En | | | | | | | | | | | 0 | 2 | 1. | 4 | 8 | 0 | 0 | | | | | | | | C counter=11 |
| MQ | | | | | | | | | | | 0 | 3 | 9. | 6 | 5 | 0 | 0 | | | | | | | | |
| Acc | | | | | | | | | | | 8 | 3 | 7. | 7 | 2 | 0 | 0 | | | | | | | | M counter= 0 |
| En | | | | | | | | | | | 0 | 0 | 2. | 1 | 4 | 8 | 0 | | | | | | | | C counter=10 |
| MQ | | | | | | | | | | | 0 | 3 | 9. | 6 | 5 | 0 | 0 | | | | | | | | |
| Acc | | | | | | | | | | | 8 | 3 | 7. | 7 | 2 | 0 | 0 | | | | | | | | M counter= 0 |
| En | | | | | | | | | | | 0 | 0 | 2. | 1 | 4 | 8 | 0 | | | | | | | | C counter=10 |
| MQ | | | | | | | | | | | 0 | 3 | 9. | 6 | 5 | 0 | 0 | | | | | | | | |
| Acc | | | | | | | | | | | 8 | 3 | 7. | 7 | 2 | 0 | 0 | | | | | | | | M counter= 6 |
| En | | | | | | | | | | | 0 | 0 | 2. | 1 | 4 | 8 | 0 | | | | | | | | C counter=10 |
| MQ | | | | | | | | | | | 0 | 3 | 9. | 6 | 5 | 0 | 0 | | | | | | | | |
| Acc | | | | | | | | | | | 8 | 3 | 9. | 8 | 6 | 8 | 0 | | | | | | | | M counter= 5 |
| En | | | | | | | | | | | 0 | 0 | 2. | 1 | 4 | 8 | 0 | | | | | | | | C counter=10 |
| MQ | | | | | | | | | | | 0 | 3 | 9. | 6 | 5 | 0 | 0 | | | | | | | | |
| Acc | | | | | | | | | | | 8 | 4 | 2. | 0 | 1 | 6 | 0 | | | | | | | | M counter= 4 |
| En | | | | | | | | | | | 0 | 0 | 2. | 1 | 4 | 8 | 0 | | | | | | | | C counter=10 |
| MQ | | | | | | | | | | | 0 | 3 | 9. | 6 | 5 | 0 | 0 | | | | | | | | |
| Acc | | | | | | | | | | | 8 | 4 | 4. | 1 | 6 | 4 | 0 | | | | | | | | M counter= 3 |
| En | | | | | | | | | | | 0 | 0 | 2. | 1 | 4 | 8 | 0 | | | | | | | | C counter=10 |
| MQ | | | | | | | | | | | 0 | 3 | 9. | 6 | 5 | 0 | 0 | | | | | | | | |
| Acc | | | | | | | | | | | 8 | 4 | 6. | 3 | 1 | 2 | 0 | | | | | | | | M counter= 2 |
| En | | | | | | | | | | | 0 | 0 | 2. | 1 | 4 | 8 | 0 | | | | | | | | C counter=10 |
| MQ | | | | | | | | | | | 0 | 3 | 9. | 6 | 5 | 0 | 0 | | | | | | | | |
| Acc | | | | | | | | | | | 8 | 4 | 8. | 4 | 6 | 0 | 0 | | | | | | | | M counter= 1 |
| En | | | | | | | | | | | 0 | 0 | 2. | 1 | 4 | 8 | 0 | | | | | | | | C counter=10 |
| MQ | | | | | | | | | | | 0 | 3 | 9. | 6 | 5 | 0 | 0 | | | | | | | | |
| Acc | | | | | | | | | | | 8 | 5 | 0. | 6 | 0 | 8 | 0 | | | | | | | | M counter= 0 |
| En | | | | | | | | | | | 0 | 0 | 0. | 2 | 1 | 4 | 8 | | | | | | | | C counter= 9 |
| MQ | | | | | | | | | | | 0 | 3 | 9. | 6 | 5 | 0 | 0 | | | | | | | | |
| Acc | | | | | | | | | | | 8 | 5 | 0. | 6 | 0 | 8 | 0 | | | | | | | | M counter= 0 |
| En | | | | | | | | | | | 0 | 0 | 0. | 2 | 1 | 4 | 8 | | | | | | | | C counter= 9 |
| MQ | | | | | | | | | | | 0 | 3 | 9. | 6 | 5 | 0 | 0 | | | | | | | | |
| Acc | | | | | | | | | | | 8 | 5 | 0. | 6 | 0 | 8 | 0 | | | | | | | | M counter= 5 |
| En | | | | | | | | | | | 0 | 0 | 0. | 2 | 1 | 4 | 8 | | | | | | | | C counter= 9 |
| MQ | | | | | | | | | | | 0 | 3 | 9. | 6 | 5 | 0 | 0 | | | | | | | | |
| Acc | | | | | | | | | | | 8 | 5 | 0. | 8 | 2 | 2 | 8 | | | | | | | | M counter= 4 |
| En | | | | | | | | | | | 0 | 0 | 0. | 2 | 1 | 4 | 8 | | | | | | | | C counter= 9 |
| MQ | | | | | | | | | | | 0 | 3 | 9. | 6 | 5 | 0 | 0 | | | | | | | | |
| Acc | | | | | | | | | | | 8 | 5 | 1. | 0 | 3 | 7 | 6 | | | | | | | | M counter= 3 |
| En | | | | | | | | | | | 0 | 0 | 0. | 2 | 1 | 4 | 8 | | | | | | | | C counter= 9 |
| MQ | | | | | | | | | | | 0 | 3 | 9. | 6 | 5 | 0 | 0 | | | | | | | | |
| Acc | | | | | | | | | | | 8 | 5 | 1. | 2 | 5 | 2 | 4 | | | | | | | | M counter= 2 |
| EN | | | | | | | | | | | 0 | 0 | 0. | 2 | 1 | 4 | 8 | | | | | | | | C counter= 9 |
| MQ | | | | | | | | | | | 0 | 3 | 9. | 6 | 5 | 0 | 0 | | | | | | | | |
| Acc | | | | | | | | | | | 8 | 5 | 1. | 4 | 6 | 7 | 2 | | | | | | | | M counter= 1 |
| En | | | | | | | | | | | 0 | 0 | 0. | 2 | 1 | 4 | 8 | | | | | | | | C counter= 9 |
| MQ | | | | | | | | | | | 0 | 3 | 9. | 6 | 5 | 0 | 0 | | | | | | | | |
| Acc | | | | | | | | | | | 8 | 5 | 1. | 6 | 8 | 2 | 0 | | | | | | | | M counter= 0 |

Briefly, in the multiplication operation, the entry register stores the multiplicand and the multiplier-quotient register stores the multiplier. The partial product is developed in the accumulator. The multiplication procedure involves considering each digit of the multiplier separately and repeatedly adding the multiplicand to or subtracting the multiplicand from the number in the accumulator register a number of times equal to the value of the multiplier digit being considered. Prior to actually initiating the repeated additions, the multiplicand and multiplier have to be lined up so the proper power of ten is attributed to each digit of the multiplier. The disclosed apparatus permits the performance of three modes of multiplication; namely, "clear and multiply" in which the accumulator register is initially cleared, "add and multiply" in which the partial products are added to the accumulator contents and "subtract and multiply" in which the partial products are subtracted from the accumulator register contents.

Consider Table VI which illustrates an exemplary multiplication in the "clear and multiply" mode in which the multiplicand is equal to 21.48 and the multiplier is equal to 39.65. Assume that the decimal point selector is set to digit sector 11. Initially, the control counter is incremented until its count coincides with that of the decimal point selector circuit 36. This means that the circled digit 9 of the multiplier is the active digit and is in position to be read from the multiplier-quotient register and utilized. As a first step in lining up the multiplicand and multiplier, a check is made to see whether the active digit identified by the control counter is the most significant digit in the multiplier. If it is not (and it isn't in the example of Table VI since the multiplier includes a digit 3 in the ten's place) the control counter is incremented by one and the entry register is shifted to the left. Subsequently, the most significant digit of the multiplier (i.e., 3) is transferred into the M counter and for each succeeding memory cycle, the number in the entry register is added to the accumulator and the digit in the M counter is decremented by one. Consequently, as will be noted, at the end of the initial memory cycle, the M counter will define state 2 and the number 214.8 will be in the accumulator. At the end of a subsequent cycle, the M counter will define state 1 and the number 429.6 will be in the accumulator. At the end of a subsequent cycle, the M counter will define state 0 and the number 644.4 will be in the accumulator. In response to the M counter defining state 0, the control counter is decremented by one so that the digit 9 of the multiplier becomes the active digit. Coincident with the decrementing of the control counter, the multiplicand in the entry register is shifted one digit to the right. The active digit is then transferred into the M counter and in succeeding memory cycles, the multiplicand is added to the number in the accumulator as the M counter is decremented to zero. In response to the M counter defining state 0, the control counter is decremented so that the digit 6 of the multiplier becomes the active digit and the multiplicand in the entry register is again shifted one position to the right. The active digit is entered into the M counter and in the subsequent six memory cycles, the number in the entry register is added to the number in the accumulator while the M counter is decremented once for each memory cycle. When the M counter again defines the 0 state, the control counter is again decremented and the multiplicand again shifted one position to the right. The active digit 5 is transferred into the M counter and in the five subsequent memory cycles, the multiplicand is again added to the number in the accumulator register. When there are no non-zero digits in the multiplier not yet considered, the multiplication operation is over with the product being stored in the accumulator register.

FIGURE 21(*a*) is a flow diagram illustrating the sequence of states assumed by the cycle counter in the performance of the multiplication operation. The entire multiplication operation can be considered as including phase A states and phase B states. During the phase A states, lineup is accomplished which includes appropriately setting the control counter and shifting the contents of the entry register. During the phase B states, the partial product is formed by the successive additions and right shifts.

FIGURE 21(*b*) illustrates the portions of the calculator apparatus active during the reset state of the cycle counter. In response to the actuation of any of the clear and multiply, accumulate and multiply, and subtract and multiply function keys, the corresponding flip-flop is set. The true output terminals on each of these function flip-flops is connected to the input of the Or gate 104 whose output (as previously discussed with respect to FIGURE 7) is connected to the reset input of a multivibrator and to the stages of the cycle counter. The transition of the output of the Or gate 104 in response to the setting of one of the multiply function flip-flops resets the multivibrator momentarily to thereby generate a start signal which is applied to both the control counter and the logic flip-flop $L_0$ to effect the resetting thereof. Actuation of a function flip-flop also causes the cycle counter to switch from the reset state to state IA in response to the development of a subsequent origin signal.

The terms ${}_1S_1$ and ${}_0S_1$ shall be respectively used in the logical equations hereafter set forth to refer to the development of set and reset input signals to flip-flop S1. Consequently, the logical equation presented in FIGURE 21(*b*) denotes that when the cycle counter is in the reset state, a set input signal will be applied to flip-flop S1 in response to the generation of the origin signal. Although the logical equations in FIGURE 21(*b*) through (*i*) do not expressly include the multiplication (i.e., function) term, it should be understood that all of the equations impliedly include such a term, as would for example be represented by the true output terminals of the multiplication flip-flops.

In state IA the C counter is incremented to cause its state to match the state of the decimal point selector circuit 36. More particularly, pulses of signal $G_{cl0}$ will be applied through And gate 304 to the clock input terminal of stage 1 of the C counter each time signal P10 is developed by gate 72 of FIGURE 3(*b*) and so long as logic flip-flop $L_0$, whose false output terminal is connected to the input of gate 304, remains false. In addition to these inputs to And gate 304, the output of Or gate 300, whose inputs comprise the true output terminals of all of the multiplication function flip-flops, is connected to the input of gate 304 along with the output of state detector IA. Logic flip-flop $L_0$ will remain false until set by the And gate 306. The inputs to And gate 306 comprise the output of Or gate 300, the output of state detector IA, the output of gate 68 of FIGURE 3(*b*) providing signal P2 and the signal $K_p$ provided by the coincidence circuit 34. During state IA, if the function flip-flop C+× has been actuated, the accumulator register input amplifier lower input terminal is energized by the output of And gate 308 to thereby clear the accumulator register. In response to the development of an origin signal, the cycle counter is switched from state IA to state IIA.

In state IIA the M register is checked to determine whether the digit sector identified by the control counter contains the most significant multiplier digit. In order to make this determination, the logic flip-flop $L_0$ is utilized with the outputs of And gates 312 and 310 being respectively coupled to the set and reset input terminals thereof. Connected to the input of And gate 310 is the output of Or gate 300, the output of state detector IIA, and the output of the M register output amplifier $M_0$. Connected to the input of And gate 312 is the output of Or gate 300, the output of state detector IIA, the output of coincidence circuit 38 providing signal $K_{DC}$, and the output of gate 72 of FIGURE 3(*b*) developing signal P10. Signal $K_{DC}$ of course is developed in response to coincidence between the control counter 40 and the digit counter 20. Consequently, the logic flip-flop $L_0$ is set at bit period 10, that is a bit period after which the last pulse could have been possibly recorded in the coincident digit sector. If the digit sector identified by the state of the control counter is not in fact the most significant non-zero digit in the multiplier, then the And gate 310 will provide a signal subsequent to the development of signal $K_{DC}$ which will reset the logic flip-flop $L_0$. In the event that the state of the control counter does not represent the digit sector storing the most significant digit of the multiplier, the cycle counter switches to state IIA in response to a subsequent origin signal and in the event that the state of the cycle counter does represent the digit sector storing the most significant multiplier digit, the cycle counter switches to state IIIB as represented by the equations in FIGURE 21(*d*).

In state IIIA, the contents of the entry register are shifted left by coupling the entry register output amplifier $E_0$ to the input of And gate 320 along with the output of And gate 322. The inputs to And gate 322 comprise the output of Or gate 300 and the output of the state detector IIIA. The outputs of gates 320 and 322 are respectively connected to the upper and lower input terminals of the delay register input amplifier $D_I$. The output of the delay register output amplifier $D_0$ is connected to the input of And gate 324 along with the output of And gate 326. The inputs to And gate 326 comprise the output of gate 300 and the output of state detector IIIA. The output of gates 324 and 326 are respectively connected to the upper and lower input terminals of the entry register input amplifier $E_I$. In state IIIA, in addition to the contents of the entry register being shifted left, the C counter 40 is incremented by the signal derived from And gate 328 whose inputs comprise the signal $G_{clo}$ and $O_d$ and the outputs of gate 300 and state detector IIIA. In response to the development of the origin signal, the cycle counter is switched to state IIA as indicated by the logical equation.

Attention is now called to FIGURE 21(*f*) which illustrates the portions of the calculator apparatus active during state IIIB of the multiplication operation. When state IIIB immediately follows state IIA which occurs when logic flip-flop $L_0$ is true at the end of state IIA, state IIIB merely serves to transfer the active digit from the M register to the M counter and to reset the logic flip-flop $L_0$ in response to the development of the origin signal. On the other hand, when state IIIB immediately follows either state IIB or state IIIB, the additional functions of decrementing the C counter and shifting the contents of the entry register right one digit are also performed.

The active digit from the M register is transferred into the M counter through the And gate 330 whose output is connected to the clock input terminals of the first stage of the M counter. The first three input to And gate 330 respectively comprise the output of the source of signal $G_{clo}$, the output of the state detector IIIB, and the output of gate 300. A fourth input to And gate 330 comprises the output of coincidence circuit 38 which develops the signal $K_{DC}$ and the fifth input thereto comprises the output of the M register output amplifier $M_0$. It should be apparent that the And gate 330 will pass to the M counter a number of pulses equal to the value of the active multiplier digit, i.e., the digit in the digit sector of the M register identified by the state of the C counter. The logic flip-flop $L_0$ is reset by a signal provided by And gate 332. The three inputs to And gate 332 respectively comprise the output of the state detector IIIB, the output of gate 300, and the output of gate 80 of FIGURE 4(*b*) providing he origin signal.

As noted, the C counter is decremented in state IIIB and the contents of the entry register are shifted right one digit position only when this state does not immediately follow state IIA. The C counter is decremented, as before indicated, by applying 23 incrementing pulses thereto. The 23 incrementing pulses are derived from Or gate 206 and applied to the input of And gate 334 whose output is connected to the clock input terminals of stage 1 of the C counter. The second, third, and fourth inputs to And gate 334 of course comprise the output of state detector IIIB, the output of the source of signal $G_{clo}$, and the output of gate 300. The fifth input to And gate 334 comprises the false output terminal of the logic flip-flop $L_0$ which of course restricts the enabling of And gate 334 to only those IIIB states which do not immediately follow state IIA.

The contents of the E register are shifted right one digit position by connecting the output of And gate 336 to the lower input terminal of the entry register input amplifier $E_I$ and output of And gate 338 to the upper input terminal thereof. The three inputs to And gate 336 respectively comprise the false output terminal of the logic flip-flop $L_0$, the output of the state detector IIIB, and the output of gate 300. The two inputs to And gate 338 comprise the output of the entry register output amplifier $E_0$ and the output of gate 336.

The logical equation set forth in FIGURE 21(*f*) indicates the conditions required to switch the cycle counter from state IIIB to state IVB. Note that the term $\overline{0_N}$, representing a non-zero state of the M counter, is included in the equation. The inclusion of this term is desirable in order to rapidly handle situations in which the active multiplier digit entered into the M counter is zero.

FIGURE 21(*g*) illustrates the portions of the calculator apparatus active during state IVB which state is utilized to add (or subtract as the case may be) the contents of the entry register to the contents of the accumulator register and in addition for decrementing the M counter. Addition is performed if the "clear and multiply" or "add and multiply" function keys are depressed and subtraction is performed if the "subtract and multiply" function key is depressed. The actual addition and subtraction is accomplished in the same manner as previously described. That is the output of the accumulator register output amplifier $A_0$ is connected to the input of And gate 340 whose output is connected to the input of Or gate 120 connected to stage 1 of the A counter. Additionally, the source of signal $G_{cle}$ is connected to the input of And gate 340 along with the output of Or gate 300. Connected to the second input of Or gate 120 is the output of Or gate 342 whose two inputs are respectively connected to the output of And gates 344 and 346. The And gate 346 is enabled when either the "add and multiply" or "clear and multiply" functions are being performed. The true output terminals of the corresponding function flip-flops are connected to the input of Or gate 348 whose output is connected to the input of And gate 346 along with the output of the entry register ouput amplifier $E_0$. The And gate 344 is enabled when the "subtract and multiply" function flip-flop is set by connecting the true output terminal thereof to the input of And gate 344 along with the complement of the output of the entry register output amplifier $E_0$. Also connected to the inputs of both And gates 344 and 346 is the output of the source of signal $G_{clo}$. Connected to the input of the And gates 340, 344, and 346 is the output of state detector IVB and the output of gate 77 of FIGURE 4(*b*) providing signal $N_t$. Thus, it can be seen that for each memory cycle the contents of the entry register are either added to or subtracted from the contents of the accumulator register.

The M counter is decremented by one count each memory cycle by the application of nine pulses provided by And gate 350 whose output is connected to the clock input terminals of stage 1 of the M counter. The initial three inputs to And gate 350 comprise the output of Or gate 300, the output of the source of signal $G_{clo}$, and the output of state detector IVB. In addition, the output of gate 78 of FIGURE 4(*b*) providing signal $t_1$ and the output of gate 76 of FIGURE 3(*b*) providing signal $P_t$ are connected to the input of And gate 350. It will be recalled that the signal $P_t$ is true for nine pulses of signal $G_{clo}$ and the signal $T_1$ assures that the M counter is decremented during D counter state 24 or in other words after the addition or subtraction has been completed. Iterations continue in state IVB until the M counter is decremented to zero at which time, as evidenced by the logical equation set forth in FIGURE 21(*g*), the cycle counter switches to state IB and then IIB and back to IIIB. Steps IB and IIB serve no function in multiplication and the cycle counter will step through them in less than one digit time.

The multiplication operation is terminated in state IIIB after the multiplier digit in the position corresponding to the zero state of the control counter has been considered. Termination is accomplished by clearing the function flip-flops through gate 112 of FIGURE 7. Flip-flop 116 of FIGURE 7 is set by the output of gate 111 when the count in the control counter is decremented to zero and the second digit signal is provided by the D counter. Subsequently when the control counter is decremented to state 23 after the multiplier digit associated with state zero of the control counter has been considered stage 3 of the control counter, i.e., C3 will become true to clear the function flip-flops. The flip-flop 116 will be reset prior to another operation by the same signal that resets the cycle counter.

Attention is now called to Table VII below which depicts the division operation initiated in response to the actuation of the division function key. In division, the dividend is stored in the accumulator register and the divisor is stored in the entry register. The quotient is developed in the multiplier-quotient register. As with the multiplication operation previously described, division is performed with the decimal point fixed. The decimal point of the quotient is automatically aligned with the decimal point of the generating factors, that is, the divisor and the dividend. Briefly, division is implemented by subtracting the divisor from the dividend an integral number of times unit the sign of the accumulator changes. Thence, the divisor is added to the number in the accumulator register so as to effectively restore the remainder therein. Thereafter, the number in the accumulator register is shifted left one digit. The number of integral times that the divisor was able to be subtracted from the dividend prior to causing the accumulator register to change sign, represents the most significant digit of the quotient. By repeating the subtraction process after the accumulator is shifted left, the next most significant digit of the quotient can be obtained. The division procedure is separated into two phases, as with multiplication, with phase A again constituting a line-up procedure and phase B constituting the actual subtractions to develop the quotient digits and additions to effect restoration. Prior to considering the hardware necessary to implement the division operation, consider the example set forth in Table VII.

*Table VII*

| | | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|
| Entry register (Divisor) | | | | | | | | | | 0 | 0 | 0 | 0 | 3 | .9 | 6 | 5 | | | | | | | | | C counter=11 |
| Multiplier-Q register | | | | | | | | | | 0 | 0 | 0 | 0 | 0 | 0 | 0 | 0 | | | | | | | | | |
| Accumulator register (Dividend) | | | | | | | | | | 0 | 0 | 4 | 1 | 4 | .8 | 0 | 0 | | | | | | | | | M counter= 0 |
| En | | | | | | | | | | 0 | 0 | 0 | 0 | 3 | .9 | 6 | 5 | | | | | | | | | C counter=12 |
| MQ | | | | | | | | | | 0 | 0 | 0 | 0 | 0 | 0 | 0 | 0 | | | | | | | | | |
| Acc | | | | | | | | | | 0 | 0 | 0 | 4 | 1 | .4 | 8 | 0 | | | | | | | | | M counter= 0 |
| En | | | | | | | | | | 0 | 0 | 0 | 0 | 3 | .9 | 6 | 5 | | | | | | | | | C counter=13 |
| MQ | | | | | | | | | | 0 | 0 | 0 | 0 | 0 | 0 | 0 | 0 | | | | | | | | | |
| Acc | | | | | | | | | | 0 | 0 | 0 | 0 | 4 | .1 | 4 | 8 | | | | | | | | | M counter= 0 |
| En | | | | | | | | | | 0 | 0 | 0 | 0 | 3 | .9 | 6 | 5 | | | | | | | | | C counter=13 |
| MQ | | | | | | | | | | 0 | 0 | 0 | 0 | 0 | 0 | 0 | 0 | | | | | | | | | |
| Acc | | | | | | | | | | 0 | 0 | 0 | 0 | 0 | .1 | 8 | 3 | | | | | | | | | M counter= 1 |
| En | | | | | | | | | | 0 | 0 | 0 | 0 | 3 | .9 | 6 | 5 | | | | | | | | | C counter=13 |
| MQ | | | | | | | | | | 0 | 0 | 0 | 0 | 0 | 0 | 0 | 0 | | | | | | | | | |
| Acc | OF | | | | | | | | | ←9 | 9 | 9 | 9 | 6 | .2 | 1 | 8 | | | | | | | | | M counter= 1 |
| En | | | | | | | | | | 0 | 0 | 0 | 0 | 3 | .9 | 6 | 5 | | | | | | | | | C counter=13 |
| MQ | | | | | | | | | | 0 | 0 | 0 | 0 | 0 | 0 | 0 | 0 | | | | | | | | | |
| Acc | | | | | | | | | | 0 | 0 | 0 | 0 | 0 | .1 | 8 | 3 | | | | | | | | | M counter= 1 |
| En | | | | | | | | | | 0 | 0 | 0 | 0 | 3 | .9 | 6 | 5 | | | | | | | | | C counter=12 |
| MQ | | | | | | | | | | 0 | 0 | 1 | 0 | 0 | 0 | 0 | 0 | | | | | | | | | |
| Acc | | | | | | | | | | 0 | 0 | 0 | 0 | 1 | .8 | 3 | 0 | | | | | | | | | M counter= 0 |
| En | | | | | | | | | | 0 | 0 | 0 | 0 | 3 | .9 | 6 | 5 | | | | | | | | | C counter=12 |
| MQ | | | | | | | | | | 0 | 0 | 1 | 0 | 0 | 0 | 0 | 0 | | | | | | | | | |
| Acc | OF | | | | | | | | | ←9 | 9 | 9 | 9 | 7 | .8 | 6 | 5 | | | | | | | | | M counter= 0 |
| En | | | | | | | | | | 0 | 0 | 0 | 0 | 3 | .9 | 6 | 5 | | | | | | | | | C counter=12 |
| MQ | | | | | | | | | | 0 | 0 | 1 | 0 | 0 | 0 | 0 | 0 | | | | | | | | | |
| Acc | | | | | | | | | | 0 | 0 | 0 | 0 | 1 | .8 | 3 | 0 | | | | | | | | | M counter= 0 |
| En | | | | | | | | | | 0 | 0 | 0 | 0 | 3 | .9 | 6 | 5 | | | | | | | | | C counter=11 |
| MQ | | | | | | | | | | 0 | 0 | 1 | 0 | 0 | 0 | 0 | 0 | | | | | | | | | |
| Acc | | | | | | | | | | 0 | 0 | 0 | 1 | 8 | .3 | 0 | 0 | | | | | | | | | M counter= 0 |
| En | | | | | | | | | | 0 | 0 | 0 | 0 | 3 | .9 | 6 | 5 | | | | | | | | | C counter=11 |
| MQ | | | | | | | | | | 0 | 0 | 1 | 0 | 0 | 0 | 0 | 0 | | | | | | | | | |
| Acc | | | | | | | | | | 0 | 0 | 0 | 1 | 4 | .3 | 3 | 5 | | | | | | | | | M counter= 1 |
| En | | | | | | | | | | 0 | 0 | 0 | 0 | 3 | .9 | 6 | 5 | | | | | | | | | C counter=11 |
| MQ | | | | | | | | | | 0 | 0 | 1 | 0 | 0 | 0 | 0 | 0 | | | | | | | | | |
| Acc | | | | | | | | | | 0 | 0 | 0 | 1 | 0 | .3 | 7 | 0 | | | | | | | | | M counter= 2 |
| En | | | | | | | | | | 0 | 0 | 0 | 0 | 3 | .9 | 6 | 5 | | | | | | | | | C counter=11 |
| MQ | | | | | | | | | | 0 | 0 | 1 | 0 | 0 | 0 | 0 | 0 | | | | | | | | | |
| Acc | | | | | | | | | | 0 | 0 | 0 | 0 | 6 | .4 | 0 | 5 | | | | | | | | | M counter= 3 |
| En | | | | | | | | | | 0 | 0 | 0 | 3 | 9 | .6 | 5 | 0 | | | | | | | | | C counter=11 |
| MQ | | | | | | | | | | 0 | 0 | 1 | 0 | 0 | 0 | 0 | 0 | | | | | | | | | |
| Acc | | | | | | | | | | 0 | 0 | 0 | 2 | 4 | .4 | 0 | 0 | | | | | | | | | M counter= 4 |
| En | | | | | | | | | | 0 | 0 | 0 | 3 | 9 | .6 | 5 | 0 | | | | | | | | | C counter=11 |
| MQ | | | | | | | | | | 0 | 0 | 1 | 0 | 0 | 0 | 0 | 0 | | | | | | | | | |
| Acc | OF | | | | | | | | | ←9 | 9 | 9 | 8 | 4 | .7 | 5 | 0 | | | | | | | | | M counter= 4 |
| En | | | | | | | | | | 0 | 0 | 0 | 3 | 9 | .6 | 5 | 0 | | | | | | | | | C counter=10 |
| MQ | | | | | | | | | | 0 | 0 | 1 | 0 | 4 | .0 | 0 | 0 | | | | | | | | | |
| Acc | | | | | | | | | | 0 | 0 | 2 | 4 | 4 | .0 | 0 | 0 | | | | | | | | | M counter= 0 |

Note that the divisor 3.965 is stored in the entry register and the dividend 414.8 is stored in the accumulator register. The C counter is initially incremented until its count equals that of the decimal point selector. This has arbitrarily been assumed to be a count of eleven. The M counter is in a zero state. An initial check is made to see whether the most significant non-zero digit of the divisor is in the same or a more significant digit position than the most significant digit of the dividend. If it is not, as in the example illustrated, the accumulator register content, i.e., the divisor is shifted right one digit position and the C counter is incremented by one count. It should of course be appreciated that the count of the C counter determines the position of the active quotient digit. A check is again made to see whether the most significant digit position of the divisor is the same as or greater than the most significant digit position of the dividend and if it is not, the dividend is again shifted right and the C counter again incremented by one. Once line-up has been completed, the divisor is subtracted from the dividend and for each subtraction which does not result in a change of sign of the number in the accumulator register, the M counter is incremented by one. After a change of sign has been encountered, the remainder in the accumulator register is restored, the count in the M counter is transferred into the active digit position of the multiplier-quotient register, the C counter is decremented by one and the number in the accumulator register is shifted to the left one digit position. The same procedure is continued indefinitely, limited by the digit length of the numbers the apparatus is capable of handling.

Figures 22E, 22F, 22G, 22H, 22I:
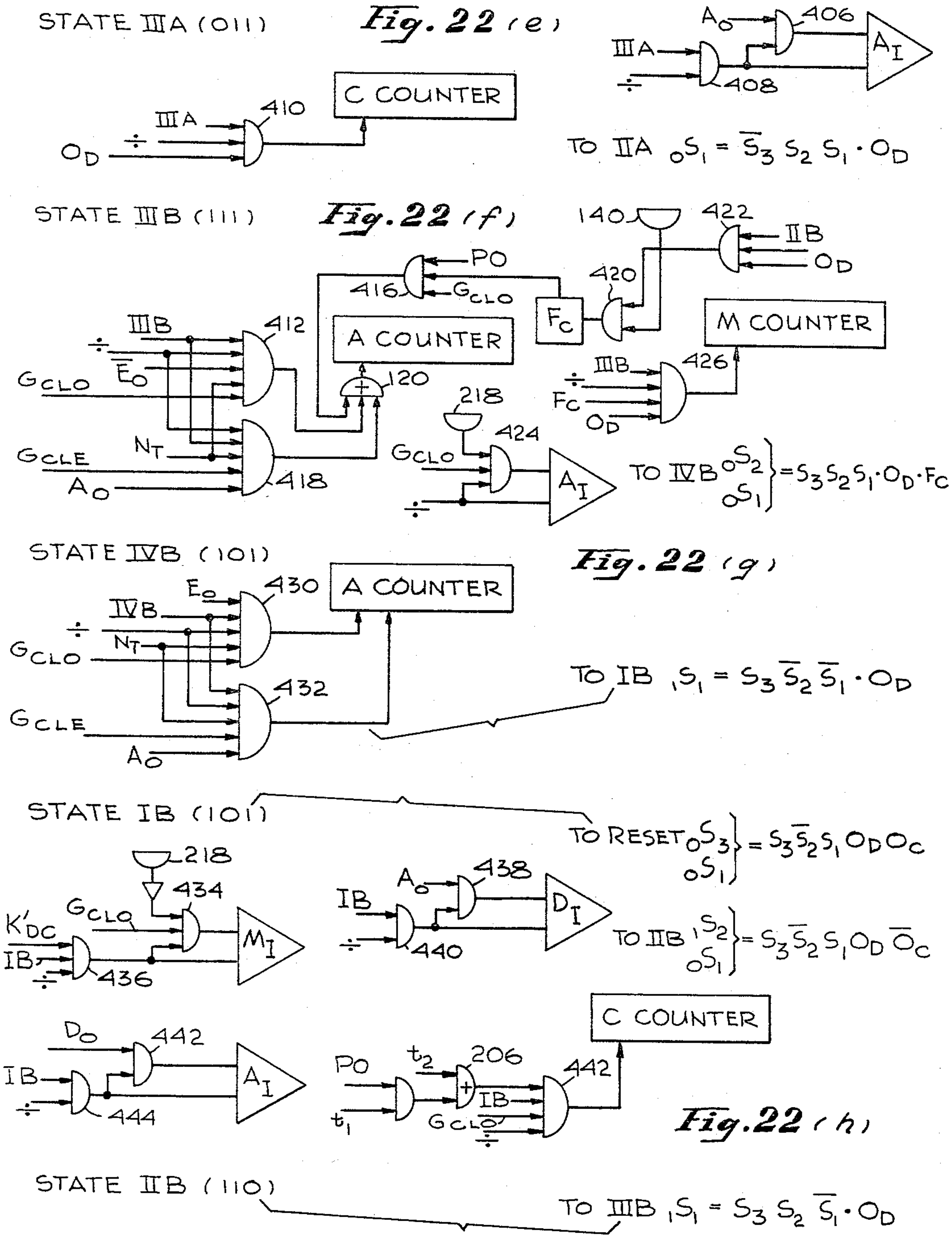
FIGURE 22(*a*) is a flow diagram illustrating the sequence of cycle (S) counter states utilized in the performance of division and FIGURES 22(*b*)–(*i*) illustrate the portions of the calculator apparatus active in each of these states.
Figures 23A, 23B, 23C, 23D, 23E:
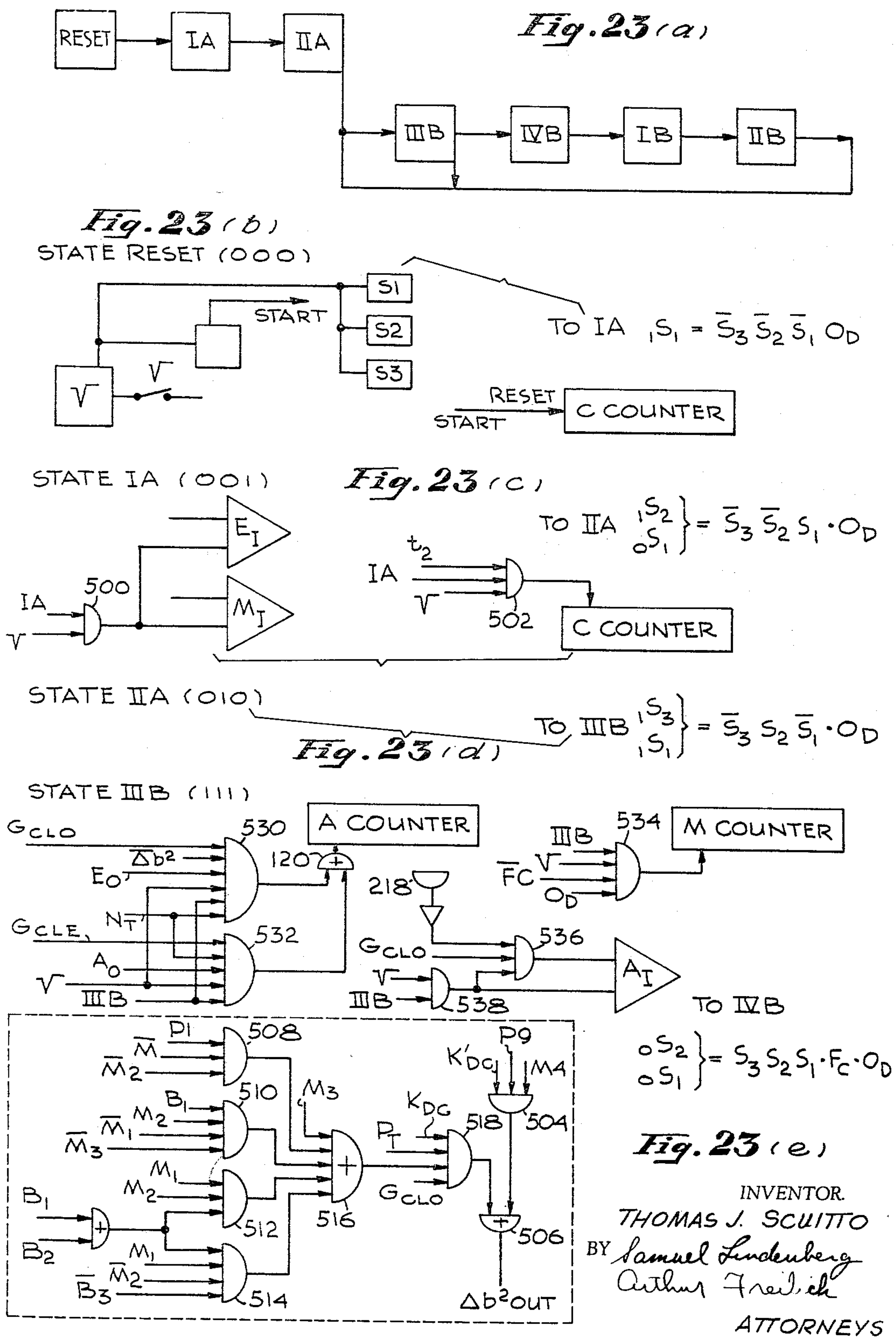
Figure 23F:
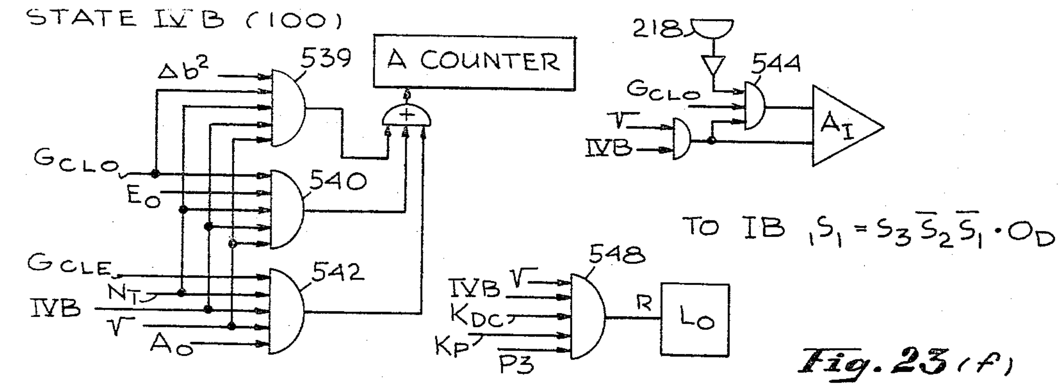
Figure 23G:
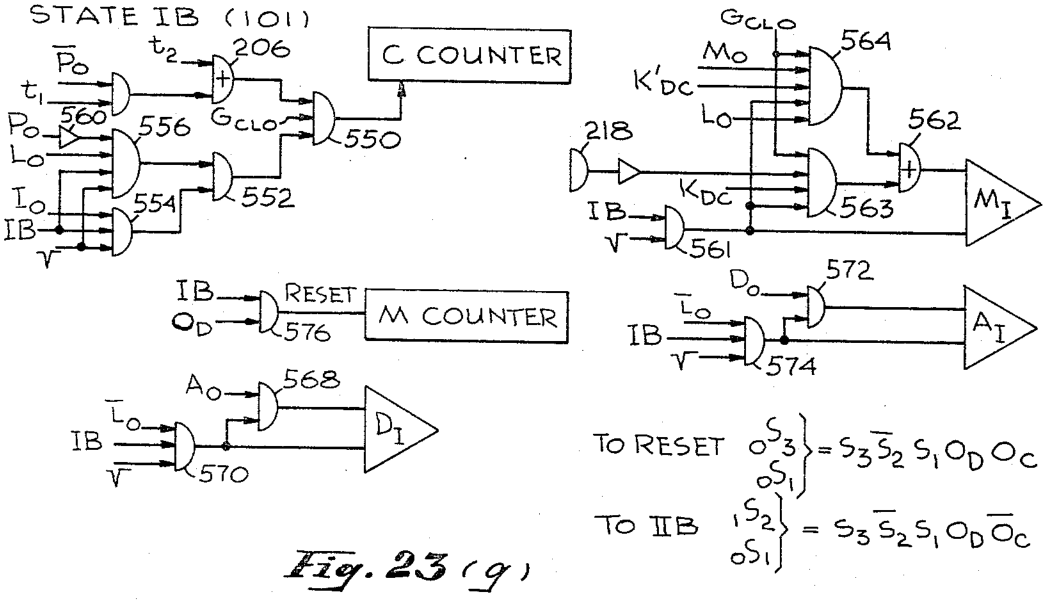
Figure 23H:
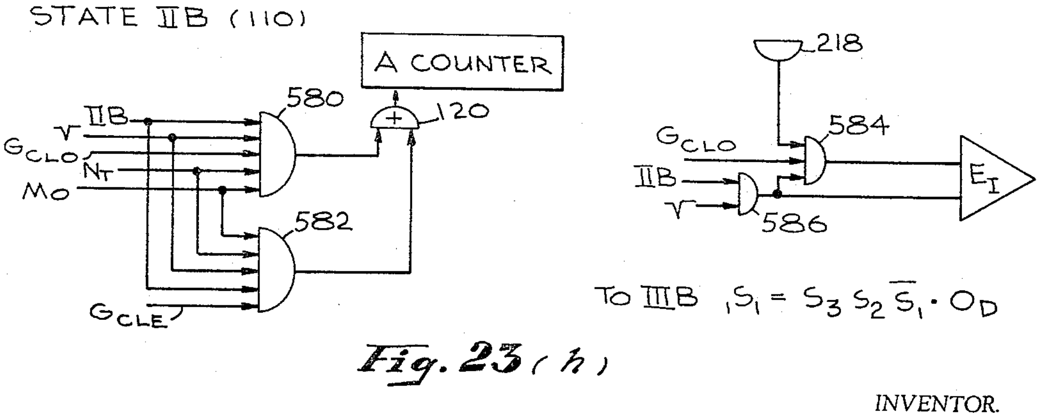

Attention is now called to FIGURE 22(*a*) which illustrates a flow diagram of the states assumed by the cycle counter in the performance of the division operation and FIGURES 22(*b*) through (*i*) which illustrate the portions of the calculator apparatus active in each of these states.

Note in FIGURE 22(*b*) that in response to the actuation of the divide function key, the C counter and logic flip-flop are reset and the cycle counter is switched to state IA in accordance with the logical equation set forth. It should further be noted that the hardware and operation thereof illustrated in FIGURE 22(*b*) is closely analogous to that illustrated in FIGURE 21(*b*).

FIGURE 22(*c*) illustrates the portions of the calculator apparatus used during state IA and it will again be noted that this apparatus is substantially identical to the apparatus active in state IA of the multiplication operation. It will be recalled from Table VII that it is initially necessary to increment the C counter until its count is identical to the count of the decimal point selector circuit 36. The coincident circuit 34 provides the signal $K_p$ which indicates coincidence between the setting of the decimal point selector circuit and the count of the D counter 20. The And gate 400 whose output is connecter to the clock input terminals of stage 1 of the C counter provides a pulse thereto during each digit time (in response to signal P10) so long as the logic flip-flop $L_0$ remains false. The inputs to And gate 400 respectively comprise the output of the source of signal $G_{clo}$, the true output terminal of the divide function flip-flop, the false output terminal of the logic flip-flop, the output of state detector IA, and the output of gate 72 of FIGURE 3(*b*) providing signal P10. The logic flip-flop $L_0$ will remain false until the And gate 402 applies a pulse to the set input terminal thereof. The inputs to the And gate 402 respectively comprise the true output terminal of the divide function flip-flop, the output of state detector IA, the output of gate 68 of FIGURE 3(*b*) providing signal P2, and the output of coincidence circuit 34 providing signal $K_p$. Also accomplished during state IA is the clearing of the multiplier-quotient register which is cleared by connecting the output of And gate 404 to the lower input terminal of the multiplier-quotient register input amplifier $M_I$. The inputs to And gate 404 comprise the true output terminal of the divide function flip-flop and the output of state detector IA. The cycle counter switches from state IA to state IIA in response to the generation of the origin signal, as described by the logical equation set forth.

Attention is now called to FIGURE 22(*d*) which illustrates the portions of the calculator apparatus active in state IIA in the performance of the division operation. In state IIA, a decision is made as to whether the digit position of the most significant digit of the number in the E register, i.e., the divisor is at least as great as that of the most significant digit in the accumulator register, i.e., the dividend. This decision is made by causing pulses recorded in the E register to set the logic flip-flop $L_0$ and by causing pulses recorded in the accumulator register to reset the logic flip-flop. By determining the state of the logic flip-flop at the end of the memory cycle, a conclusion can be made as to whether the most significant digit recorded in the entry register is in a digit position at least as great as the position of the most significant digit in the accumulator register. Control of the logic flip-flop is exercised by the And gate 403 whose output is connected to the set input terminal of the logic flip-flop and the And gate 405 whose output is connected to the reset input terminal of the logic flip-flop. Connected to the input of each of the And gates 403 and 405 is the true output terminal of the division function flip-flop, the output of state detector IIA, and the output of gate 66 of FIGURE 3(*b*) developing signal P1. It should be apparent that the signal P1 is utilized inasmuch as every non-zero digit stored in a register digit sector will have a pulse recorded in at least the first bit position which, of course, is read concurrent with the development of the signal P1. In addition, the complement of the output of the entry register output amplifier $E_0$ is applied to the input of gate 405 along with the output of the accumulator register output amplifier $A_0$. Consequently, it should be apparent that gate 405 will provide a resetting pulse to the logic flip-flop $L_0$ during any digit period in which a non-zero digit is recorded in the accumulator register and a zero digit is recorded in the entry register.

The output of the entry register output amplifier $E_0$ is applied to the input of gate 403 and it should be apparent that gate 403 will provide a set pulse to the logic flip-flop $L_0$ during each digit time in which the entry register digit sector being read contains a non-zero digit. The logical equation set forth in FIGURE 22(*d*) indicates that at the end of the memory cycle, if the flip-flop $L_0$ is true, the cycle counter will switch to state IIIB so that the subtraction operation can be initiated. On the other hand, if the logic flip-flop $L_0$ is false at the end of a memory cycle, it is indicative that the most significant digit in the accumulator register is in a digit position which is greater than that containing the most significant digit of the entry register. In this event, the cycle counter is switched to state IIIA.

In state IIIA the C counter is incremented by one and the contents of the accumulator register are shifted one digit position to the right. The hardware for performing these functions is illustrated in FIGURE 22(*e*). Note that the outputs of And gates 406 and 408 are respectively coupled to the upper and lower input terminals of the accumulator register input amplifier $A_I$. The inputs to And gate 408 comprise the output of state detector IIIA and the true output terminal of the division function flip-flop. The inputs to And gate 406 comprise the output of And gate 408 and the output of the accumulator register output amplifier $A_0$. These elements of course serve to shift the contents of the accumulator register one digit position to the right. The C counter is incremented by one in response to a pulse provided by the And gate 410 whose output is connected to the clock input terminals of stage 1 of the C counter. The inputs to And gate 410 comprise the true output terminal of the division function flip-flop, the output of state detector IIIA and the output of the source of the origin signal. From state IIIA, as indicated by the logical equation illustrated in FIGURE 22(*e*), the cycle counter will switch to state IIA.

FIGURE 22(*f*) illustrates the portion of the calculator apparatus active in state IIIB which is the state assumed by the cycle counter immediately after state IIA when the numbers in the accumulator and entry registers are properly lined-up. During state IIIB, the divisor stored in the entry register is repeatedly subtracted from the dividend stored in the accumulator register until the sign of the number in the accumulator register changes which is recognized by the carry flip-flop $F_c$ being set. For each memory cycle in which such a subtraction can be performed without changing the sign of the number in the accumulator register, the M counter is incremented by one.

In order to perform these subtractions, substantially the same apparatus is utilized as illustrated in FIGURE 15(*a*). That is, the output of an And gate 412 is applied to the input of the Or gate 120 whose output is connected to clock input terminals of stage 1 of the A counter. A second input to the Or gate 120 extends from And gate 416 to whose input is connected the true output terminal of the carry flip-flop $F_c$. A third input to Or gate 120 is derived from And gate 418.

More particularly, connected to the set input terminal of the carry flip-flop is the output of an Or gate 420. The inputs to Or gate 420 are connected to the outputs of And gate 140, which it will be recalled is coupled to stage 4 of the A counter, and to the output of And gate 422. The inputs to And gate 422 respectively comprise the true output terminal of state detector IIB and the signal $O_d$. Consequently, gate 422 sets the carry flip-flop prior to each subtraction, i.e., each transition from state IIB to state IIIB which it will be recalled is necessary to correct the nine's complement sum. The output of gate 140 sets the carry flip-flop in response to the A counter overflowing. Inputs to the gate 416 in addition to the true output terminal of the carry flip-flop comprise the output of gate 64 of FIGURE 3(*b*) developing signal P0 and the output of the source of signal $G_{clo}$. The function of gate 416 should be appreciated from what has been said with respect to FIGURE 15(*a*).

Connected to the input of both And gates 412 and 418 is the true output terminal of the divide function flip-flop, the output of state detector IIIB and the output of gate 77 of FIGURE 4(*b*). In addition, the complement of the output of the entry register output amplifier $E_0$ and the output of the source of signal $G_{clo}$ are connected to the input of gate 412. The output of the accumulator register output amplifier $A_0$ and the output of the source of signal $G_{clo}$ are connected to the input of And gate 418. Consequently, it should be appreciated that the A counter develops the difference between the contents of the entry register and the contents of the accumulator register. The difference is written into the accumulator register by connecting the true output terminal of the divide function flip-flop to the lower input terminal of the accumulator register input amplifier $A_I$ and to the input of And gate 424. In addition, the output of the source of signal $G_{clo}$ and the output of the gate 218 sensing a zero state of the R counter are connected to the input of gate 424

The M counter is incremented in response to pulses provided by the And gate 426 which provides a pulse whenever an origin signal is developed if the carry flip-flop $F_c$ is false meaning that the number in the accumulator register has not yet changed sign. The inputs to the And gate 426 comprise the true output terminal of the divide function flip-flop, the output of state detector IIIB, the false output terminal of the carry flip-flop and the output of the source of origin signal. The cycle counter is switched to state IVB, as expressed by the logical equation set forth in FIGURE 22(*f*) when the origin signal is develop and the carry flip-flop is in a true state meaning that the sign of the number in the accumulator register has changed.

In state IVB of the cycle counter, as illustrated in FIGURE 22(*g*), the contents of the entry register are added to the contents of the accumulator register so as to restore the remainder in the accumulator register. This addition is accomplished by connecting the And gates 430 and 432 to the set and reset clock input terminals of stage 1 of the A counter. Connected to the input of And gates 430 and 432 is the true output terminal of the divide function flip-flop, the output of state detector IVB, and the output of gate 77 developing signal $N_t$. In addition, the output of the entry register output amplifier $E_0$ and the output of the source of signal $G_{clo}$ is connected to the input of And gate 430. The output of the accumulator register output amplifier $A_0$ and the output of the source of signal $G_{clo}$ is connected to the input of gate 432. Subsequent to restoration, the cycle counter is switched from state IVB to state IB.

In state IB the contents of the M counter are transferred to the multiple-quotient register, the contents of the accumulator register are shifted left one digit position, the M counter is reset, and the control counter is decremented by one. As shown in FIGURE 8, the contents of the M register are transferred into the R register during state IB when signal P11 is developed. The contents of the R register are in turn transferred into the multiplier-quotient register by the gates 434 and 436 whose outputs are respectively coupled to the upper and lower input terminals of the multiplier-quotient register input amplifier $M_I$. The inputs to the And gate 436 comprise the coincidence signal $K_{DC}$ derived from flip-flop 90 of FIGURE 6, the true output terminal of the divide function flip-flop and the output of state detector IB. The inputs to And gate 434 comprise the output of gate 436, the output of the source of signal $G_{clo}$ and the inverted output of gate 218 detecting a zero state of the R counter.

The contents of the accumulator register are shifted left one digit position by transferring them to and from the delay track as was discussed when the shift left function was considered. The hardware provided to perform this transfer includes And gates 438 and 440 whose outputs are respectively connected to the upper and lower input terminals of the delay track input amplifier $D_I$. Connected to the input of And gate 440 is the true output terminal of the divide function flip-flop and the output of state detector IB. Connected to the input of And gate 438 is the output of And gate 440 and the output of the accumulator register output amplifier $A_0$. The outputs of And gates 442 and 444 are respectively connected to the upper and lower input terminals of the accumulator register input amplifier $A_I$. Connected to the input of And gate 444 is the true output terminal of the divide function flip-flop and the output of the state detector IB.

The output of gate 444 is coupled to the input of gate 442 together with the output of the delay track output amplifier $D_0$. The C counter is decremented by one by applying 23 pulses to the clock input terminals of stage 1 thereof. The 23 pulses are developed by connecting the outputs of previously mentioned Or gate 206 to the input of And gate 442 along with the output of the source of signal $G_{clo}$, the output of the state detector IB and the true output terminal of the divide function flip-flop. The division operation is terminated in the same manner and through the utilization of the same hardware, i.e., through gate 112 of FIGURE 7, as was used to terminate the multiplication operation.

As the equation of FIGURE 22(*i*) indicates, state IIB merely serves the purpose of switching the cycle counter back to previously described state IIIB in which state the series of subtractions is again performed.

Attention is now called to Table VIII below which illustrates the procedure for performing a square root operation. The number whose square root is desired is entered into the accumulator register and the root as it is developed is stored in the multiplier-quotient register. The decimal point of the extracted root is automatically aligned with the decimal point of the number whose root is being extracted. The accumulator register at all times holds the difference between the partial root squared and the original number times a scaling factor (equal to ten to the power equivalent to the decimal point selector circuit setting). The entry register is utilized to hold intermediate computations.

The square root method utilized develops the digits of the root from most to least significant. The method is somewhat similar to that previously described for division. More particularly, the two most significant digits of the original number are tested to see what is the largest digit squared that can be taken from these two digits. This number is the most significant digit of the root. The next digit of the root is found by finding the largest $b$ that can satisfy the following equation without an oversubtraction occurring (maintaining the difference positive):

$$N-(2ab+b^2)$$

where $b$ is the root digit presently being tested;

$a$ is equal to the already determined root digits; and

N is the remainder left in the accumulator register and is equal to the original number minus the square of the quantity "$a$." The equation is solved by successively subtracting the sum of two quantities from the remainder, (each successive subtraction utilizing a greater value of "$b$") the subtractions continuing until an oversubtraction occurs. After the cycle in which the remainder in the accumulator register becomes negative, the amount subtracted in the previous cycle is added back into the accumulator, thereby restoring the remainder. The number of successive subtractions which can be performed before the remainder in the accumulator becomes negative constitutes the root digit.

The first of the two quantities subtracted from the remainder is equal to $2a$ which is subtracted $b$ times thereby constituting the term $2ab$. The second term is equal to $(2b-1)$ which on the first subtraction (i.e., when $b=1$) is equal to one, on the second subtraction (i.e., when $b=2$) is equal to three, on the third subtraction (i.e., when $b=3$) is equal to five, etc. The sum of the subtractions of the second term constitutes the $b^2$ term of the equation set forth above.

The square root operation is divided into two phases. The steps of phase A relate to whole number square root operation and the steps of phase B relate to fractional number square root operation. For a better understanding of the square root operation, consider Table VIII below which indicates the steps required to develop the square root of the number 3975.82 which is initially stored in the accumulator register.

*TABLE VIII*

| | 2 2 2 2 1 1 1 1 1 1 1 1 1 1<br>3 2 1 0 9 8 7 6 5 4 3 2 1 0 9 8 7 6 5 4 3 2 1 0 | |
|---|---|---|
| Entry register | 0 0 0 0 0 0 0 0 | C counter=22 |
| Multiplier-Q register | 0 0 0 0 0 0 0 0 | |
| Accumulator register | 0 0 3 9 7 5.8 2 | M counter= 0 |
| Δb² | −1 | |
| En | 0 0 0 0 0 0 0 0 | C counter=22 |
| MQ | 0 0 0 0 0 0 0 0 | |
| Acc | OF←9 9 3 9 7 5.8 2 | M counter= 0 |
| Δb² | +1 | |
| En | 0 0 0 0 0 0 0 0 | C counter=20 |
| MQ | 0 0 0 0 0 0 0 0 | |
| Acc | 0 0 3 9 7 5.8 2 | M counter= 0 |
| Δb² | | |
| En | 0 0 0 0 0 0 0 0 | C counter=20 |
| MQ | 0 0 0 0 0 0 0 0 | |
| Acc | 0 0 3 9 7 5.8 2 | M counter= 0 |
| Δb² | −1 | |
| En | 0 0 0 0 0 0 0 0 | C counter=20 |
| MQ | 0 0 0 0 0 0 0 0 | |
| Acc | 0 0 3 8 7 5.8 2 | M counter= 1 |
| Δb² | −3 | |
| En | 0 0 0 0 0 0 0 0 | C counter=20 |
| MQ | 0 0 0 0 0 0 0 0 | |
| Acc | 0 0 3 5 7 5.8 2 | M counter= 2 |
| Δb² | −5 | |
| En | 0 0 0 0 0 0 0 0 | C counter=20 |
| MQ | 0 0 0 0 0 0 0 0 | |
| Acc | 0 0 3 0 7 5.8 2 | M counter= 3 |
| Δb² | −7 | |
| En | 0 0 0 0 0 0 0 0 | C counter=20 |
| MQ | 0 0 0 0 0 0 0 0 | |
| Acc | 0 0 2 3 7 5.8 2 | M counter= 4 |
| Δb² | | |
| En | 0 0 0 0 0 0 0 0 | C counter=20 |
| MQ | 0 0 0 0 0 0 0 0 | |
| Acc | 0 0 1 4 7 5.8 2 | M counter= 5 |
| Δb² | −11 | |
| En | 0 0 0 0 0 0 0 0 | C counter=20 |
| MQ | 0 0 0 0 0 0 0 0 | |
| Acc | 0 0 0 3 7 5.8 2 | M counter= 6 |
| Δb² | −13 | |
| En | 0 0 0 0 0 0 0 0 | C counter=20 |
| MQ | 0 0 0 0 0 0 0 0 | |
| Acc | OF←9 9 9 0 7 5.8 2 | M counter= 6 |
| Δb² | +13 | |
| En | 0 0 0 0 0 0 0 0 | C counter=20 |
| MQ | 0 0 0 6 0 0 0 0 | |
| Acc | 0 0 0 3 7 5.8 2 | M counter= 0 |
| Δb² | | |
| En | 0 0 0 1 2 0 0 0 | C counter=18 |
| MQ | 0 0 0 0 6 0 0 0 | |
| Acc | 0 0 0 3 7 5.8 2 | M counter= 0 |
| Δb² | | |
| En | 0 0 0 1 2 0 0 0 | C counter=18 |
| MQ | 0 0 0 0 6 0 0 0 | |
| Acc | 0 0 0 3 7 5.8 2 | M counter= 0 |
| Δb² | −1 | |
| En | 0 0 0 1 2 0 0 0 | C counter=18 |
| MQ | 0 0 0 0 6 0 0 0 | |
| Acc | 0 0 0 2 5 4.8 2 | M counter= 1 |
| Δb² | −3 | |
| En | 0 0 0 1 2 0 0 0 | C counter=18 |
| MQ | 0 0 0 0 6 0 0 0 | |
| Acc | 0 0 0 1 3 1.8 2 | M counter= 2 |
| Δb² | −5 | |
| En | 0 0 0 1 2 0 0 0 | C counter=18 |
| MQ | 0 0 0 0 6 0 0 0 | |
| Acc | 0 0 0 0 0 6.8 2 | M counter= 3 |
| Δb² | −7 | |
| En | 0 0 0 1 2 0 0 0 | C counter=18 |
| MQ | 0 0 0 0 6 0 0 0 | |
| Acc | 9 9 9 8 7 9.8 2 | M counter= 3 |
| Δb² | +7 | |
| En | 0 0 0 1 2 0 0 0 | C counter=18 |
| MQ | 0 0 0 0 6 3 0 0 | |
| Acc | 0 0 0 0 0 6.8 2 | M counter= 0 |
| Δb² | | |
| En | 0 0 0 1 2 6 0 0 | C counter=17 |
| MQ | 0 0 0 0 6 3 0 0 | |
| Acc | 0 0 0 0 6 8.2 0 | M counter= 0 |
| Δb² | | |
| En | 0 0 0 1 2 6 0 0 | C counter=17 |
| MQ | 0 0 0 0 6 3 0 0 | |
| Acc | 0 0 0 0 6 8.2 0 | M counter= 0 |
| Δb² | −1 | |
| En | 0 0 0 1 2 6 0 0 | C counter=17 |
| MQ | 0 0 0 0 6 3 0 0 | |
| Acc | OF←9 9 9 9 4 2.1 0 | M counter= 0 |
| Δb² | +1 | |
| En | 0 0 0 1 2 6 0 0 | C counter=16 |
| MQ | 0 0 0 0 6 3 0 0 | |
| Acc | 0 0 0 0 6 8.2 0 | M counter= 0 |
| Δb² | | |
| En | 0 0 0 1 2 6 0 0 | C counter=16 |
| MQ | 0 0 0 0 6 3 0 0 | |
| Acc | 0 0 0 6 8 2.0 0 | M counter= 0 |
| Δb² | −1 | |
| En | 0 0 0 1 2 6 0 0 | C counter=16 |
| MQ | 0 0 0 0 6 3 0 0 | |
| Acc | 0 0 0 5 5 5.9 9 | M counter= 1 |
| Δb² | −3 | |
| En | 0 0 0 1 2 6 0 0 | C counter=16 |
| MQ | 0 0 0 0 6 3 0 0 | |
| Acc | 0 0 0 4 2 9.9 6 | M counter= 2 |
| Δb² | −5 | |
| En | 0 0 0 1 2 6 0 0 | C counter=16 |
| MQ | 0 0 0 0 6 3 0 0 | |
| Acc | 0 0 0 3 0 3.9 1 | M counte r= 3 |

| | 2 2 2 2 1 1 1 1 1 1 1 1 1 1<br>3 2 1 0 9 8 7 6 5 4 3 2 1 0 9 8 7 6 5 4 3 2 1 0 | |
|---|---|---|
| Δb² | −7 | |
| En | 0 0 0 1 2 6 0 0 | C counter=16 |
| MQ | 0 0 0 0 6 3 0 0 | |
| Acc | 0 0 0 1 7 7.8 4 | M counter= 4 |
| Δb² | −9 | |
| En | 0 0 0 1 2 6 0 0 | C counter=16 |
| MQ | 0 0 0 0 6 3 0 0 | |
| Acc | 0 0 0 0 5 1.7 5 | M counter= 5 |
| Δb² | −11 | |
| En | 0 0 0 1 2 6 0 0 | C counter=16 |
| MQ | 0 0 0 0 6 3 0 0 | |
| Acc | OF←9 9 9 9 2 5.6 4 | M counter= 5 |
| Δb² | +11 | |
| En | 0 0 0 1 2 6 0 0 | C counter=16 |
| MQ | 0 0 0 0 6 3.0 5 | |
| Acc | 0 0 0 0 5 1.7 5 | M counter= 0 |
| Δb² | | |

Note that the C counter is initially set to 22 and the quantity $(2b-1)$ is developed by what will henceforth be referred to as the $\Delta b^2$ generator, and successively subtracted from the number in the accumulator. In the example, the sign of the number in the accumulator changes after the initial subtraction and is then immediately restored. Subsequently, the control counter is decremented by two and the quantity $(2b-1)$ provided by the $\Delta b^2$ generator is subtracted from digit position 20 of the number in the accumulator register. The difference in the accumulator register remains positive and a second subtraction of the quantity $(2b-1)$ (this time equal to three) is performed. The resulting difference in the accumulator register is again positive and the quantity $(2b-1)$ (now equal to five) is again subtracted from the number in the accumulator. It should be apparent that the initial subtraction of the quantity provided by the $\Delta b^2$ generator (i.e., one) effectively tests to see whether the two most significant digits of the number in the accumulator are greater than $1^2$. The subsequent subtraction of the quantity provided by the $\Delta b^2$ generator (i.e., three) represents a cumulative subtraction of four which tests to see whether the two most significant digits in the accumulator register are greater than the quantity $2^2$. The subsequent subtraction of the quantity provided by the $\Delta b^2$ generator, i.e., five) made the cumulative subtraction equal to nine which of course represents a test determining whether the two most significant digits of the number in the accumulator register are greater than $3^2$. For each subtraction, the M counter is incremented by one. On the subtraction which causes the number in the accumulator register to change sign, the number in the M counter is frozen and subsequently transferred into the multiplier-quotient register as one of the root digits. The quantity provided by the $\Delta b^2$ generator which caused the number in the accumulator register to change sign is added back into the accumulator register to restore the remainder which appeared therein immediately before the sign of the accumulator register changed. Subsequently, the C counter is decremented by two. The contents of the multiplier-quotient register are shifted right one rigid position and then doubled and transferred into the entry register. Development of further root digits requires that the sum of the contents of the entry register (representing the quantity $pa$) and the number provided by the $\Delta b^2$ generator be subtracted from the number in the accumulator register, a $b$ number of times while the M counter is being incremented. This procedure is followed for so long as whole numbers in the accumulator register are being considered. Once it is sensed that the numbers proveded by the $\Delta b2$ generator are to be subtracted from a fractional number in the accumulator register, the C counter is thereafter decremented by one each time the count in the accumulator changes sign and the number in the accumulator is concurrently shifted to the left one digit. The multiplier-quotient register is not thereafter shifted.

Attention is now called to FIGURE 23($a$) which illustrates a flow diagram showing the various states assumed by the cycle counter in the performance of the square root operation, and FIGURES 23(*b*) through (*h*) which illustrate the portions of the calculator apparatus utilized in each state. In the reset state, in response to the actuation of the square root function key, the square root function flip-flop is set thereby resetting the control counter and switching the cycle counter to state IA.

In state IA both the entry and the multiplier-quotient registers are cleared. This is accomplished by connecting the output of And gate 500 to the lower input terminal of the entry and multiplier-quotient register input amplifiers E1 and M1. The inputs to the And gate 500 are connected to the true output terminal of the square root function flip-flop and the output of state detector IA. Also, the C counter is set to a count of 22 in response to the provision of a signal by And gate 502. Connected to the input of And gate 502 is the output of state detector IA, the true output terminal of the square root function flip-flop, and the output of gate 79 of FIGURE 4(*b*) developing signal $t_2$. In response to the development of an origin signal, the cycle counter is switched from state IA to state IIA. From state IIA, the cycle counter is switched to state IIIB upon the occurrence of the next origin signal.

In state IIIB the numbers designated as $\Delta b^2$ in Table VIII are generated by the $\Delta b^2$ generator. From what has been said thus far, it should be understood that the $\Delta b^2$ generator should provide one pulse for an initial test subtraction, three pulses for a subsequent subtraction, and an increasing number of odd pulses for each succeeding subtraction. For each such test subtraction which does not result in the accumulator register changing sign, the M counter must be incremented by one count. Consequently, the correct number of pulses can be provided by the $\Delta b^2$ generator by sensing the state of the M counter. Table XI illustrates the number of pulses which must be provided by the $\Delta b^2$ generator for each state of the M counter. It should be realized that the maximum number of pulses that can be developed in any one digit period is nine. In order to develop the number of pulses indicated for M counter states five through nine, it is necessary of course to develop the unit's place number of pulses during one digit period and the single ten's place number of pulses during the subsequent digit period. Consequently, note that during the digit period identified by the state of the C counter, the $\Delta b^2$ generator will provide the same number of pulses for states zero and five of the M counter but for the latter M counter state an additional pulse must be provided one digit period later. Similarly the same number of pulses are provided during the digit period identified by the C counter for M counter states one and six, two and seven, three and eight, and four and nine.

*Table IX*

| M counter state: | $\Delta b^2$ generator pulses |
|---|---|
| 0 | 1 |
| 1 | 3 |
| 2 | 5 |
| 3 | 7 |
| 4 | 9 |
| 5 | 11 |
| 6 | 13 |
| 7 | 15 |
| 8 | 17 |
| 9 | 19 |

It will be recalled that the states of the M counter are the same as those of the A counter and are defined by Table V. Note that with respect to stages 1, 2, and 3 of the M counter count 5 is the same as count 0, count 6 is the same as count 1, count 7 is the same as count 2, count 8 is the same as count 3, and count 9 is the same as count 4. Note also that stage 4 of the M counter is "0" in counts zero through four and "1" in counts five through nine. This truth table symmetry was designed into the M counter to simplify the construction of the $\Delta b^2$ generator.

More particularly, whenever state M4 of the M counter is true, the And gate 504 in the $\Delta b^2$ generator of FIGURE 2(*e*) will provide a pulse to Or gate 506 one digit period (as controlled by the signal $K'_{DC}$ after the digit period identified by the state of the control counter. As indicated, the And gate 504 will provide that single pulse concurrent with the development of signal P9 by gate 70 of FIGURE 3(*b*). As will become more apparent below, the signal P9 is chosen so as to prevent loss of the signal provided by gate 504 which might occur if that signal were applied to the A counter simultaneous with the development of a pulse by the entry register output amplifier. The $\Delta b^2$ pulses developed by the initial three stages of the M counter are formed by the And gates 508, 510, 512, and 514 during the interval defined by signal $P_t$ being true, this term being applied to the input of And gate 518. Note that the inputs to And gate 508 comprise the false output terminals of stages M1 and M2 of the M counter together with the signal P1 provided by gate 66 of FIGURE 3(*b*). The effect of these inputs to gate 508 is to cause gate 508 to be true concurrent with only one pulse of the signal $G_{clo}$. The inputs to gate 510 comprise the true output terminal of flip-flop M2 and the false output terminals of flip-flops M1 and M3 together with the true output terminal of flip-flop B1. Consequently, gate 510 is true in each interval defined by signal $P_t$ being true for a duration in which five pulses of signal $G_{clo}$ occur. Similarly, when the M counter defines count three gate 512 is true for a period in which seven pulses of signal $G_{clo}$ are developed. When the M counter defines state 1, gate 514 is true for a period in which three pulses of signal $G_{clo}$ are developed. When the M counter defines count four, as a result of coupling the true output terminal of flip-flop M3 to the input of Or gate 516, the output of gate 516 is true for a period in which nine pulses of the signal $G_{clo}$ are developed. The outputs of all of the gates 508, 510, 512, and 514 are also connected to the input of the OR gate 516. The output of Or gate 516 is connected to the input of gate 518 along with the output of the source of signal $G_{clo}$, the output of gate 76 of FIGURE 3(*b*) providing signal $P_t$ and the out of the coincidence circuit providing signal $K_{DC}$. Thus, it should be apparent that the $\Delta b^2$ generator illustrated in FIGURE 23(*e*) provides either 1, 3, 5, 7, or 9 pulses during the period in which the state of the D and C counters coincide. When the M counter defines counts five through nine, the $\Delta b^2$ generator additionally provides a pulse one digit period later when signal P9 is generated.

The number of pulses provided by the $\Delta b^2$ generator is subtracted from the number in the accumulator register by applying the complement of the output of the $\Delta b^2$ generator to the input of And gate 530 whose output is connected to the input of Or gate 530 whose output in turn is conneced to the clock input terminals of stage 1 of the A counter. Also connected to the input of And gate 530 is the complement of the output of the entry register output amplifier $E_0$ and the output of the source of signal $G_{clo}$. The output of And gate 532 to which is applied the output of the accumulator register output amplifier $A_0$ and the output of the source of signal $G_{cle}$ is also connected to the input of Or gate 120. Connected to the input of both And gates 530 and 532 is the output of gate 77 of FIGURE 4(*b*) developing signal $N_t$, the true output terminal of the square root function flip-flop, and the output of state detector IIIB. As can be noted in the Table VIII set forth above, it is characteristic of the square root operation that during the digit period in which the C and D counters coincide and a plurality of pulses are provided by the $\Delta b^2$ generator, the contents of the corresponding entry register digit sector is zero meaning therefore that pulses provided by the $\Delta b^2$ generator and output amplifier $E_0$ will not coincide and that therefore they can be applied to the same And gate, i.e., And gate 530. During the digit period subsequent to coincidence between the C and D counters, the $\Delta b^2$ generator will sometimes provide one pulse, as previously noted, when the count in the M counter is five or greater. However, this pulse will be provided in coincidence with the development of signal P9 when, it should be realized, the entry register output amplifier $E_0$ could not provide a pulse since the highest digit which could possibly be stored in a coresponding digit sector of the entry register is eight since that digit sector stores twice the value of the last root digit developed.

During state IIIB, the M counter is incremented once each memory cycle, so long as the sign of the number in the accumulator register does not change. As previously discussed, the state of the carry flip-flop $F_c$ determines whether or not the sign of the number in the accumulator register has changed. In order to increment the M counter the output of And gate 534 is connected to the clock input terminals of stage 1 of the M counter. Connected to the input of AND gate 534 is the true output terminal of the square root function flip-flop, the output of state detector IIIB, the false output terminal of the carry flip-flop and the source of the origin signal.

Additionally, during state IIIB the difference developed in the A counter between the number in the accumulator register and the sum of the number in the entry register and the number developed by the $\Delta b^2$ generator is rewritten into the accumulator register. This is accomplished by providing And gates 536 and 538 which are respectively connected to the upper and lower input terminals of the accumulator register input amplifier $A_I$. The true output terminal of the square root function flip-flop and the output of state detector IIIB are connected to the input of And gate 538 whose output is connected to the input of And gate 536. In addition, the output of the source of signal $G_{clo}$ and the inverted output of And gate 218 sensing the zero state of the R counter are applied to the input of And gate 536. The cycle counter will remain in state IIIB so long as the sign of the number in the accumulator register does not change. That is, so long as the state of the carry flip-flop is false when the origin signal is generated. When the state of the carry flip-flop is true when the origin signal is generated, the cycle counter will be switched from state IIIB to state IVB as evidenced by the logical equation set forth in FIGURE 22(e).

During state IVB the number in the accumulator register is restored to its value prior to the oversubtraction occurring in state IIIB. This addition restoration is accomplished by connecting the And gates 539, 540, and 542 to the clock input terminals of stage 1 of the A counter through gate 120. The output of gate 77 of FIGURE 4(b) providing signal $N_t$, the true output terminal of the square root function flip-flop, and the output of the state detector IVB are all connected to the inputs of And gates 539, 540, and 542. The output of the source of signal $G_{clo}$ is connected to the input of both And gates 539 and 540. In addition, the outputs of the $\Delta b^2$ generator and amplifier $E_0$ are respectively connected to the inputs of gates 539 and 540. The output of the accumulator register output amplifier $A_0$ and the output of the source of signal $G_{cle}$ are connected to the input of And gate 542. The restored number is entered into the accumulator register in the same manner as in state IIIB. That is, gates 544 and 546 are provided which correspond to the gate 536 and 538 except however that the output of state detector IVB, rather than state detector IIIB, is coupled to the input of gate 546.

During state IVB, a determination is made as to whether ister is restored to its value prior to the oversubtracis being taken is a whole number or a fractional number. If it is a fractional number, then the logic flipflop $L_0$ is reset by the output of And gate 548. The inputs to And gate 548 comprise the true output terminal of the square root function flip-flop, the output of state detector IVB, the output of coincidence circuit 38 providing signal $K_{DC}$, the output of coincidence circuit 34 providing signal $K_p$, and the output of gate 69 [FIGURE 3(b)] providing signal P3. It should be understood that And gate 548 will provide a true output signal when both the state of the C counter and the state of the decimal point selector both coincide with the state of the D counter, which of course means that they coincide with each other. In any event, in response to the development of the origin signal, the cycle counter is switched from state IVB to state IB.

During state IB the C counter is decremented by either two or one, depending upon whether the number in the accumulator register is a whole number or a fractional number, as would be evidenced by the state of the logic flip-flop. In order to decrement the control counter by one, a source of 23 pulses, as would be provided by Or gate 206, is provided and connected to the input of And gate 550 whose output is connected to the clock input terminals of stage 1 of the C counter. The output of the source of signal $G_{clo}$ is also connected to the input of And gate 550. The output of Or gate 552 which is connected to the input of And gate 550 and which is dependent upon the state of the logic flip-flop $L_0$ enables the And gate 550 for a period equal to 23 pulses which could cause the control counter to be decremented by one count as is desired if the number in the accumulator register is a fraction or for a period equal to 22 pulses which would cause the control counter to be decremented by two if the number in the accumulator register is a whole number. In order to enable the gate 550 for a period of 23 pulses, an And gate 554 is provided whose output is connected to the input of Or gate 552. And gate 556 whose output is also connected to the input of Or gate 552 causes the And gate 550 to be enabled for a period equaling only 22 pulses. The true output terminal of the square root function flip-flop and the output of state detector IB are connected to the input of both And gates 554 and 556. In addition, the false output terminal of the logic flip-flop is connected to the input of And gate 554 while the true output terminal of the logic flipflop $L_0$ is connected to the input of And gate 556. In addition, the output of gate 64 of FIGURE 3(b) providing signal P0 is connected through an inverter 560 to the input of And gate 556 which disables gate 556 and gate 550 during bit period 0, during time $t_2$ as well as $t_1$ thereby permitting only 22 pulses to be applied to the control counter.

Also occurring during state IB is a transfer of the contents of the M counter to the M register and the subsequent shifting of the contents of the M register one digit position to the right. The transfer of the contents of the M counter to the M register is accomplished by connecting the outputs of And gate 561 and Or gate 562 to the lower and upper input terminals of the M register input amplifier $M_I$ respectively. The inputs to And gate 561 comprise the true output terminal of the square root function flip-flop and the output of state detector IB. The inputs to gate 562 comprise the outputs of And gates 563 and 564. Gate 563 is used to transfer the contents of the M counter through the R counter onto the M register and for this purpose the output of the source of signal $G_{clo}$, the inverted output of And gate 218, and the source of signal $K_{DC}$ are connected to the inputs thereof. The right shift in the M register is accomplished by gate 564 to whose inputs are connected, the source of signal $G_{clo}$, the output of amplifier $M_0$, the source of signal $K_{DC}$ and the true output terminal of the logic flipflop. The output of gate 561 is connected to the input of both gates 563 and 564. The true output terminal of the logic flip-flop is connected to the input of gate 564, inasmuch as the right shift in the M register is required only when a whole number square root is being performed which is indicated by the logic flip-flop being true.

Also performed during state IB is a left shift in the accumulator register if a fractional square root operation is being performed. The left shift in the accumulator register is of course performed by transferring the contents of the accumulator register to the delay track and then back to the accumulator register. This is accomplished by connecting the outputs of gates 568 and 570 to the upper and lower input terminals of the delay register input amplifier $D_I$. The inputs to the gate 570 include the true output terminal of the square root function flip-flop, the output of state detector IB, and the false output terminal of the logic flip-flop $L_0$. The output of gate 570 is connected to the input of gate 568 along with the output of the accumulator register output amplifier $A_0$. Transfer from the delay track back to the accumulator register is accomplished by connecting the outputs of gates 572 and 574 to the upper and lower input terminals of the input amplifier $A_I$. The inputs to gate 574 are identical to the inputs to gate 570. The output of gate 574 is connected to the input of gate 572 along with the output of the delay track output amplifier $D_0$.

During state IB, the M counter is reset by connecting the output of And gate 576 to the reset input terminal of the M counter. The inputs to And gate 576 comprise the output of the state detector IB and the output of the source of origin signal. If, after state IB, the square root operation is not terminated by gate 112 clearing the function flip-flops which would occur after the control counter passes its zero state, the control counter moves into state IIB.

During state IIB, the contents of the M register are doubled and entered into the entry register. Doubling is accomplished by connecting the output of the M register output amplifier $M_0$ to the input of gates 580 and 582 whose outputs are coupled through gate 120 to the clock input terminals of the first stage of the A counter. Gate 580 is enabled in response to the development of pulses of the signal $G_{clc}$ while gate 582 is enabled in response to the development of pulses of signal $G_{cle}$. Additional inputs common to the gates 580 and 582 include the true output terminal of the square root function flip-flop, the output of state detector IIB, and the output of gate 77 of FIGURE 4(b) providing signal $N_t$. The contents of the A counter are thereafter entered into the entry register by connecting the outputs of gates 584 and 586 to the upper and lower input terminals of the input amplifier $E_I$. The inputs to gate 586 comprise the true output terminal of the square root function flip-flop and the output of state detector IIB. The output of gate 586 is connected to the input of gate 584 along with the output of the source of signal $G_{clc}$ and the output of gate 218 sensing a zero count in the R counter. From state IIB, the cycle counter is switched to state IIIB in response to the development of the origin signal.

Attention is now called to FIGURE 24 which illustrates a schematic block diagram of means for automatically operating the calculator in response to a record, e.g., on punched paper tape, together with means for producing the punched paper tape in response to manual actuation of the calculator keyboard. Apparatus of the type illustrated in FIGURE 24 is useful in order to perform complex operations, e.g., series expansions, which require that a plurality of function keys be actuated in a certain sequence. In any particular environment in which the calculator apparatus might be used, the need for performing the same complex operations with respect to different numerical data, may frequently arise. In such situations, it would of course be desirable to generate a record, as for example on punched paper tape, in response to an initial sequence of manual key actuations by the calculator user and thereafter run the calculator apparatus automatically in response to such a record with respect to numerical data manually entered into the calculator.

The equipment of FIGURE 24 includes a control device 600 having playback, manual, and record output terminals, each of which can be selectively made true in response to the manual actuation of keys (not shown) on the control device 600. In order to operate the calculator in response to information recorded on a paper tape, the outputs of a decoder device 602 which is connected to a paper tape reader 604, are effectively connected in parallel with the function keys 606 of the previously discussed keyboard. That is, the decoder device 602 will have a plurality of output terminals, each of which corresponds to a different one of the keys 606. Each decoder device output terminal is connected to the input of an And gate 608 along with the playback output terminal of the control device 600. The corresponding key 606 is connected to the input of an And gate 610 along with the manual output terminal of the control device 600. The outputs of gates 608 and 610 are connected to the input of an Or gate 612 whose output is utilized to set the function flip-flops of FIGURE 7. The outputs of gate 612 are additionally coupled to the input of an interlock circuit 614, analogous to the circuit 120 of FIGURE 7, for the purpose of assuring that an operation in response to the actuation of a first function key is completed prior to an operation in response to the actuation of a second function key is initiated. The output of the interlock circuit 614 is connected to the input of an And gate 616 along with the playback output terminal of control device 600 and an output of the decoder 602 which is made false in response to a "stop" code being developed. The output of And gate 616 is connected to a circuit 618 which controls the movement of the paper tape reader 604.

Thus, it should be understood that a paper tape having a sequence of entries recorded thereon, each entry indicating a function key to be actuated, can be processed by the reader 604 and decoder 602 to effectively cause the calculator apparatus to perform the same operations with respect to numeric data stored in the registers as if the function keys were being manually actuated. The reader control circuit 618 functions to move the tape in the reader 604 in increments at times determined by the interlock circuit 614. Of course, the reader control circuit 618 is only actuated when the playback output terminal of the control device 600 is true and only so long as the decoder 602 does not sense a "stop" code.

The tape utilized by the paper tape reader 604 can be generated by a paper tape punch device 620 controlled by a punch control circuit 622. Information is provided to the paper tape punch device 620 by an encoder circuit 624. The output of each of the And gates 610 which is set true in response to the actuation of the associated key when the system is being operated in a manual mode, i.e., the manual output terminal of the control device 600 is true, is connected to the input of the encoder circuit 624. Additionally, a stop switch 626 is connected to an input terminal of the encoder circuit 624 such that when it is actuated the encoder circuit 624 generates a "stop" code. The stop switch 626 is preferably physically located on the control device 600. The output of the interlock circuit 614 together with the record output terminal of the control device 600 are connected to the input of an And gate 628 whose output is connected to the punch control circuit 622.

When it is desired to generate a record of manual key actuations for use by the paper tape reader 604, the manual and record output terminals of the control device 600 are made true. By then sequencing through a series of manual key actuations, the encoder 624 will provide signals to the paper tape punch of the type which can be read by the reader 604 to operate in the aforementioned manner. The punch control circuit 622 increments the tape and the punch 620 at times determined by the interlock circuit 614.

Thus, the apparatus of FIGURE 24 can be utilized to effectively automatically perform the same operations on different numerical data for relieving the calculator user of the key actuation chore. It is further contemplated, that if desired, codes can be incorporated for causing the contents of the registers to be selectively read in and out to thereby produce hard copy numeric outputs and/or a numeric record which can be interpreted by the paper tape reader for number key entry. Alternatively, means for photographing the display device to produce a hard copy output of the register contents can be employed.

From the foregoing, it should be appreciated that a calculator has been disclosed herein which is capable of performing a multitude of arithmetic and other operations utilizing electronic rather than electromechanical apparatus. The advantages of an electronic calculator apparatus over electromechanical apparatus able to perform the same functions have been pointed out in the introductory portion of the specification. Briefly, these advantages include more rapid operation, more accurate operation, and more reliable operation. In addition, the calculator apparatus described herein is considerably lighter in weight and less noisy than heretofore known apparatus for performing similar functions.

Although the mere provision of an electronic calculator apparatus as distinguished from an electromechanical apparatus represents a considerable step forward in the art, the particular embodiment of the electronic apparatus disclosed herein encompasses a plurality of exceptionally valuable features. Primarily, a relatively inexpensive apparatus has been provided by restricting the arithmetic operations to counting operations thereby requiring the provision of a minimum amount of hardware. In addition, the provision of a small magnetic memory, such as disclosed herein, suitable for recording pulses in the manner indicated for representing digits lends itself exceedingly well to the disclosed counting techniques and in addition eliminates the required use of pencil and paper notation by an operator, which notation is typically required in the utilization of heretofore known calculators. Moreover, the significance of the incorporation of a display device for at all times displaying to the operator the contents of the various registers permits the operator to visibly check entered numbers and thereby considerably reduces the likelihood of introducing any human error into calculations.

What is claimed is:

1. A calculator apparatus comprising:
a memory having a plurality of number storage registers, each number storage register including a plurality of digit storage locations, each digit storage location including a plurality of bit storage positions;
source means periodically providing a clock pulse;
readout means for reading from each of said number storage regsiters;
write in means for writing into each of said number storage registers;
a keyboard including a plurality of register keys, a plurality of numeric keys, and a plurality of function keys;
a counter;
means responsive to the actuation of each of said numeric keys for entering a different digit into said counter;
means for connecting said source means to said counter for decrementing said counter in response to each of said provided clock pulses;
a gate;
means for connecting said source means and said counter to said gate for causing said gate to develop output pulses in synchronism with each of said clock pulses for so long as said counter is in a non-zero state;
means for identifying one of said digit storage locations;
means responsive to the actuation of each of said register keys for coupling said gate to said write in means for recording said output pulses in said identified digit storage location with each of said output pulses being recorded in a different one of said bit storage positions; and
means responsive to the selective actuation of each of said function keys for performing selected operations with respect to the numbers stored in said registers.

2. A calculator apparatus comprising:
a memory including a movable surface having a magnetizable medium, divided into a plurality of tracks, formed thereon;
said plurality of tracks including a clock track and a plurality of number storage register tracks;
each of said number storage register tracks including a plurality of digit storage locations, each digit storage location including a plurality of bit storage positions;
a read out head and a write in head associated with each of said number storage registers;
source means, including a clock track read out head, for providing a clock pulse in synchronism with the passage of each of said bit positions under one of said heads;
a keyboard including a plurality of register keys, a plurality of numeric keys, and a plurality of function keys;
a counter;
means responsive to the actuation of each of said numeric keys for entering a different number into said counter;
means for connecting said source means to said counter for decrementing said counter in response to each of said provided clock pulses;
a gate;
means for connecting said source means and said counter to said gate for causing said gate to develop output pulses in synchronism with each of said clock pulses for so long as said counter is in a non-zero state;
means for identifying one of said digit storage locations;
means responsive to the actuation of each of said register keys for coupling said gate to a different one of said register write in heads for recording said output pulses in said identified digit storage location with each of said output pulses being recorded in a different one of said bit storage positions; and
means responsive to the selective actuation of each of said function keys for performing selected operations with respect to the numbers stored in said registers.

3. A calculator apparatus comprising:
a cyclic memory including a movable surface having a magnetizable medium, divided into a plurality of tracks, formed thereon;
said plurality of tracks including a clock track and a plurality of number storage register tracks;
each of said number storage register tracks including a plurality of digit storage locations, each digit storage location including a plurality of bit storage positions;
a read out head and a write in head associated with each of said number storage registers;
source means, including a clock track read out head, for providing a clock pulse in synchronism with the passage of each of said bit positions under one of said heads;
a keyboard including a plurality of register keys, a plurality of numeric keys, and a plurality of function keys;
a counter;
means responsive to the actuation of each of said numeric keys for entering a different number into said counter;
means for connecting said source means to said counter for decrementing said counter in response to each of said provided clock pulses;

a gate;

means for connecting said source means and said counter to said gate for causing said gate to develop output pulses in synchronism with each of said clock pulses for so long as said counter is in a non-zero state;

a cyclic bit position counter capable of defining a number of different states equal to the number of bit positions in each digit storage location;

means coupling said source means to said bit position counter for incrementing said bit position counter in response to the provision of each of said clock pulses;

a digit storage location counter;

means coupling said bit position counter to said digit storage location counter for incrementing said digit storage location counter in response to each cycle of said bit position counter;

a control counter;

means for selectively entering a selected count into said control counter;

a first coincidence circuit for providing a first coincidence pulse in response to the count of said digit storage location counter being identical to the count in said control counter;

means responsive to the actuation of each of said register keys for coupling said gate to a different one of said register write in heads for recording said output pulses in response to the provision of said first coincidence pulse with each of said output pulses being recorded in a different one of said bit storage positions; and means responsive to the selective actuation of each of said function keys for performing selected operations with respect to the numbers stored in said registers.

4. The calculator apparatus of claim 3 wherein each of said counters is comprised of a plurality of binary stages;

each of said binary stages comprising flip-flop circuits including first and second transistors.

5. A calculator apparatus comprising:

a cyclic memory including a movable surface having a magnetizable medium, divided into a plurality of tracks, formed thereon;

said plurality of tracks including a clock track and a plurality of number storage register tracks;

each of said number storage register tracks including a plurality of digit storage locations, each digit storage location including a plurality of bit storage positions;

a read out head and a write in head associated with each of said number storage registers;

source means, including a clock track read out head, for providing a clock pulse in synchronism with the passage of each of said bit positions under one of said heads;

a keyboard including a plurality of register keys, a plurality of numeric keys, and a plurality of function keys;

a counter;

means responsive to the actuation of each of said numeric keys for entering a different number into said counter;

means for connecting said source means to said counter for decrementing said counter in response to each of said provided clock pulses;

a gate;

means for connecting said source means and said counter to said gate for causing said gate to develop output pulses in synchronism with each of said clock pulses for so long as said counter is in a non-zero state;

a cyclic bit position counter capable of defining a number of different states equal to the number of bit positions in each digit storage location;

means coupling said source means to said bit position counter for incrementing said bit position counter in response to the provision of each of said clock pulses;

a digit storage location counter;

means coupling said bit position counter to said digit storage location counter for incrementing said digit storage locaton counter in response to each cycle of said bit position counter;

a control counter;

means for selectively entering a selected count into said control counter;

a first coincidence circuit for providing a first coincidence pulse in response to the count of said digit storage location counter being identical to the count in said control counter;

means responsive to the actuation of each of said register keys for coupling said gate to a different one of said register write in heads for recording said output pulses in response to the provision of said first coincidence pulse with each of said output pulses being recorded in a different one of said bit storage positions;

means responsive to the selective actuation of each of said function keys for performing selected operations with respect to the numbers stored in said registers;

reset circuit means responsive to each cycle of said memory for providing a reset pulse; and means coupling said reset circuit to said bit position and digit storage location counters for causing said reset pulse to effect the resetting thereof.

6. A calculator apparatus comprising:

a cyclic memory including a movable surface having a magnetizable meduim, divided into a plurality of tracks, formed thereon;

said plurality of tracks including a clock track and a plurality of number storage register tracks;

each of said number storage register tracks including a plurality of digit storage locations, each digit storage location including a plurality of bit storage positions;

a read out head and a write in head associated with each of said number storage registers;

source means, including a clock track read out head, for providing a clock pulse in synchronism with the passage of each of said bit positions under one of said heads;

a keyboard including a plurality of register keys, a plurality of numeric keys, and a plurality of function keys;

a counter;

means responsive to the actuation of each of said numeric keys for entering a different number into said counter;

means for connecting said source means to said counter for decrementing said counter in response to each of said provided clock pulses;

a gate;

means for connecting said source means and said counter to said gate for causing said gate to develop output pulses in synchronism with each of said clock pulses for so long as said counter is in a non-zero state;

a cyclic bit position counter capable of defining a number of different states equal to the number of bit positions in each digit storage location;

means coupling said source means to said bit position counter for incrementing said bit position counter in response to the provision of each of said clock pulses;

a digit storage location counter;

means coupling said bit position counter to said digit storage location counter for incrementing said digit storage location counter in response to each cycle of said bit position counter;
a control counter;
means for selectively entering a selected count into said control counter;
a first coincidence circuit for providing a first coincidence pulse in response to the count of said digit storage location counter being identical to the count in said control counter;
means responsive to the actuation of each of said register keys for coupling said gate to a different one of said register write in heads for recording said output pulses in response to the provision of said first coincidence pulse with each of said output pulses being recorded in a different one of said bit storage positions;
means responsive to the selective actuation of each of said function keys for performing selected operations with respect to the numbers stored in said registers;
reset circuit means responsive to each cycle of said memory for providing a reset pulse;
means coupling said reset circuit to said bit position and digit storage location counters for causing said reset pulse to effect the resetting thereof;
a cyclic word counter;
means coupling said word counter to said digit storage location counter for incrementing said word counter in response to each resetting of said digit storage location counter;
a display device including a cathode ray tube;
means responsive to the count in said digit storage location counter for developing a first direction deflection voltage;
means responsive to the count in said word counter for developing a second direction deflection voltage; and
means for applying said first and second direction deflection voltage to said cathode ray tube.

7. A calculator apparatus comprising:
a memory including a movable surface having a magnetizable medium, divided into a plurality of tracks, formed thereon;
said plurality of tracks including a clock track, a delay track, and a plurality of number storage register tracks;
each of said number storage register tracks including a plurality of digit storage locations, each digit storage location including a plurality of bit storage positions;
a plurality of aligned read out heads each of which is associated with a different one of said storage registers;
a plurality of aligned write in heads each of which is associated with a different one of said storage registers, said write-in heads spaced from said read out heads so as to lead said read out head by a distance equal to one digit storage location;
a delay track write in head aligned with said register track read out heads;
a delay track read out head spaced from said delay track write in head so as to lead said delay track read out head by a distance equal to two digit storage locations;
source means, including a clock track read out head, for providing a clock pulse in synchronism with the passage of each of said bit positions under one of said heads;
a keyboard including a plurality of register keys, a plurality of numeric keys, and a plurality of function keys;
a counter;
means for successively entering numbers into said counter;
means for connecting said source means to said counter for decrementing said counter in response to each of said provided clock pulses;
a gate;
means for connecting said source means and said counter to said gate for causing said gate to develop output pulses in synchronism with each of said clock pulses for so long as said counter is in a non-zero state;
means responsive to the selective actuation of a first of said function keys for shifting digits in one of said registers in a first direction including means for coupling the read out head of said one register directly to the write in head thereof; and
means responsive to the actuation of a second of said function keys for shifting the digits stored in said one register in a second direction including means for coupling the read out head of said one register to the delay track write in head and for coupling the delay track read out head to the write in head of said one register.

8. A calculator apparatus comprising:
a cyclic memory including a movable surface having a magnetizable medium, divided into a plurality of tracks, formed thereon;
said plurality of tracks including a clock track and a plurality of number storage register tracks;
each of said number storage register tracks including a plurality of digit storage locations, each digit storage location including a plurality of bit storage positions;
a read out head and a write in head associated with each of said number storage registers;
source means, including a clock track read out head, for providing a clock pulse in synchronism with the passage of each of said bit positions under one of said heads;
a cyclic bit position counter for counting said clock pulses;
means for representing a multidigit decimal number on each of said register tracks including means for recording, during each cycle of said bit position counter, a quantity of magnetically recognizable marks equal to the value of the digit to be represented;
said means for recording including a first decade counter;
means for entering a count into said first decade counter;
means for connecting said source means to said first decade counter for decrementing said first decade counter in response to each of said provided clock pulses;
a gate;
means for connecting said source means and said first decade counter to said gate for causing said gate to develop output pulses in synchronism with each of said clock pulses for so long as said first decade counter is in a non-zero state; and
means for coupling said gate to the write in head associated with a selected one of said number storing register tracks for causing each of said output pulses to record a mark thereon.

9. A calculator apparatus comprising:
a cyclic memory including a movable surface having a magnetizable medium, divided into a plurality of tracks, formed thereon;
said plurality of tracks including a clock track and a plurality of number storage register tracks;
each of said number storage register tracks including a plurality of digit storage locations, each digit storage location including a plurality of bit storage positions;
a read out head and a write in head associated with each of said number storage registers;
source means, including a clock track read out head, for providing a clock pulse in synchronism with the passage of each of said bit positions under one of said heads;

a cyclic bit position counter for counting said clock pulses;

means for representing a multidigit decimal number on each of said register tracks including means for recording, during each cycle of said bit position counter, a quantity of magnetically recognizable marks equal to the value of the digit to be represented;

a keyboard including a plurality of register keys and a plurality of function keys;

a first decade counter;

a second decade counter;

means responsive to the actuation of certain ones of said register and function keys for coupling the read out head associated with a first of said number storing register tracks to said first decade counter for incrementing said first decade counter in response to each mark recorded on said first register track;

means for resetting said first decade counter during each cycle of said bit position counter;

means for periodically transferring the contents of said first decade counter to said second decade counter;

means for connecting said source means to said second decade counter for decrementing said second decade counter in response to each of said provided clock pulses;

a gate;

means for connecting said source means and said second decade counter to said gate for causing said gate to develop output pulses in synchronism with each of said clock pulses for so long as said second decade counter is in a non-zero state; and means for coupling said gate to the write in head associated with a second of said number storing register tracks for causing each of said output pulses to record a mark thereon.

10. Apparatus for representing multidigit decimal numbers and for performing an arithmetic addition operation with respect thereto comprising;

a cyclic memory including a movable surface having a magnetizable medium, partitioned into a clock track and a plurality of number storing register tracks, deposited thereon;

clock track read out means for providing a series of odd clock pulses;

bit position cyclic counter means for counting said odd clock pulses;

digit storage location counter means for counting cycles of said bit position counter;

means for representing a multidigit decimal number on each of said register tracks including means for recording, during each cycle of said bit position counter means, a quantity of magnetically recognizable marks equal to the value of the digit to be represented, each such mark being recorded in synchronism with the provision of one of said odd clock pulses;

an adder decade counter;

means for developing a series of even clock pulses, each even clock pulse occurring a specified interval after an odd clock pulse;

a different read out means associated with each of said register tracks; and means for applying marks read from a first of said registers to said adder counter in synchronism with said odd clock pulses and for applying marks read from a second of said registers to said adder counter in synchronism with said even clock pulses.

11. Apparatus for representing multidigit decimal numbers and for performing an arithmetic addition operation with respect thereto comprising:

a cyclic memory including a movable surface having a magnetizable medium, partitioned into a clock track and a plurality of number storing register tracks, deposited thereon;

clock track read out means for providing a series of odd clock pulses;

bit position cyclic counter means for counting said odd clock pulses;

digit storage location counter means for counting cycles of said bit position counter;

means for representing a multidigit decimal number on each of said register tracks including means for recording, during each cycle of said bit position counter means, a quantity of magnetically recognizable marks equal to the value of the digit to be represented, each such mark being recorded in synchronism with the provision of one of said odd clock pulses;

an adder decade counter;

means for developing a series of even clock pulses, each even clock pulse occurring a specified interval after a clock pulse;

a different read out means associated with each of said register tracks;

means for applying marks read from a first of said registers to said adder counter in synchronism with said odd clock pulses and for applying marks read from a second of said registers to said adder counter in synchronism with said even clock pulses;

a carry flip-flop;

means for coupling the output of said carry flip-flop to said adder decade counter once during each bit position counter cycle; and means coupling said adder decade counter to said carry flip-flop for setting said carry flip-flop in response to the count in said adder decade counter exceeding nine.

12. Apparatus for representing multidigit decimal multiplier and multiplicand numbers and for performing an arithmetic multiplication operation with respect thereto comprising:

a cyclic memory including a movable surface having a magnetizable medium, partitioned into a clock track and a plurality of number storing register tracks, deposited thereon;

clock track read out means for providing a series of odd clock pulses;

bit position cyclic counter means for counting said odd clock pulses;

digit storage location counter means for counting cycles of said bit position counter means;

means for representing a multidigit decimal multiplier number on a first of said register tracks, a multidigit decimal multiplicand number on a second of said register tracks and for developing and representing a multidigit decimal product number on a third of said register tracks including means for recording, during each cycle of said bit position counter means, a quantity of magnetically recognizable marks equal to the value of the digit to be represented, each such mark being recorded in synchronism with the provision of one of said odd clock pulses;

a control counter;

a first coincidence circuit for providing a first coincidence pulse in response to the count in said digit storage location counter means being identical to the count in said control counter;

means for initially setting said control counter to a count corresponding to the digit storage location containing the most significant multiplier digit;

an auxiliary decade counter;

means responsive to the provision of said first coincidence pulse for applying marks read from said first register track and representative of said most significant multiplier digit to said auxiliary decade counter;

an adder decade counter;

means for developing a series of even clock pulses, each even clock pulse occurring a specified interval after an odd clock pulse;

means for applying marks read from said second register track to said adder decade counter in synchronism with said odd clock pulses;

means for transferring digits formed in said adder decade counter to a third of said register tracks;

means for applying marks read from said third register track to said adder decade counter in synchronism with said even clock pulses;

means for decrementing said auxiliary decade counter in response to each cycle of said memory; and means responsive to a zero state of said auxiliary decade counter for shifting the multiplicand stored in said second register track one digit position in a first direction and for decrementing the control counter by one count in a seond direction.

13. Apparatus for representing multidigit decimal multiplier and multiplicand numbers and for performing an arithmetic multiplication operation with respect thereto comprising:

a cyclic memory including a movable surface having a magnetizable medium, partitioned into a clock track and a plurality of number storing register tracks, deposited thereon;

clock track read out means for providing a series of odd clock pulses;

bit position cyclic counter means for counting said odd clock pulses;

digit storage location counter means for counting cycles of said bit position counter means;

means for resetting said digit storage location counter means once each memory cycle;

means for representing a multidigit decimal multiplier number on a first of said register tracks, a multidigit decimal multiplicand number on a second of said tracks, and for developing and representing a multidigit decimal product number on a third of said register tracks including means for recording, during each cycle of said bit position counter means, a quantity of magnetically recognizable marks equal to the value of the digit to be represented, each such mark being recorded in synchronism with the provision of one of said odd clock pulses;

a decimal point selector circuit capable of defining a number of different states equal to the number of digit storage locations in one of said register tracks;

a first coincidence circuit for providing a first coincidence pulse in response to the state of said digit storage location counter means being identical to the state of said decimal point selector circuit;

a control counter;

means for resetting said control counter in response to the resetting of said digit storage location counter means;

a logic flip-flop;

means for resetting said logic flip-flop in response to the resetting of said digit storage location counter means;

means for incrementing said control counter in response to each of said odd clock pulses so long as said logic flip-flop is reset;

means responsive to the provision of said first coincidence pulse for setting said logic flip-flop;

means for changing the count of said control counter to a count corresponding to the digit storage location containing the most significant multiplier digit;

means for shifting the multiplicand contents in said second register track a number of digit positions equal to and in the same direction as the change in the count of said control counter;

a second coincidence circuit for providing a second coincidence pulse in response to the count in said digit storage location counter means being identical to the count in said control counter;

an auxiliary decade counter;

means responsive to the provision of said second coincidence pulse for applying marks read from said first register track and representative of said most significant multiplier digit to said auxiliary decade counter;

an adder decade counter;

means for developing a series of even clock pulses, each even clock pulse occurring a specified interval after an odd clock pulse;

means for applying marks read from said second register track to said adder decade counter in synchronism with said odd clock pulses;

means for transferring digits formed in said adder decade counter to a third of said register tracks;

means for applying marks read from said third register track to said adder decade counter in synchronism with said even clock pulses;

means for decrementing said auxiliary decade counter in response to each cycle of said memory; and means responsive to a zero state of said auxiliary decade counter for shifting the multiplicand stored in said second register track one digit position in a first direction and for decrementing the control counter by one count in a second direction.

14. Apparatus for representing multidigit decimal numbers and for performing an arithmetic addition operation with respect thereto comprising:

a cyclic memory including a movable surface having a magnetizable medium, partitioned into a clock track and a plurality of number storing register tracks, deposited thereon;

clock track read out means for providing a series of odd clock pulses;

bit position cyclic counter means for counting said odd clock pulses;

digit storage location counter means for counting cycles of said bit position counter;

means for representing a multidigt decimal number on each of said register tracks including means for recording, during each cycle of said bit position counter, a quantity of magnetically recognizable marks equal to the value of the digit to be represented, each such mark being recorded in synchronism with the provision of one of said odd clock pulses;

an adder decade counter;

means for developing a series of even clock pulses, each even clock pulse occurring a specified interval after an odd clock pulse;

a different read out means associated with each of said register tracks;

means for applying marks read from a first of said registers to said adder counter in synchronism with said odd clock pulses and for applying marks read from a second of said registers to said adder counter in synchronism with said even clock pulses;

a second decade counter;

means for transferring information from said adder decade counter to said second decade counter;

means responsive to each of said odd clock pulses for decrementing said second decade counter;

a gate;

means for causing said gate to develop output pulses in synchronism with each of said odd clock pulses for so long as said second decade counter is in a nonzero state; and means for recording a mark on said second of said registers in response to the development of each of said output pulses.

15. Apparatus for representing multidigit decimal numbers and for performing an arithmetic subtraction operation with respect thereto comprising:

a cyclic memory including a movable surface having a magnetizable medium, partitioned into a clock track and a plurality of number storing register tracks, deposited thereon;
read out means for providing a series of odd clock pulses;
bit position cyclic counter means for counting said odd clock pulses;
digit storage location counter means for counting cycles of said bit position counter;
means for representing a multidigit decimal number on each of said register tracks including means for recording, during each cycle of said bit position counter, a quantity of magnetically recognizable marks equal to the value of the digit to be represented, each such mark being recorded in synchronism with the provision of one of said odd clock pulses;
an adder decade counter;
means for developing a series of even clock pulses, each even clock pulse occurring a specified interval after an odd clock pulse;
a different read out means associated with each of said register tracks; and
means for applying the complement of marks read from a first of said registers to said adder counter in synchronism with said odd clock pulses and for applying marks read from a second of said registers to said adder counter in synchronism with said even clock pulses.

16. Apparatus for representing multidigit decimal numbers and for performing an arithmetic subtraction operation with respect thereto comprising:
a cyclic memory including a movable surface having a magnetizable medium, partitioned into a clock track and a plurality of number storing register tracks, deposited thereon;
read out means for providing a series of odd clock pulses;
bit position cyclic counter means for counting said odd clock pulses;
digit storage location counter means for counting cycles of said bit position counter;
means for representing a multidigit decimal number on each of said register tracks including means for recording, during each cycle of said bit position counter, a quantity of magnetically recognizable marks equal to the value of the digit to be represented, each such mark being recorded in synchronism with the provision of one of said odd clock pulses;
an adder decade counter;
means for developing a series of even clock pulses, each even clock pulse occurring a specified interval after an odd clock pulse;
a different read out means associated with each of said register tracks;
means for applying the complement of marks read from a first of said registers to said adder counter in synchronism with said odd clock pulses and for applying marks read from a second of said registers to said adder counter in synchronism with said even clock pulses;
a carry flip-flop;
means for coupling the output of said carry flip-flop to said adder decade counter once during each bit position counter cycle;
means for setting said carry flip-flop once each memory cycle; and
means coupling said adder decade counter to said carry flip-flop for setting said carry flip-flop in response to the count in said adder decade counter exceeding nine.

17. Apparatus for representing multidigit decimal divisor and dividend numbers and for performing an arithmetic division operation with respect thereto comprising:
a cyclic memory including a movable surface having a magnetizable medium, partitioned into a clock track and a plurality of number storing register tracks, deposited thereon;
clock track read out means for providing a series of odd clock pulses;
bit position cyclic counter means for counting said odd clock pulses;
digit storage location counter means for counting cycles of said bit position counter means;
means for resetting said digit storage location counter means once each memory cycle;
means for representing a multidigit decimal divisor number on a first of said register tracks, a multidigit decimal dividend number on a second of said register tracks, and for developing and representing a multidigit decimal quotient number on a third of said register tracks including means for recording, during each cycle of said bit position counter means, a quantity of magnetically recognizable marks equal to the value of the digit to be represented, each such mark being recorded in synchronism with the provision of one of said odd clock pulses;
an adder decade counter;
means for repeatedly applying the complement of marks read from said first register track to said adder decade counter in synchronism with said odd clock pulses;
means for applying marks read from said second register track to said adder decade counter in synchronism with said even clock pulses to thereby subtract the divisor number in said first register track from the dividend number in said second register track;
means for detecting an over-subtraction;
an auxiliary decade counter;
means for resetting said auxiliary decade counter in response to the resetting of said digit storage location counter means;
means for incrementing said auxiliary decade counter once each memory cycle prior to the memory cycle in which said over-subtraction occurs;
a control counter;
means for initially setting said control counter to a count corresponding to the digit storage location containing the most significant dividend digit;
a first coincidence circuit for providing a first coincidence pulse in response to the count in said digit storage location counter means being identical to the count in said control counter;
means responsive to said over-subtraction and to the provision of said first coincidence pulse for transferring said count in said auxiliary decade counter to said third register track;
means responsive to said over-subtraction for resetting said auxiliary decade counter, for restoring said number in said second register track, for shifting said number in said second register track one digit position in a more significant direction, and for decrementing said control counter.

18. Apparatus for representing multidigit decimal divisor and dividend numbers and for performing an arithmetic division operation with respect thereto comprising:
a cyclic memory including a movable surface having a magnetizable medium, partitioned into a clock track and a plurality of number storing register tracks, deposited thereon;
clock track read out means for providing a series of odd clock pulses;
bit position cyclic counter means for counting said odd clock pulses;
digit storage location counter means for counting cycles of said bit position counter means;
means for resetting said digit storage location counter means once each memory cycle;
means for representing a multidigit decimal divisor number on a first of said register tracks, a multidigit decimal dividend number on a second of said register tracks, and for developing and representing a multidigit decimal quotient number on a third of said register tracks including means for recording, during each cycle of said bit position counter means, a quantity of magnetically recognizable marks equal to the value of the digit to be represented, each such mark being recorded in synchronism with the provision of one of said odd clock pulses;

a decimal point selector circuit capable of defining a number of different states equal to the number of digit storage locations in one of said register tracks;

a first coincidence circuit for providing a first coincidence pulse in response to the state of said digit storage location counter means being identical to the state of said decimal point selector circuit;

a control counter;

means for resetting said control counter in response to the resetting of said digit storage location counter means;

a logic flip-flop;

means for resetting said logic flip-flop in response to the resetting of said digit storage location counter means;

means for incrementing said control counter in response to each of said odd clock pulses so long as said logic flip-flop is reset;

means responsive to the provision of said first coincidence pulse for setting said logic flip-flop;

means for changing the count of said control counter to a count corresponding to the digit storage location containing the most significant dividend digit;

means for shifting the dividend contents in said second register track a number of digit positions equal to and in a direction opposite to the change in the count of said control counter.

19. Apparatus for representing a multidigit decimal number and for extracting the square root thereof comprising:

a cyclic memory including a movable surface having a magnetizable medium, partitioned into a clock track and a plurality of number storing register tracks, deposited thereon;

clock track read out means for providing a series of odd clock pulses;

digit storage location counter means for counting cycles of said bit position counter means;

means for resetting said digit storage location counter means once each memory cycle;

means for representing a multidigit decimal number on a first of said register tracks and for developing and representing a multidigit decimal number representing the square root thereof on a second of said register tracks including means for recording, during each cycle of said bit position counter means, a quantity of magnetically recognizable marks equal to the value of the digit to be represented, each such mark being recorded in synchronism with the provision of one of said clock pulses;

an adder decade counter;

an auxiliary decade counter;

a pulse generator;

means for causing said pulse generator to provide a number of pulses equal to $(2b-1)$ where $b$ represents the count of the auxiliary decade counter;

means for applying the complement of marks read from a third of said register tracks and the complement of pulses provided by said pulse generator to said adder decade counter in synchronism with said odd clock pulses;

means for applying marks read from a first of said register tracks to said adder decade counter in synchronism with said even clock pulses to thereby develop the difference between the number stored in said first register and the sum of the number provided by said pulse generator and the number stored in said third register;

means for detecting an over-subtraction;

means for resetting said auxiliary decade counter in response to the resetting of said digit storage location counter means;

means for incrementing said auxiliary decade counter once each memory cycle prior to the memory cycle in which said over-subtraction occurs;

a control counter;

a first coincidence circuit for providing a first coincidence pulse in response to the count in said digit storage location counter means being identical to the count in said control counter;

means responsive to said over-subtraction and to the provision of said first coincidence pulse for transferring said count in said auxiliary decade counter to said second register track;

means responsive to said over-subtraction for resetting said auxiliary decade counter, for restoring said number in said first register track, for decrementing said control counter by two counts, and for entering a number into said third register track equal to twice the contents of the number stored in said second register track.

20. Apparatus for representing a multidigit decimal number and for extracting the square root thereof comprising:

a cyclic memory including a movable surface having a magnetizable medium, partitioned into a clock track and a plurality of number storing register tracks, deposited thereon;

clock track read out means for providing a series of odd clock pulses;

digit storage location counter means for counting cycles of said bit position counter means;

means for resetting said digit storage location counter means once each memory cycle;

means for representing a multidigit decimal number on a first of said register tracks and for developing and representing a multidigit decimal number representing the square root thereof on a second of said register tracks including means for recording, during each cycle of said bit position counter means, a quantity of magnetically recognizable marks equal to the value of the digit to be represented, each such mark being recorded in synchronism with the provision of one of said clock pulses;

an adder decade counter;

an auxiliary decade counter;

a pulse generator;

means for causing said pulse generator to provide a number of pulses equal to $(2b-1)$ where $b$ represents the count of the auxiliary decade counter;

means for applying the complement of marks read from a third of said register tracks and the complement of pulses provided by said pulse generator to said adder decade counter in synchronism with said odd clock pulses;

means for applying marks read from a first of said register tracks to said adder decade counter in synchronism with said even clock pulses to thereby develop the difference between the number stored in said first register and the sum of the number provided by said pulse generator and the number stored in said third register;

means for detecting an over-subtraction;

means for resetting said auxiliary decade counter in response to the resetting of said digit storage location counter means;

means for incrementing said auxiliary decade counter once each memory cycle prior to the memory cycle in which said over-subtraction occurs;

a first coincidence circuit for providing a first coincidence pulse in response to the count in said digit storage location counter means being identical to the count in said control counter;

means responsive to said over-subtraction and to the provision of said first coincidence pulse for transferring said count in said auxiliary decade counter to said second register track;

a decimal point selector circuit capable of defining a number of states equal to the number of digit storage locations in each of said register tracks;

a second coincidence circuit for providing a second coincidence pulse in response to said digit storage location counter means defining a state identical to the state of said decimal point selector circuit;

means responsive to said over-subtraction and to the provision of said second coincidence pulse for restoring said number in said first register track and for shifting said number in said first register track one digit position in a more significant direction and for decrementing said control counter by one count in a less significant direction; and means responsive to said over-subtraction for resetting said auxiliary decade counter.

References Cited

UNITED STATES PATENTS

| | | | |
|---|---|---|---|
| 2,661,899 | 12/1953 | Chromy | 235—171 |
| 2,966,303 | 12/1960 | Isserstedt | 235—160 |

ROBERT C. BAILEY, *Primary Examiner.*

G. D. SHAW, *Assistant Examiner.*